(12) United States Patent
Ben-Aharon

(10) Patent No.: US 11,748,440 B2
(45) Date of Patent: Sep. 5, 2023

(54) SYSTEM AND METHOD FOR IMPLEMENTING CONTAINERS WHICH EXTRACT AND APPLY SEMANTIC PAGE KNOWLEDGE

(71) Applicant: WIX.COM LTD., Tel Aviv (IL)

(72) Inventor: Roni Ben-Aharon, Tel-Aviv (IL)

(73) Assignee: Wix.com Ltd., Tel Aviv (IL)

( * ) Notice: Subject to any disclaimer, the term of this patent is extended or adjusted under 35 U.S.C. 154(b) by 637 days.

(21) Appl. No.: 15/661,342

(22) Filed: Jul. 27, 2017

(65) Prior Publication Data
US 2018/0032626 A1 Feb. 1, 2018

Related U.S. Application Data

(60) Provisional application No. 62/531,897, filed on Jul. 13, 2017, provisional application No. 62/367,151, filed on Jul. 27, 2016.

(51) Int. Cl.
*G06F 16/958* (2019.01)
*G06F 16/23* (2019.01)
(Continued)

(52) U.S. Cl.
CPC .......... *G06F 16/972* (2019.01); *G06F 16/23* (2019.01); *G06F 16/951* (2019.01);
(Continued)

(58) Field of Classification Search
CPC ...... G06F 16/972; G06F 16/23; G06F 16/951; G06F 40/103; G06F 40/131;
(Continued)

(56) References Cited

U.S. PATENT DOCUMENTS 7,594,166 B1 * 9/2009 Ramakrishna ........ G06F 16/958
715/236
8,788,935 B1 7/2014 Hirsch
(Continued)

FOREIGN PATENT DOCUMENTS

WO 2006046668 A1 5/2006

OTHER PUBLICATIONS

International Search Report for corresponding PCT application PCT/IB2017/054581 dated Dec. 11, 2017.
(Continued)

*Primary Examiner* — Vaishali Shah
(74) *Attorney, Agent, or Firm* — HEIDI BRUN ASSOCIATES LTD.

(57) ABSTRACT

A system for a website building system includes at least one database storing website building system component types of websites of users, semantic composite types and smart box definitions where the semantic composite types are data structures describing components consisting of other components, a smart box handler to analyze and classify sets of components of a page of a website as smart boxes using semantic decomposition, the smart box boxes based on said semantic composite types and the smart box definitions, an editor to enable interactive editing of the website comprising components and the smart boxes, to receive a classification from the smart box handler and to provide additional editing capabilities for the smart boxes based on the classification.

21 Claims, 44 Drawing Sheets

(51) Int. Cl.
*G06F 16/951* (2019.01)
*G06F 40/103* (2020.01)
*G06F 40/131* (2020.01)
*G06F 40/137* (2020.01)
*G06F 40/186* (2020.01)

(52) U.S. Cl.
CPC .......... *G06F 40/103* (2020.01); *G06F 40/131* (2020.01); *G06F 40/137* (2020.01); *G06F 40/186* (2020.01); *G06F 16/958* (2019.01)

(58) Field of Classification Search
CPC ...... G06F 40/137; G06F 40/186; G06F 16/25; G06F 16/953; G06F 16/9532; G06F 16/9538; G06F 16/958; G05B 2219/32134
See application file for complete search history.

(56) References Cited

U.S. PATENT DOCUMENTS

| | | | |
|---|---|---|---|
| 9,436,765 B2 | 9/2016 | Abrahami | |
| 10,425,501 B2* | 9/2019 | Nasson | G06F 16/958 |
| 2004/0193635 A1* | 9/2004 | Hsu | G06F 9/547 |
| | | | 707/999.102 |
| 2010/0115615 A1* | 5/2010 | Hubbard | G06F 16/951 |
| | | | 726/22 |
| 2013/0219263 A1 | 8/2013 | Abrahami | |
| 2013/0232403 A1* | 9/2013 | Abrahami | G06F 40/103 |
| | | | 715/234 |
| 2013/0275892 A1 | 10/2013 | Yang | |
| 2014/0282218 A1 | 3/2014 | Kaufman | |
| 2014/0108373 A1* | 4/2014 | Abrahami | G06F 16/972 |
| | | | 707/706 |
| 2015/0074516 A1 | 3/2015 | Ben-Aharon | |
| 2015/0106751 A1* | 4/2015 | Farjo | G06F 16/972 |
| | | | 715/760 |
| 2015/0154164 A1* | 6/2015 | Goldstein | G06F 40/106 |
| | | | 715/229 |
| 2015/0310124 A1 | 10/2015 | Ben-Aharon | |
| 2017/0344656 A1 | 11/2017 | Koren | |

OTHER PUBLICATIONS

Supplementary European Search Report for corresponding European application 17 83 3684.8 dated Jun. 6, 2019.
English Abstract of 2006046668 downloaded from Google Patents on Jul. 13, 2021.

* cited by examiner

FIG. 17D ic composite types and repeater semantic composites.
SYSTEM AND METHOD FOR IMPLEMENTING CONTAINERS WHICH EXTRACT AND APPLY SEMANTIC PAGE KNOWLEDGE

CROSS REFERENCE TO RELATED APPLICATIONS

This application claims priority from U.S. Provisional Patent Applications No. 62/367,151 filed Jul. 27, 2016 and No. 62/531,897 filed 13 Jul. 2017 both of which are incorporated herein by reference.

FIELD OF THE INVENTION

The present invention relates to website building systems generally and to handling semantic knowledge in particular.

BACKGROUND OF THE INVENTION

Website building systems have become very popular and allow novice website builders to build professional looking and functioning websites. Many of these systems provide both the novice and experienced user ways of building websites from scratch.

A website building system may be a standalone system, or may be embedded inside a larger editing system. It may also be on-line (i.e. web sites are edited and stored on a server), off-line or partially on-line (with web sites being edited locally but uploaded to a central server).

Websites are typically made up of visually designed applications consisting of pages. Pages may be displayed separately and may contain components. Components are typically arranged in a hierarchy of containers (single page and multi-page) inside the page, with containers containing other containers or atomic components. A multi-page container may display multiple mini-pages. Pages may also include elements such as third party applications.

Pages may also use templates, including full site templates, general page templates or component templates. Specific cases for templates include the use of an application master page containing components replicated in all other regular pages, and the use of an application header and/or footer (which repeat on all pages).

A website building system is typically offered by a website building system vendor. The website building system is used by users (also known as designers) who design the websites. The websites are then used by users-of-users (also known as end-users).

Existing systems typically allow editing to be performed at the component level including the container level. Thus, existing systems typically provide operations such as adding a component (e.g. by selecting a component from a menu of possible component types and using drag and drop), deleting a component, moving and resizing a component, changing component content, changing component attributes (e.g. through a floating or fixed attribute panel applicable to the component being edited) and placing components inside a container, or removing components from inside a container.

Existing systems may also allow components to be grouped (e.g. by using multiple selections of components together with a group/ungroup operation). Then, the system may allow operations to be performed on all components in a group such as move, resize or an attribute (e.g. color) change.

SUMMARY OF THE PRESENT INVENTION

There is provided in accordance with a preferred embodiment of the present invention, a website building system. The system includes a memory, a processor, at least one database storing website building system component types of websites of users, semantic composite types and smart box definitions where the semantic composite types are data structures describing components consisting of other components. The system also includes a smart box handler to analyze and classify sets of components of a page of a website as smart boxes using semantic decomposition, the smart box boxes based on the semantic composite types and the smart box definitions and an editor to enable interactive editing of the website comprising components and the smart boxes, to receive a classification from the smart box handler and to provide additional editing capabilities for the smart boxes based on the classification.

Moreover, in accordance with a preferred embodiment of the present invention, the system also includes an updater to provide updates to the website based on external updates and updates to the at least one database.

Further, in accordance with a preferred embodiment of the present invention, the system includes a search engine friendly renderer to send information about the smart boxes and the semantic composites of the website to be indexed to a search engine spider.

Still further, in accordance with a preferred embodiment of the present invention, the semantic composites are at least one of elementary semantic composites, conceptual semantic composites and repeater semantic composites.

Additionally, in accordance with a preferred embodiment of the present invention, the repeater semantic composites are lists, galleries and grids.

Moreover, in accordance with a preferred embodiment of the present invention, the editor allows a user of the website building system to interactively designate the website components into smart boxes.

Further, in accordance with a preferred embodiment of the present invention, the smart box handler includes an automatic handler to analyze a page of the website and to perform semantic decomposition based on the analysis; and at least one of an offline analyzer and handler to perform batch offline processing and semantic decomposition from external sites to the website and sites held within the at least one database and an online analyzer and handler to provide online processing and semantic decomposition via the automatic handler.

Still further, in accordance with a preferred embodiment of the present invention, the smart box handler also includes an interactive handler to enable a site designer to manually configure a semantic decomposition; and an artificial intelligence/machine learner to perform artificial intelligence and machine learning analysis based on user activity and analysis of other websites and pages.

Additionally, in accordance with a preferred embodiment of the present invention, the system includes a site generation system to generate the website comprising the smart boxes and an import handler to import and classify semantic decomposition definitions from the site generation system and systems external to the website building system.

Moreover, in accordance with a preferred embodiment of the present invention, the editor includes a semantic composite sensitive editor to enable a user to apply special editing behaviors to the smart boxes and a semantic composite type editor to enable general editing of the semantic composite types.

Further, in accordance with a preferred embodiment of the present invention, the editor also includes a layout compiler to generate layout definitions for the website based on a layout definition language.

Still further, in accordance with a preferred embodiment of the present invention the semantic composite sensitive editor includes a semantic composite editing behavior applier to apply the additional editing capabilities.

Additionally, in accordance with a preferred embodiment of the present invention, the semantic composite editing behavior applier includes at least one of: an animation handler to propose and apply semantic composite specific animation to the smart boxes; a layout creator and applier to extract and apply semantic knowledge, layouts and semantic composite specific operations to the smart boxes; a brush applier to apply a semantic brush to the smart boxes; a design kit applier to propose and apply relevant design kits to the smart boxes; a resizer to handle semantic composite specific resizing for the smart boxes; an adder and deleter to at least one of: add and delete an item in a list of the smart boxes; an orderer to reorder items in a list of the smart boxes; a drag and drop handler to handle drag and drop functionality for the semantic composite sensitive editor; a selection handler to handle semantic composite selection for the semantic composite sensitive editor; a matcher to perform composite matching between semantic composites and a content and component offerer to offer additional and alternative components and content for the smart boxes.

There is provided in accordance with a preferred embodiment of the present invention, a method for a website building system. The method includes storing website building system component types of websites of users, semantic composite types and smart box definitions where semantic composite types are data structures describing components consisting of other components. The method also includes analyzing and classifying sets of components of a page of a website as smart boxes using semantic decomposition, the smart boxes based on the semantic composite types and the smart box definitions; enabling interactive editing of the website comprising components and the smart boxes, receiving a classification from the analyzing and classifying and providing additional editing capabilities for the smart boxes based on the classification.

Moreover, in accordance with a preferred embodiment of the present invention, the method includes providing updates to the website based on external updates and updates to the at least one database.

Further, in accordance with a preferred embodiment of the present invention, the method includes sending information about the smart boxes and the semantic composites of the web site to be indexed to a search engine spider.

Still further, in accordance with a preferred embodiment of the present invention, the semantic composites are at least one of elementary semantic composites, conceptual semantic composites and repeater semantic composites.

Additionally, in accordance with a preferred embodiment of the present invention, the repeater semantic composites are lists, galleries and grids.

Moreover, in accordance with a preferred embodiment of the present invention, the enabling interactive editing includes allowing a user of the website building system to interactively designate the website components into smart boxes.

Further, in accordance with a preferred embodiment of the present invention, the analyzing and classifying includes analyzing a page of the website and performing semantic decomposition based on the analyzing; and at least one of: performing batch offline processing and semantic decomposition from external sites to the website and sites held within the at least one database and providing online processing and semantic decomposition via the analyzing a page.

Still further, in accordance with a preferred embodiment of the present invention, the analyzing and classifying includes enabling a site designer to manually configure a semantic decomposition and performing artificial intelligence and machine learning analysis based on user activity and analysis of other websites and pages.

Additionally, in accordance with a preferred embodiment of the present invention, the analyzing and classifying includes generating the website comprising the smart boxes and importing and classifying semantic decomposition definitions from the generating and systems external to the web site building system.

Moreover, in accordance with a preferred embodiment of the present invention, the method includes enabling a user to apply special editing behaviors to the smart boxes and enabling general editing of the semantic composite types.

Further, in accordance with a preferred embodiment of the present invention, method also includes generating layout definitions for the website based on a layout definition language.

Still further, in accordance with a preferred embodiment of the present invention, g applying the additional editing capabilities includes at least one of: proposing and applying semantic composite specific animation to the smart boxes, extracting and applying semantic knowledge, layouts and semantic composite specific operations to the smart boxes, applying a semantic brush to the smart boxes, proposing and applying relevant design kits to the smart boxes, handling semantic composite specific resizing for the smart boxes; at least one of: adding and deleting an item in a list of the smart boxes, reordering items in a list of the smart boxes, handling drag and drop functionality for the enabling a user to apply special editing behaviors, handling semantic composite selection for the enabling a user to apply special editing behaviors, performing composite matching between semantic composites, offering additional and alternative components and content for the smart boxes and editing the smart box to form a new smart box.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 17A-17H are schematic illustrations of the editing of a "Team member" smart box, constructed and operative in accordance with the present invention.

Figure 1:
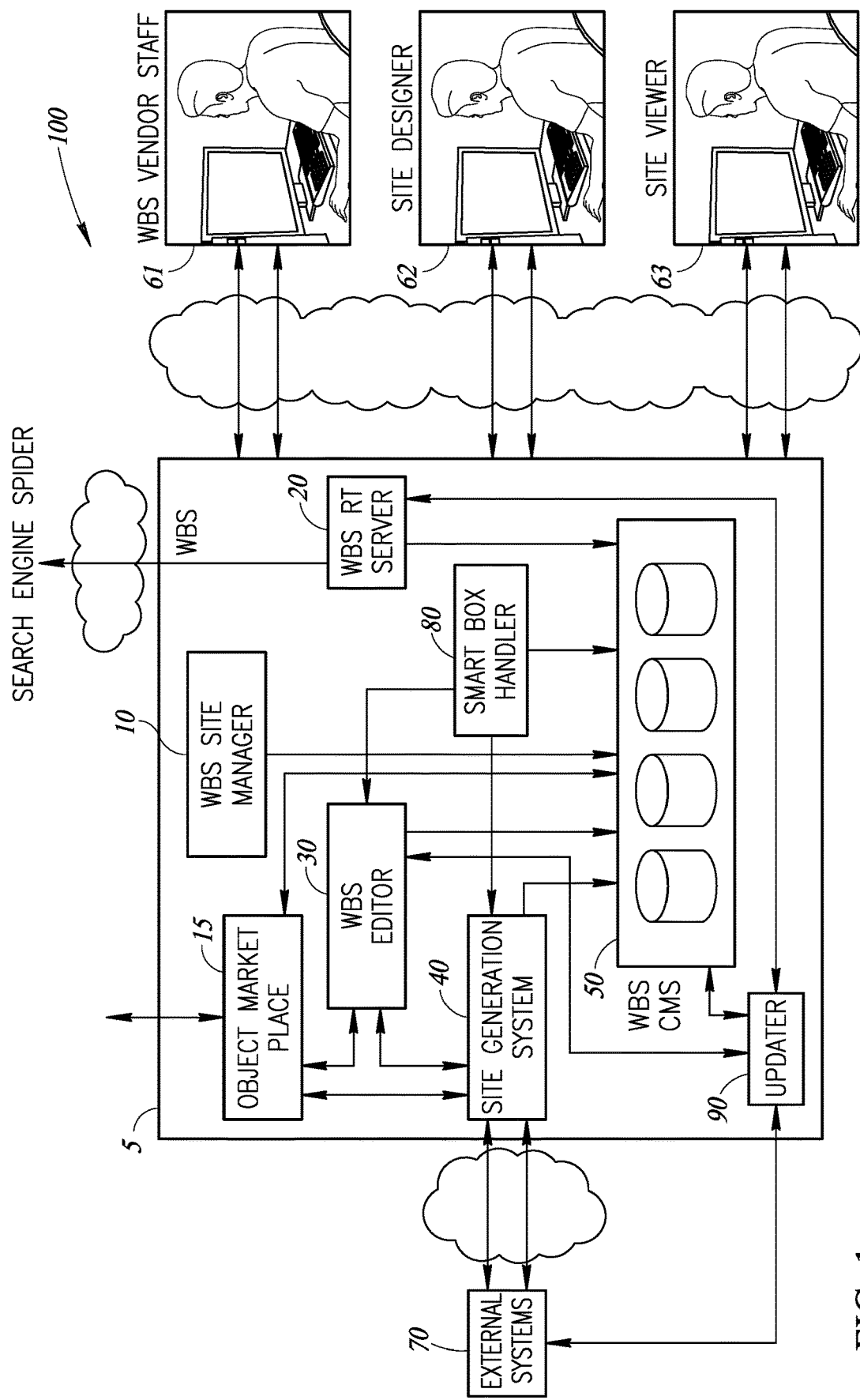
FIG. 1 is a schematic illustration of a system for a website building system that incorporates building data structures based on semantic page knowledge; constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that current website building systems have no knowledge of the semantics, roles and relationships of a particular component. For example, a page may contain a picture component and two text components which together describe a person (e.g. the person's photograph, name and title). If the user moves the photograph, unless the user has manually marked the picture component and two text components as a component group, the two related text components would not move with it. Applicant has further realized that using such groups of the prior art may be problematic. Most users are not aware of the need to group components. Once components are grouped, making changes to a subset of the group (without affecting other groups members) may be cumbersome or impossible. Furthermore, the grouping of components typically only allows them to be moved or resized together, but it does not (and cannot) provide extra features inferred from the fact that these components form together a synergic semantic unit. For example, a set of images may form a gallery, which may provide specialized features such as reordering of images, offering different gallery layouts and animations etc. For the example above of the picture component and two text components, there is no way for the system to determine that the picture component and two text components form a "person description group" and should be treated as such.

Furthermore, Applicant has realized that current website building systems have no support for the re-use of "layout knowledge". For example, assuming a page contains multiple such "person description" sets as described herein above, there is no way to apply changes made in one set to other sets.

In another example, if the user determines that a specific visual layout to a single "person description" set is visually superior, there is no simple way to apply this change to other "person description" sets and to "person description" sets only. The user may desire to change the layout of all "person description" sets on the page so that they all have the same layout, without changing other [image+text+text] component sets which do not form a "person description" set. This is particularly applicable if the selected visual layout requires making some changes to the relative position and size of the components in each of the "person description" sets.

Existing systems do not provide support for smart alternative layout selection i.e. they do not offer a way to quickly evaluate multiple possible layouts for such a "person description" set. In particular, existing systems do not offer a way to evaluate possible layouts which are associated with a specific meaning or functions. For example, there is no way to evaluate layouts which are specific to a "person description set", as opposed to any generic layout for a picture-text-text component combination.

Existing systems also do not provide support for specialized editing behaviors i.e. do not offer a way for editing behaviors to adapt to component sets which have specific functionality and requirements. For example, existing systems do not offer a way for the resize operation (when applied to a specific set of components) to be applied in different manner to different components in the set. For example, when shrinking a "person description" set, existing systems cannot offer the option to shrink the person's name by a smaller zoom factor than the person's photograph.

In another example, when resizing a group of two shapes with a line between them (known as a "decorated line"), the default resize behavior will not handle the group properly. If (for example) the user horizontally stretches (resizes) the group, the system will either proportionally resize all components (resulting in an over-thick line) or just stretch the line and shapes horizontally (resulting in a non-proportional shapes), where the desired result should be stretching only the middle line and resizing the shapes, while keeping their aspect ratio.

The system may resolve this using several semantic based specific resize behaviors such as performing a correct resize (stretching the line while keeping the shapes in the same size) or using semantic based specific animation (e.g. one in which the center line appears gradually from the center to the edges and then the shapes appear). The system may also allow the user to change the decorated line semantics into different decorated line variants (e.g. with different shapes or different line-shape arrangement) which may be more suitable for the new size.

Such specialized behaviors may be beneficial for user-initiated editing operations, and in cases involving the use of dynamic layout or responsive layout (e.g. when a given page is displayed in different screen have different size, resolution or aspect ratio) as further described in US Patent Publication No. 2013-0219263, entitled "Web Site Design System Integrating Dynamic Layout and Dynamic Content" published 22 Aug. 2013 and assigned to the common assignee of the present invention.

Applicant has realized that the above-mentioned inadequacies may be solved using a system capable of analyzing a page to create, maintain and use a dual model of the pages being edited. Under this model, in addition to the regular component hierarchy, some (or all) of the components may be classified and grouped under a parallel hierarchy (or multiple hierarchies) known as smart box elements. This hierarchy (or multiple hierarchies) of smart box elements may be referred to as the semantic decomposition of the page (or website). It will be appreciated that such a smart box hierarchy may be an entirely separate hierarchy or may be merged into the main component hierarchy as further described below. It will also be appreciated that smart boxes may be nested within each other i.e. a smart box may contain another smart box.

The system may create and maintain the semantic decomposition based on semantic knowledge extracted from the page components as well as other sources (e.g. inter-component anchors, component editing history, component attributes, content or feature analysis, heuristics or machine learning techniques and more). An example of an algorithm which extracts some types of semantic information and semantic relationship between components is described in US Patent Publication No. 2015/0074516 entitled "System and Method for Automated Conversion of Interactive Sites and Applications to Support Mobile and Other Display Environments" published 12 Mar. 2015 and assigned to the common assignee of the present invention.

The system may also integrate external information and data sources which are not related to the actual page editing process and component visual attributes, such as business or other information about the web site, its pages and the owner of the website (if available). It will be appreciated that data may be extracted from such sources as described in U.S. patent application Ser. No. 15/607,586 entitled "System and Method for the Creation and Update of Hierarchical Websites Based on Collected Business Knowledge", filed 29 May 2017 and assigned to the common assignee of the present invention.

It will also be appreciated that such smart boxes may conform to predefined semantic-based data types known as semantic composites, e.g. a "picture+associated caption" data type, a "list of team members" data type etc. Semantic composites can also be regarded as "components constructed from a collection of other components" as discussed in more detail here in below. The semantic composites are the data types whereas the smart boxes are the specific instances of the data types in a given page. The system may also support smart boxes which do not conform to any specific pre-defined semantic composite data types. Thus, the system may analyze the page being edited (per a database of semantic-based data types), and may automatically classify sets of elements as semantic composites based on the component analysis and matching as described in more detail herein below.

Some semantic composites may be repeater semantic composites such as lists, galleries and grids which display multiple sub-elements, and some may be non-repeating (such as the "picture+caption" semantic composite as described herein above).

The system may then provide operations which extract and apply semantic knowledge and layouts to the various smart boxes as well as semantic composite specific operations as discussed in more detail herein below. The system may further modify and adapt its editing behavior to the specific smart box being edited.

It will be appreciated that semantic composites may be classed as two types, lower-level elementary semantic composites and higher level conceptual semantic composites.

An elementary semantic composite may include a common combination of components which together form a unit having a joint meaning. Examples of elementary semantic composites include: image and text components forming an image and description elementary semantic composite, several text components, forming a text paragraph elementary semantic composite, a repeated sequence of similar components, forming a list elementary semantic composite and a set of images forming an image gallery elementary semantic composite.

A conceptual semantic composite may include a combination of components which together embody a specific concept or content element as could be understood by a person. Examples of conceptual semantic composites include: a picture+text (title)+text (description)+number (price) which together form a product description conceptual semantic composite and a picture+text (name)+text (e-mail)+number (phone number)+text (address) which together form a personal contact conceptual semantic composites.

It will be appreciated that elementary semantic composites are defined in the realm of "website building system components" whereas conceptual semantic composite are defined in the realm of the "real world", that of human discourse having meaning external to the web site (such as business terms and concepts).

It will also be appreciated that the system may support the concept of a "role" or "field". For example, a "team member" conceptual semantic composite may have a "name" field and an "e-mail" field, both of which are text components but are distinct from each other. A "team member" identifier module may match the contained text fields inside the "team member" conceptual semantic composite to the given roles, based (for example) on their content (e.g. an e-mail field is likely to contain a valid e-mail address which ends in a '@' followed by a valid domain name).

A role may be mandatory or optional (e.g. a set of fields cannot be identified as a "team member" conceptual semantic composite if there is no name field, but can be if there is no e-mail field for some or all the potential conceptual semantic composites). A role may have additional role-specific attributes such as field validation rules or field detection rules. A role may also play a part in an identification heuristic (e.g. if there is an e-mail field it is more likely to be a team member conceptual semantic composite).

Reference is now made to FIG. 1 which illustrates a system 100 for a website building system 5 that incorporates building data structures based on semantic page knowledge in accordance with an embodiment of the present invention.

System 100 may comprise a website building system 5, a website building system site manager 10, an object market place 15, a website building system (WBS) runtime server 20, a website building system (WBS) editor 30, a site generation system 40, a content management system 50, a Smart box handler 80 and an updater 90. Website building system 5 may be in communication with client systems operated by website building system vendor staff 61, a site designer 62, a site viewer 63 and with external systems 70. Smart box handler 80 may classify components and pages as smart boxes and updater 90 may provide updates to the other elements based on external updates and updates to content management system 30. It will be appreciated that the functioning of the rest of the elements may be like those described in U.S. patent application Ser. No. 15/607,586.

Object marketplace 15 may allow for the trading of objects (such as element types and smart composite types) between object vendors and site designers 62 through website building system 5, WBS RT (runtime) server 20 may handle the run-time access by (possibly numerous) site viewers 63, WBS editor 30 may allow site designer 62 to create and edit sites and to provide and apply smart alternative layouts and smart editing behaviors and site generation system 40 may create the actual site based on the created semantic composites (possibly based on external or provided user information). Content management system 50 may hold data related to the pertinent website together with semantic composite types and smart box definitions and smart box handler 80 may analyze and classify semantic compositions both internally from website pages and externally from imported data structures as described in more detail herein below.

Figure 2:
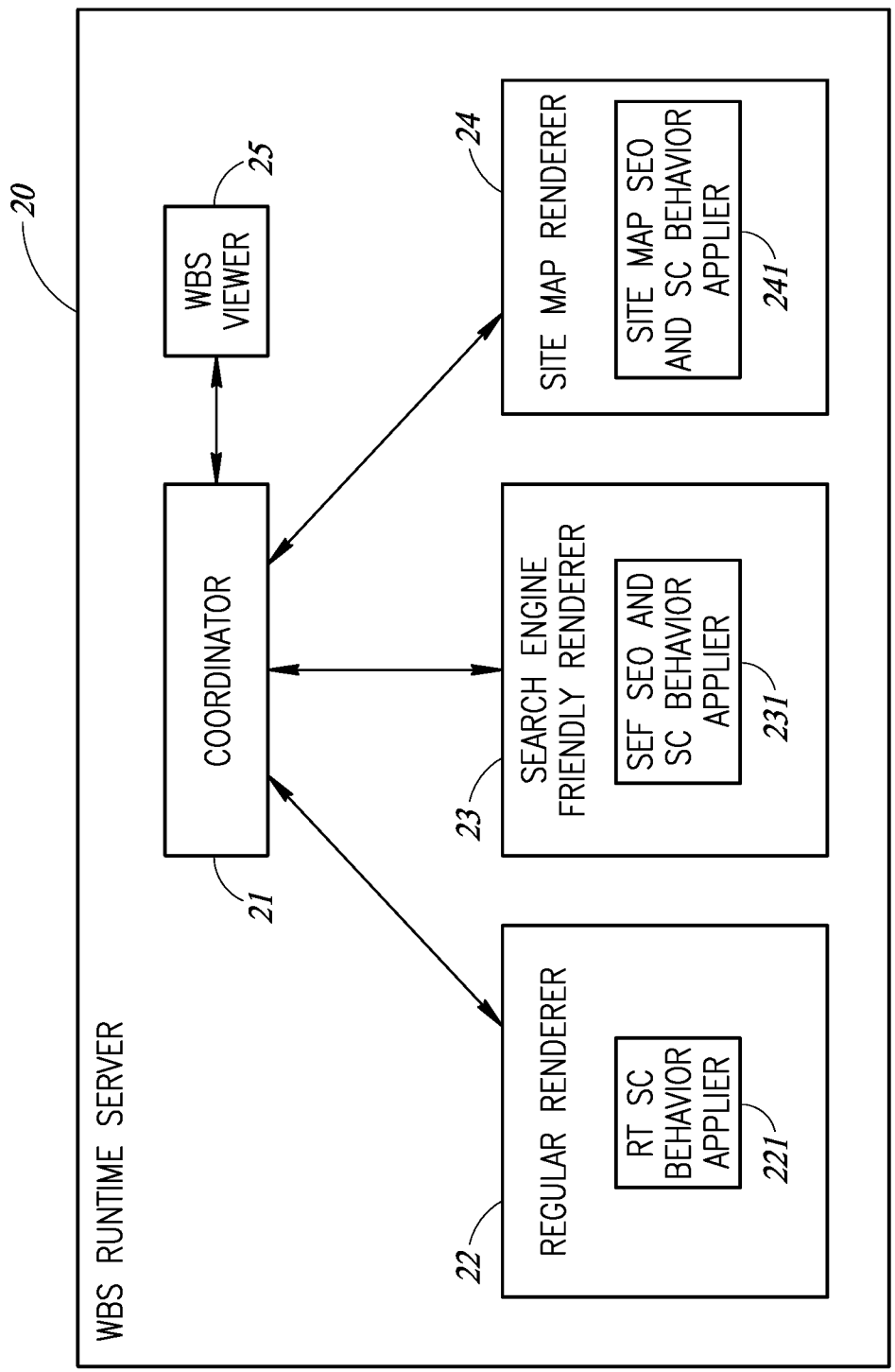
FIG. 2 is a schematic illustration of the elements of the WBS runtime server of FIG. 1, constructed and operative in accordance with the present invention.

Reference is now made to FIG. 2 which illustrates the elements of WBS runtime server 20. WBS runtime server 20 may further comprise a renderer coordinator 21, a regular renderer 22, a search engine friendly renderer 23, a sitemap renderer 24 and a WBS viewer 25. Regular renderer 22 may further comprise a runtime (RT) semantic composite behavior applier 221. Search engine friendly renderer 23 may further comprise a runtime (RT) search engine friendly and semantic composite behavior applier 231. Sitemap renderer 24 may further comprise a sitemap SEO and semantic composite behavior applier 241. The functioning of renderer coordinator 21, regular renderer 22, search engine friendly renderer 23 and a sitemap renderer 24 may be similar to the renderers described in U.S. Pat. No. 9,436,765 entitled "System for Deep Linking and Search Engine Support for Web Sites Integrating Third Party Application and Components" granted 6 Sep. 2016 and assigned to the common assignee of the present invention. It will be appreciated that WBS viewer 25 may allow a user in certain situations to edit smart boxes (e.g. adding blog posts to a blog smart box) or apply smart box related operations to them (e.g. temporarily applying an alternative layout to a viewed page section).

RT semantic composite behavior applier 221 may apply semantic composite behaviors at runtime and RT search engine friendly and semantic composite behavior applier 231 may apply search engine optimization related semantic composite techniques (i.e. may extract data accordingly for use for search engine optimization). Sitemap SEO and semantic composite behavior applier 241 may also apply semantic composite behaviors as discussed in more detail herein below.

Figure 3:
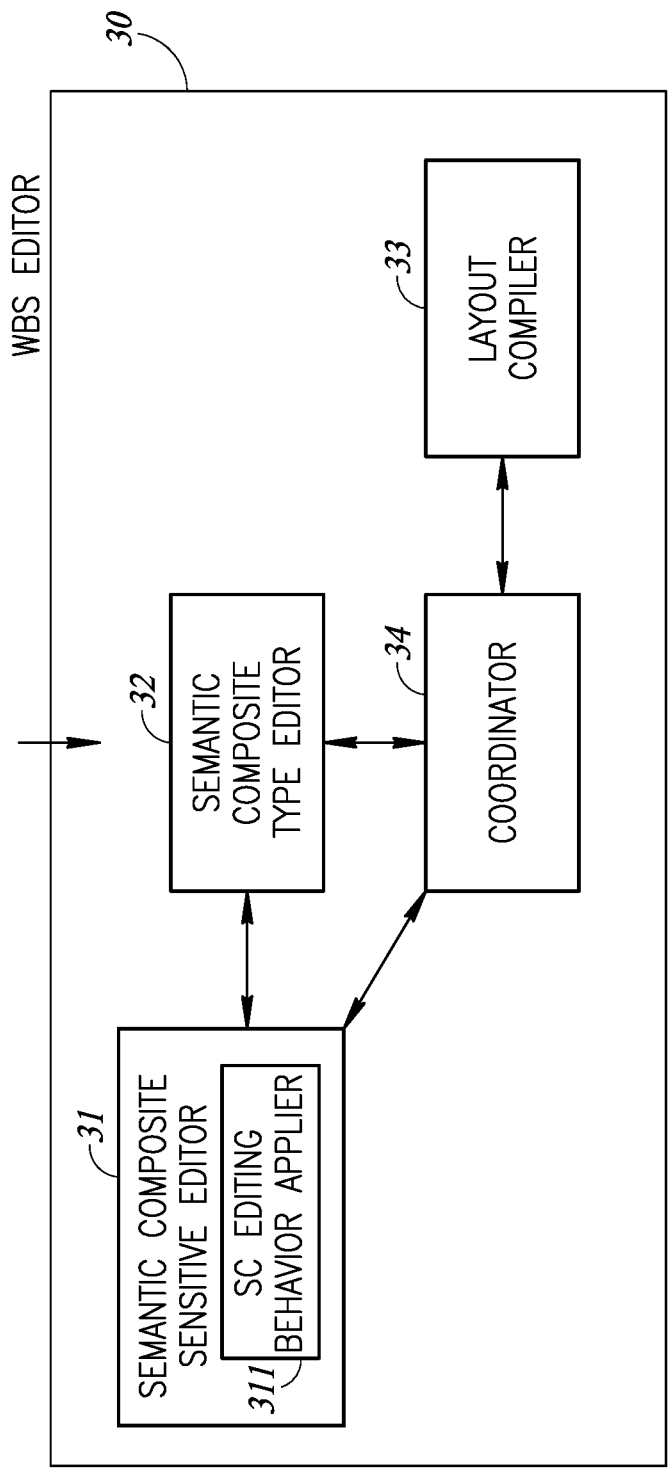
FIG. 3 is a schematic illustration of the elements of the WBS editor of FIG. 1, constructed and operative in accordance with the present invention.

Reference is now made to FIG. 3 which illustrates the elements of WBS editor 30. It will be appreciated that WBS editor 30 may allow direct visual creation and editing of semantic composites and smart boxes for website building system sites stored in content management system 50. WBS editor 30 may also edit generated sites. WBS editor 30 may comprise a semantic composite sensitive editor 31, a semantic composite type editor 32, a layout compiler 33 and a coordinator 34. Semantic composite sensitive editor 31 may comprise a semantic composite (SC) editor behavior applier 311.

It will be appreciated that WBS editor 30 may be a regular website building system visual editor with an understanding of how to handle semantic composites. Semantic composite sensitive editor 31 may allow a user to interactively designate components into smart boxes and may allow a user to apply special editing as described in more detail herein below. Semantic composite type editor 32 may allow WBS vendor staff 62 to edit semantic composite types.

Layout compiler 33 may generate layout definitions for the site and coordinator 34 may coordinate between the different elements within WBS editor 30, external elements and databases etc. The functionality of these elements is described in more detail herein below.

It will be appreciated that during the creation and editing of a website, at any stage, WBS editor 30 may perform semantic decomposition based on explicit user or site designer 62 editing. In this scenario, semantic composite sensitive editor 31 may allow a user building or editing the page to create and edit smart boxes as well, in much the same way as the user would create regular components and containers. For example, WBS editor 30 may provide sets of possibly predefined smart boxes as part of the regular component palette displayed by WBS editor 30 as described in more detail herein below.

The discussion below focuses on an implementation of WBS editor 30 as implemented in the realm of website building systems. However in alternative embodiments, WBS editor 30 may be implemented in various visual design systems and other environments which are used for web-related and non-web related purposes such as specific site or application creation tools, blog creation tools, systems used to create and modify mobile device applications (such as Smartphone apps), native application building systems for mobile, desktop, client-server or other environments, non-browser web application development environments (for use with environments such as the Adobe flash player commercially available from Adobe.com) and plug-in development environments, systems which create plug-ins and other add-on elements for other systems (web browsers or otherwise).

WBS editor 30 may be also implemented with shopbuilders, systems used to create e-shops (or e-commerce sites), systems used to edit pages within social networks or other presence-providing platforms, multi-target visual design systems, visual design systems which create applications for multiple platform types and application conversion and import tools.

Figure 4A:
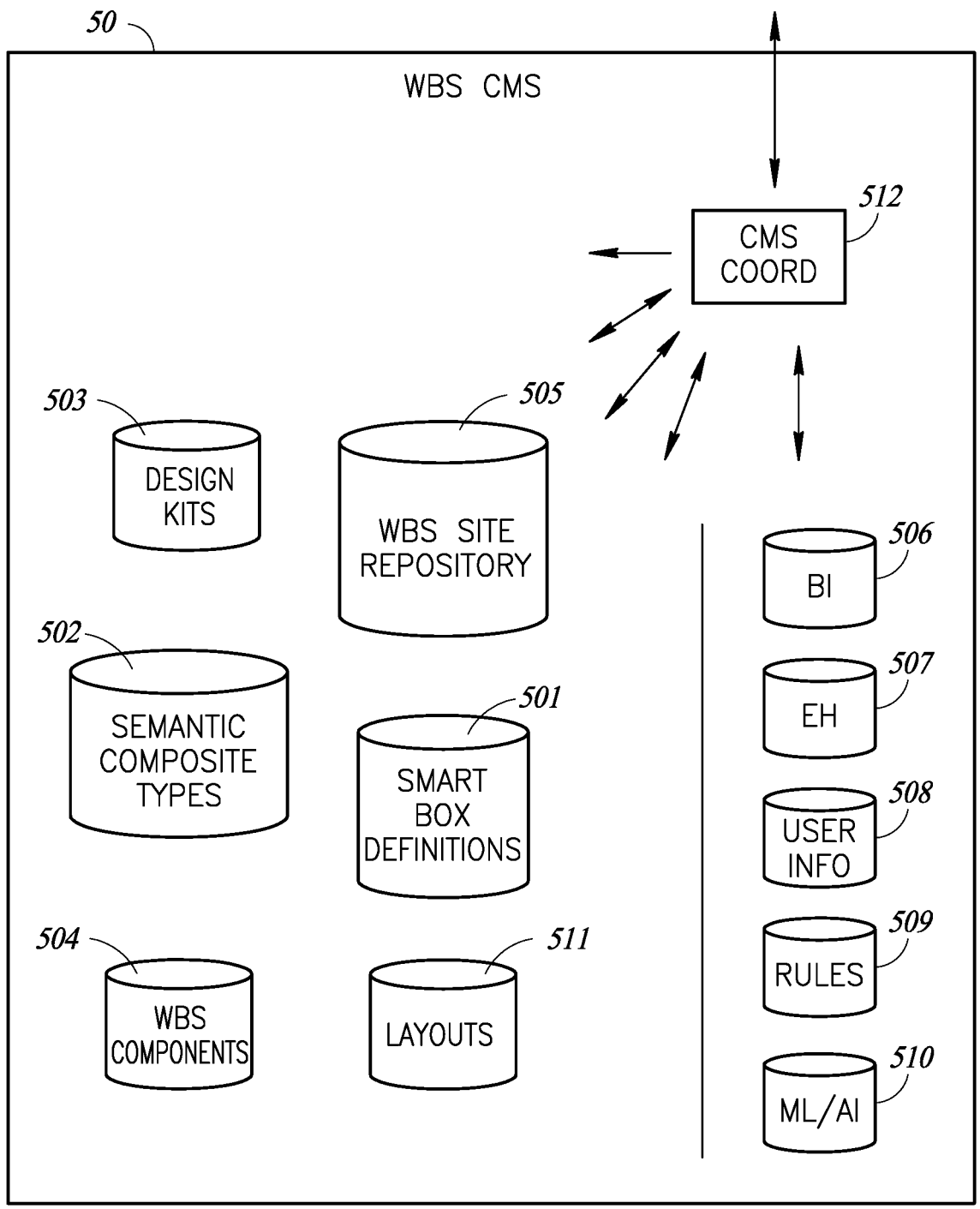
FIG. 4A is a schematic illustration of the elements of the content management system of FIG. 1; constructed and operative in accordance with the present invention.

As discussed herein above, a semantic composite may be based on page components as well as other sources (e.g. inter-component anchors, component editing history, component attributes, content or feature analysis, heuristics or machine learning techniques and more). Content management system 50 may hold all forms of content and layout pertinent to website building system 5 as is illustrated in FIG. 4A to which reference is now made. Content management system 50 may comprise a smart box definitions repository 501, a semantic composite types repository 502, a design kit repository 503, a WBS (website building system) component repository 504, a WBS site repository 505, a business intelligence repository 506, an editing history repository 507, a user information repository 508, a rules repository 509, a ML/AI (machine learning/artificial intelligence) repository 510, a layouts repository 511 and a content management system coordinator 512 to coordinate data between content management system 50 and system 100.

WBS site repository 505 may include both generated sites (created by site generation system 40) and other WBS sites (created by WBS editor 30 or other means, such as direct conversion from other systems). It will be appreciated that the categories are not distinct, as generated sites may be further edited by WBS editor 30.

WBS component repository 504 may include the website building system 5 component type definitions, i.e. may describe the parameters and properties of the various elements types (such as text component, media components, containers and complex components such as galleries, sliders and third party applications). These component type definitions are in turn used by WBS editor 30 to provide interactive direct editing of sites (e.g. allowing visual WYSIWYG editing of pages) as described in more detail herein below. These component types are also used as the basic building blocks of the various layout elements types generated by the site generation system 40 described above.

Rules repository 509 may store all rules pertaining to semantic decomposition, layout calculations etc. as described in more detail herein below.

Figure 4B:
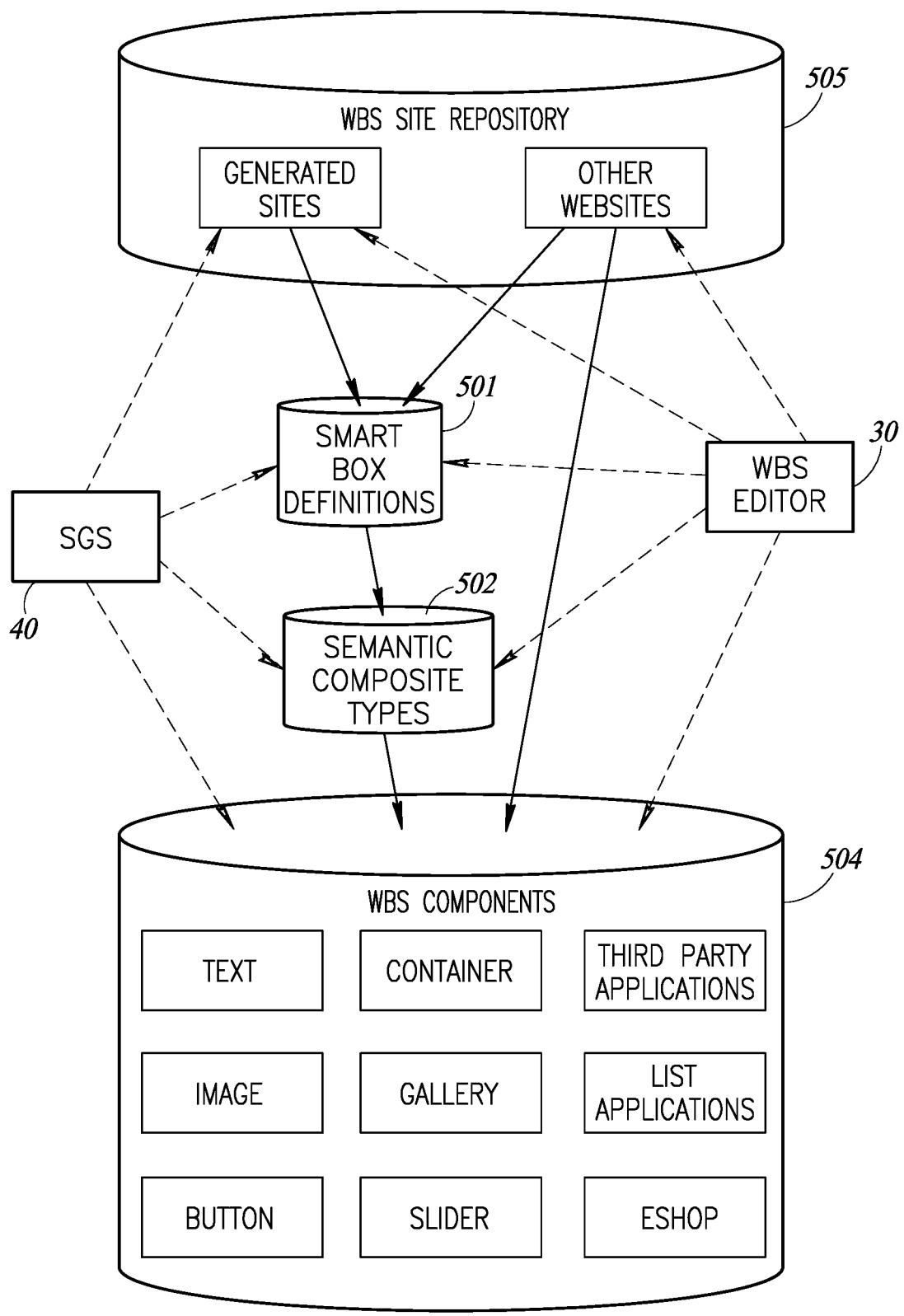
FIG. 4B is a schematic illustration of the relationships between the repositories of FIG. 3A and their editing options, constructed and operative in accordance with the present invention.

Reference is now made to FIG. 4B which illustrates the relationships between the repositories of FIG. 4A and their editing options and their use of smart box definitions and semantic composite types as discussed in more detail herein below.

Content management system 50 may be implemented using a single database or multiple databases, based on one or more servers or server farms. The content of content management system 50 may be apportioned based on a logical relation (e.g. keeping information related to a single site together), geography, connectivity (e.g. available bandwidth), security, user profile, data profile, access profile or other parameters.

It will be appreciated that WBS editor 30 may perform semantic decomposition to create smart boxes (i.e. semantic composite instances). It will also be appreciated that WBS editor 30 may create or modify smart boxes in multiple ways.

Figure 5:
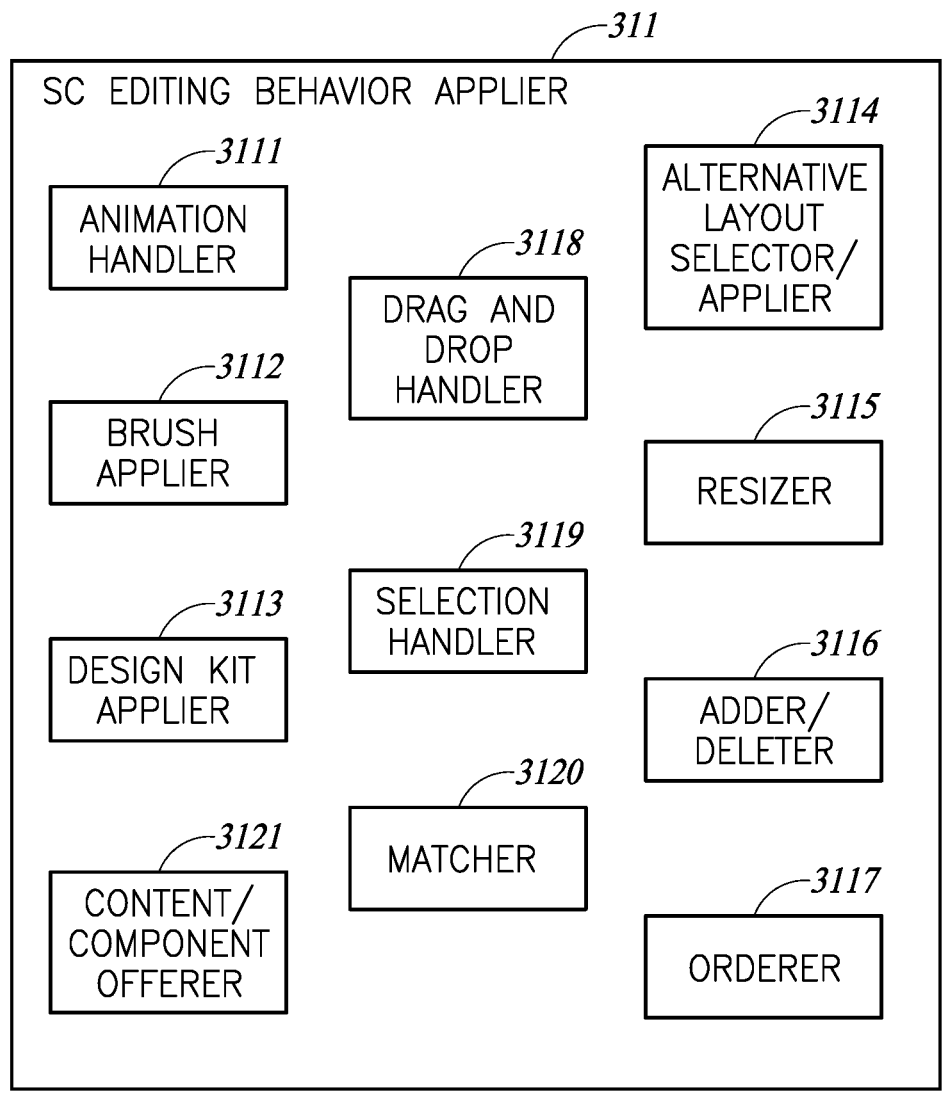
FIG. 5 is a schematic illustration of the elements of semantic composite editing behavior applier of FIG. 3, constructed and operative in accordance with the present invention.

Reference is now made to FIG. 5 which illustrates the elements of SC editing behavior applier 311. It will be appreciated that the functionality of the elements of SC editing behavior applier 311 are also applicable to RT SC behavior applier 221, SEF SEO and SC behavior applier 231 and site map SEO and SC behavior applier 241. SC editing behavior applier 311 may comprise an animation handler 3111, a brush applier 3112, a design kit applier 3113, an alternative layout selector/applier 3114, a resizer 3115, an adder/deleter 3116, an orderer 3117, a drag and drop handler 3118, a selection handler 3119, a matcher 3120 and a content/component offerer 3121.

Animation handler 3111 may propose and apply semantic composite specific animation, brush applier 3112 may apply a semantic brush and design kit applier 3113 may propose relevant design kits based on design kits repository 503 containing (for example) design kits prepared by WBS vendor staff 61. Alternative layout selector/applier 3114 may propose and apply alternative layouts, resizer 3115 may handle semantic composite specific resizing, adder/deleter 3116 may add or delete an item in a list, orderer 3117 may reorder items in a list, drag and drop handler 3118 may handle drag and drop functionality, selection handler 3119 may handle semantic composite selection, matcher 3120 may perform composite matching and content/component offerer 3121 may offer additional or alternative components and content. The function of these elements is described in more detail herein below.

Figure 6:
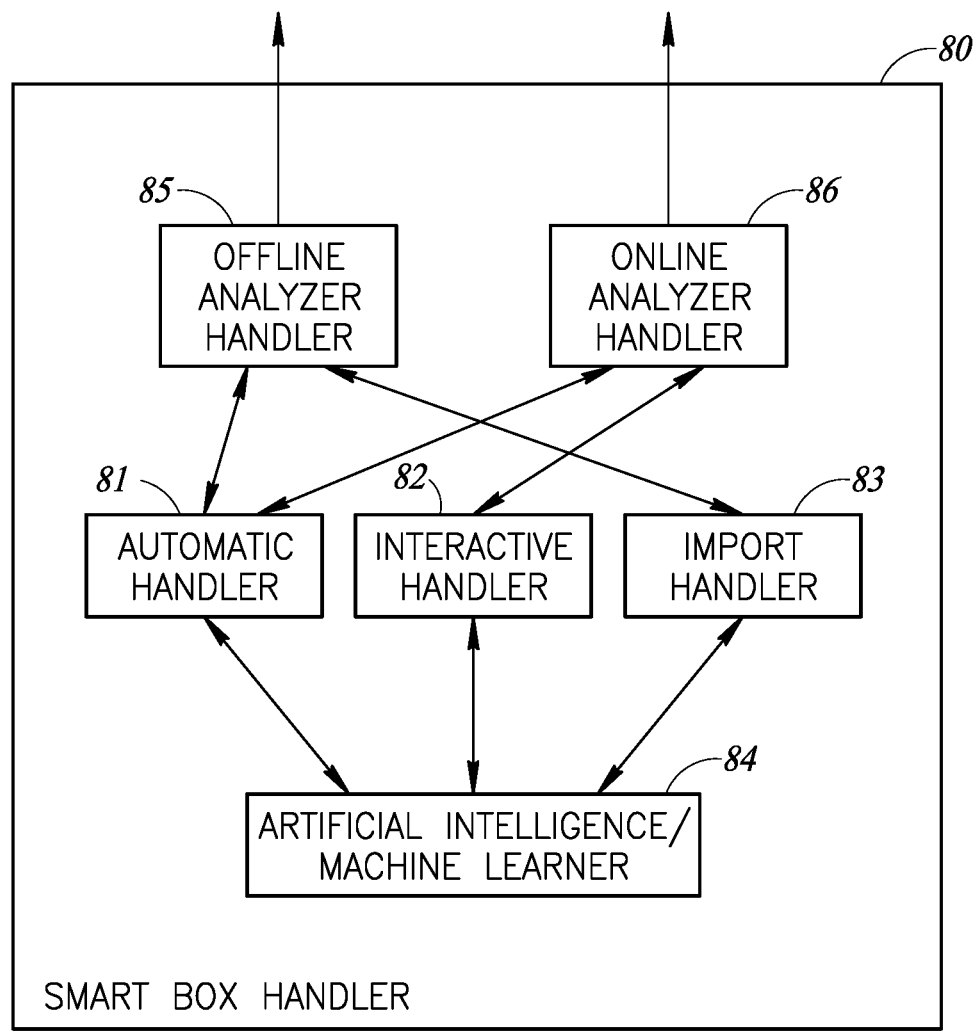
FIG. 6 is a schematic illustration of the elements of the smart box handler of FIG. 1, constructed and operative in accordance with the present invention.

Reference is now made to FIG. 6 which illustrates the elements of smart box handler 80. Smart box handler 80 may comprise an automatic handler 81, an interactive handler 82, an import handler 83, an artificial intelligence (AI)/machine learner (ML) 84, an offline analyzer/handler 85 and an online analyzer/handler 86.

Automatic handler 81 may perform semantic decomposition based on the analysis of an existing page. Automatic handler 81 may analyze an edited page (during an editing session or post editing session such as saving) to perform semantic decomposition. Interactive handler 82 may be used by a site designer to manually configure a semantic decomposition (i.e. define which components are included in a smart box or other smart boxes within a smart box), import handler 83 may import and classify semantic decomposition definitions from external systems 70 and site generation system 40 and artificial intelligence/machine learner 84 and may perform analysis based on user activity and analysis of other web sites and pages. Offline analyzer/handler 85 may work with automatic handler 81 and import handler 83 to provide batch offline processing and semantic decomposition from external sites and sites held within content management system 50. Online analyzer/handler 86 may work with automatic handler 81 and interactive handler 82 to provide online processing and semantic decomposition. The functionality of these elements is discussed in more detail herein below.

Automatic handler 81 may create a semantic decomposition for an existing component-based page. The decomposition process may be based on semantic knowledge extracted from the page's components as well as other sources (e.g. inter-component anchors, component editing history, business information, component attributes, content analysis and more) as described herein above.

A user may also create pages containing both regular components and smart boxes. Furthermore, semantic composite sensitive editor 31 may allow regular components and smart boxes to overlap, and may allow various forms of mixing of the two component classes (e.g. adding a regular component inside a smart box). Alternatively, interactive handler 82 may be used by site designer 62 to manually configure a semantic decomposition.

Import handler 83 may also perform semantic decomposition based as part of a page generation process. It will be appreciated that site generation system 40 may generate pages together with their semantic decomposition as discussed in U.S. patent application Ser. No. 15/607,586 which describes a system to generate websites based on information extracted or provided about the underlying business. The generated sites consist of multi-component layout elements which may be regarded as smart boxes by editor 30.

Figure 15A:
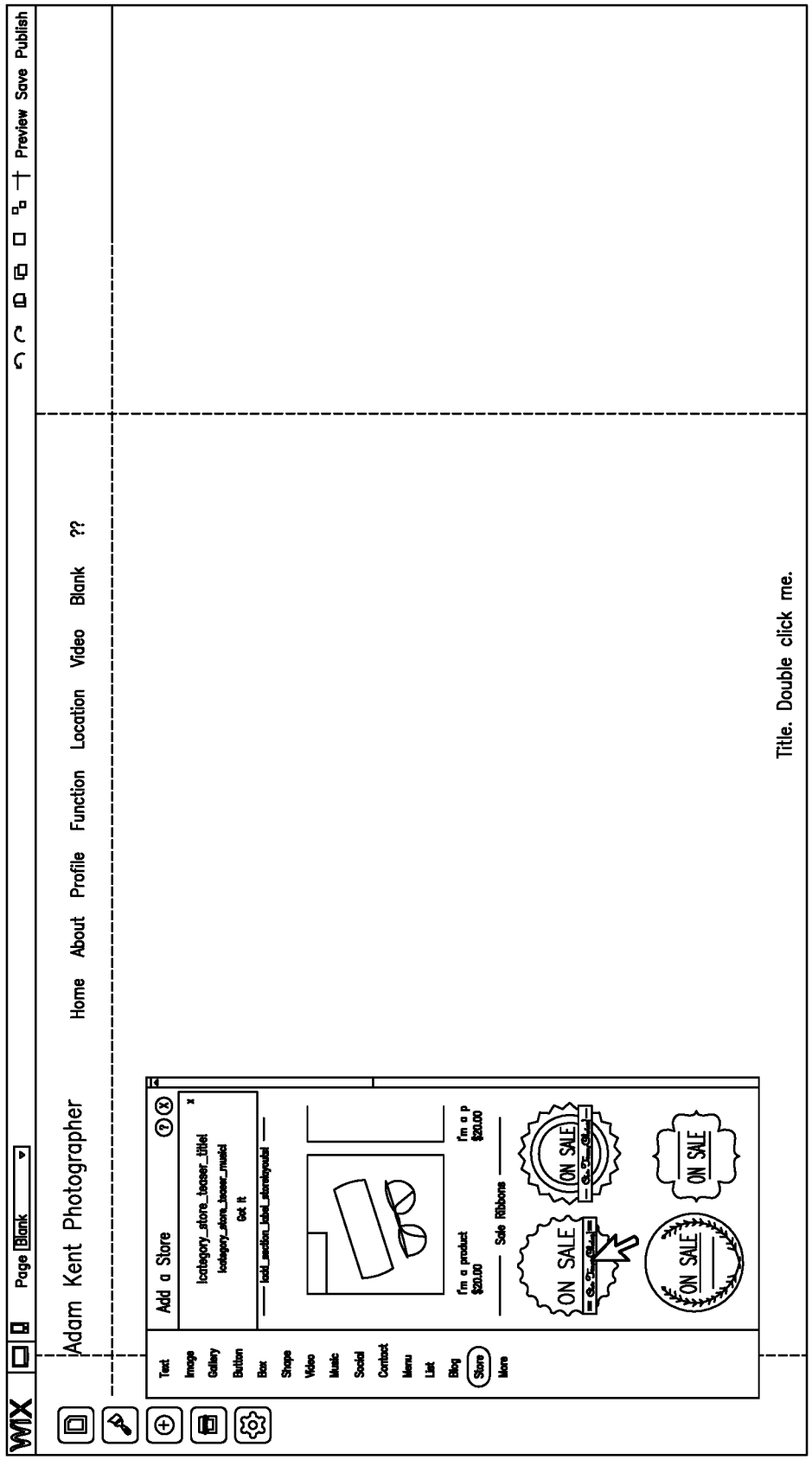
FIGS. 15A-15F are schematic illustrations of the editing of a sales ribbon smart box, constructed and operative in accordance with the present invention.
Figure 16A:
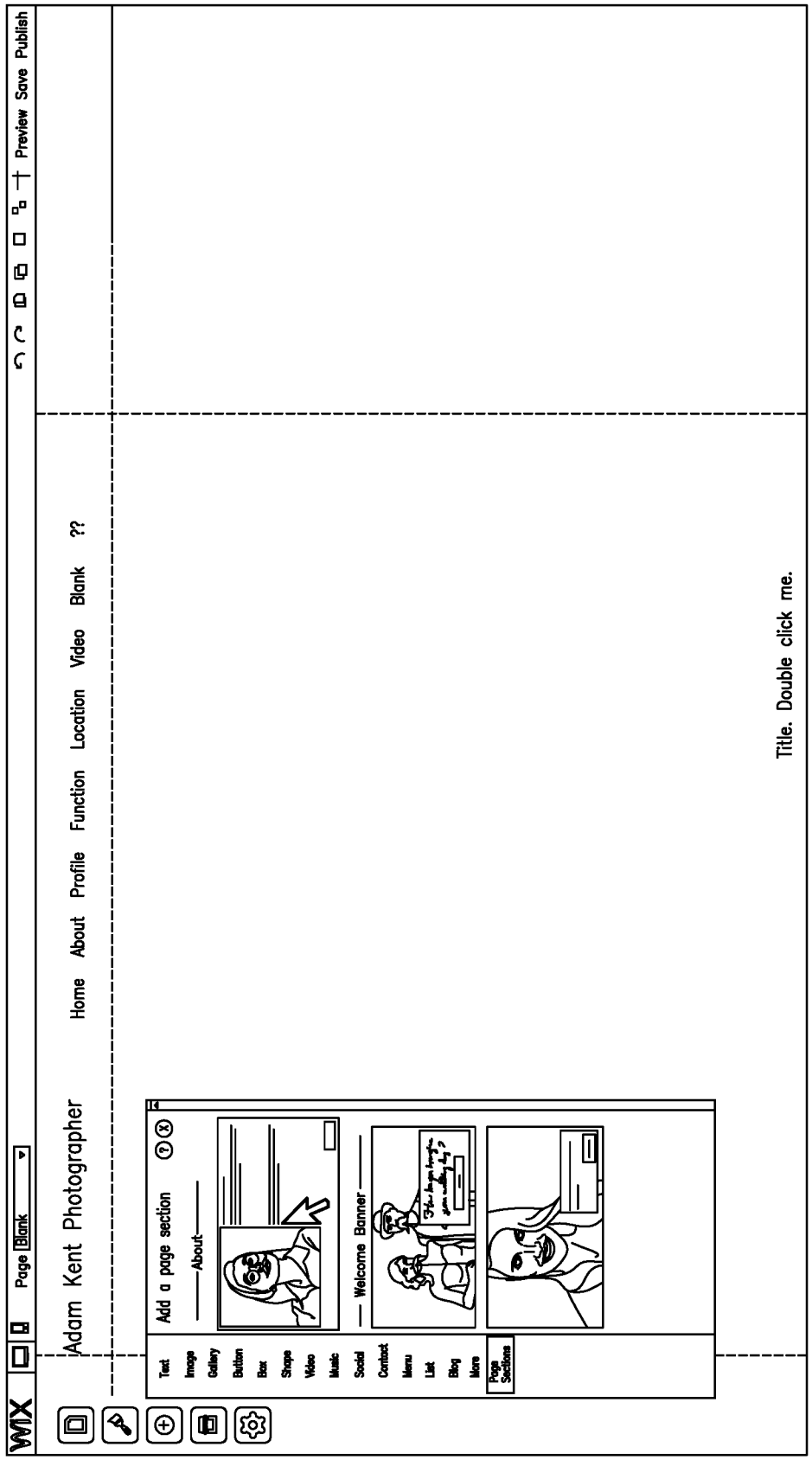
FIGS. 16A-16F are schematic illustrations of the editing of an "About" smart box, constructed and operative in accordance with the present invention.
Figure 17A:
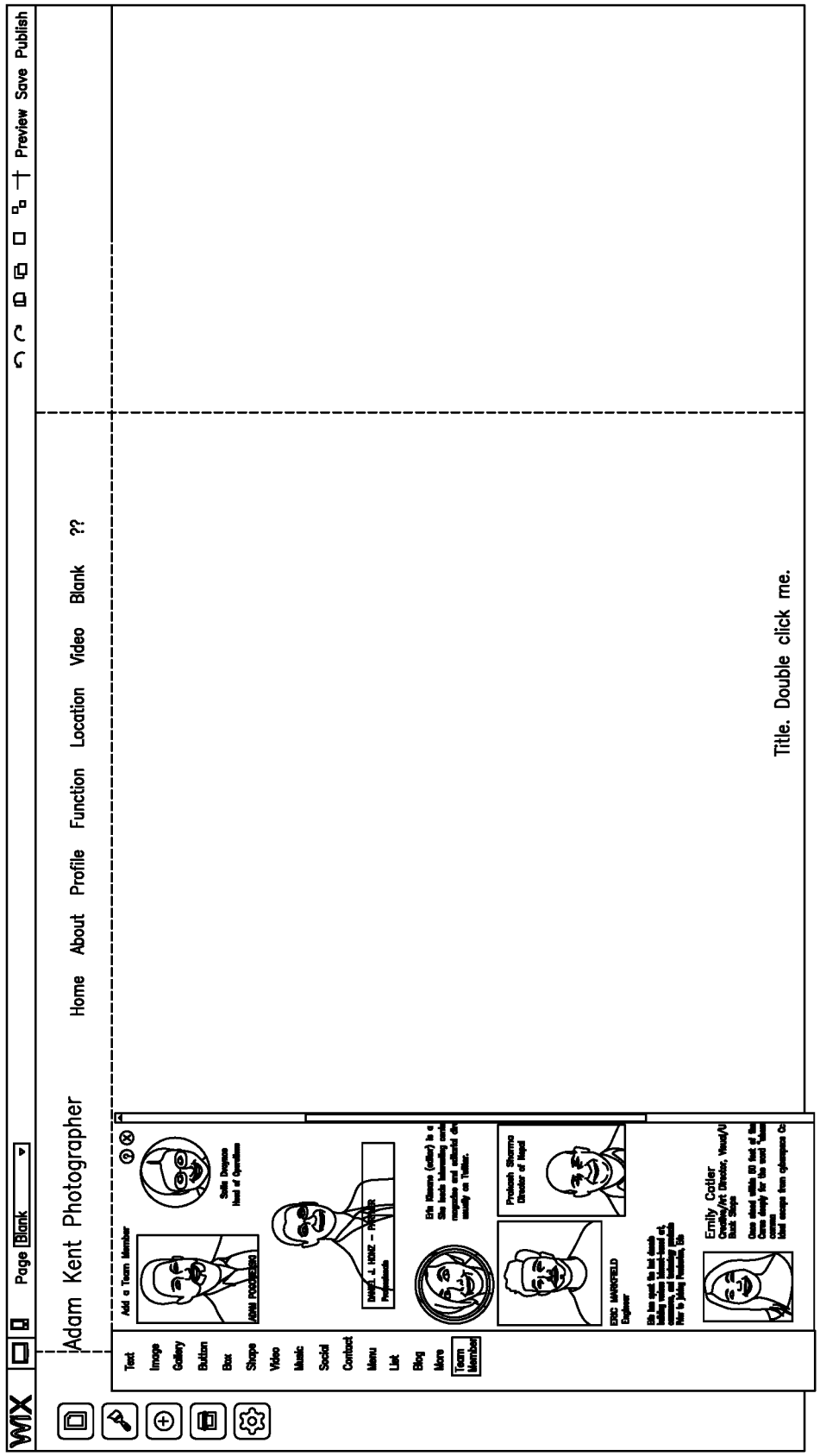

WBS editor 30 may also perform semantic decomposition based on manual classification editing. Semantic composite sensitive editor 31 may also allow the user to review smart box classification assignments (from smart box handler 80), and manually modify the smart box classification via interactive handler 82. For example, the user may view a smart box classified by smart box handler 80 as a "employee description" and remove the definition entirely, or alter it to another smart box type (i.e. semantic composite) selected from a list of relevant smart boxes for the given component collection (such as "visitor description"). WBS editor 30 may also allow the user to add smart boxes directly, e.g. by selecting specific smart box types (i.e. semantic composite) from WBS editor 30's "add object" menu, the same way a regular component could be added. An example user interface offering the user to add smart box is illustrated in FIGS. 15A, 16A and 17A. An example user interface offering the user an option to alter an existing smart box to another smart box type is illustrated in FIGS. 14B, 17C, 17D and 17E and described in more detail herein below.

It will be appreciated that for all the above-mentioned methods, updater 90 may update a semantic decomposition over time as the page is being updated, e.g. by activating automatic handler 81 during editing as components are edited and modified.

WBS editor 30 may also provide additional methods, or methods which combine any of the methods above. For example, editor 30 may allow a user to edit pages containing both regular components (and containers) as well as smart boxes. However, WBS editor 30 may also perform on-the-fly analysis of the edited components, and transform created component sets into smart boxes when relevant.

Alternatively, instead of editing or creating semantic composites, import handler 83 may import semantic decomposition definitions from external systems 70, or WBS editor 30 may allow adding semantic composites from the object marketplace 15 as described in more detail herein below.

Figure 7:
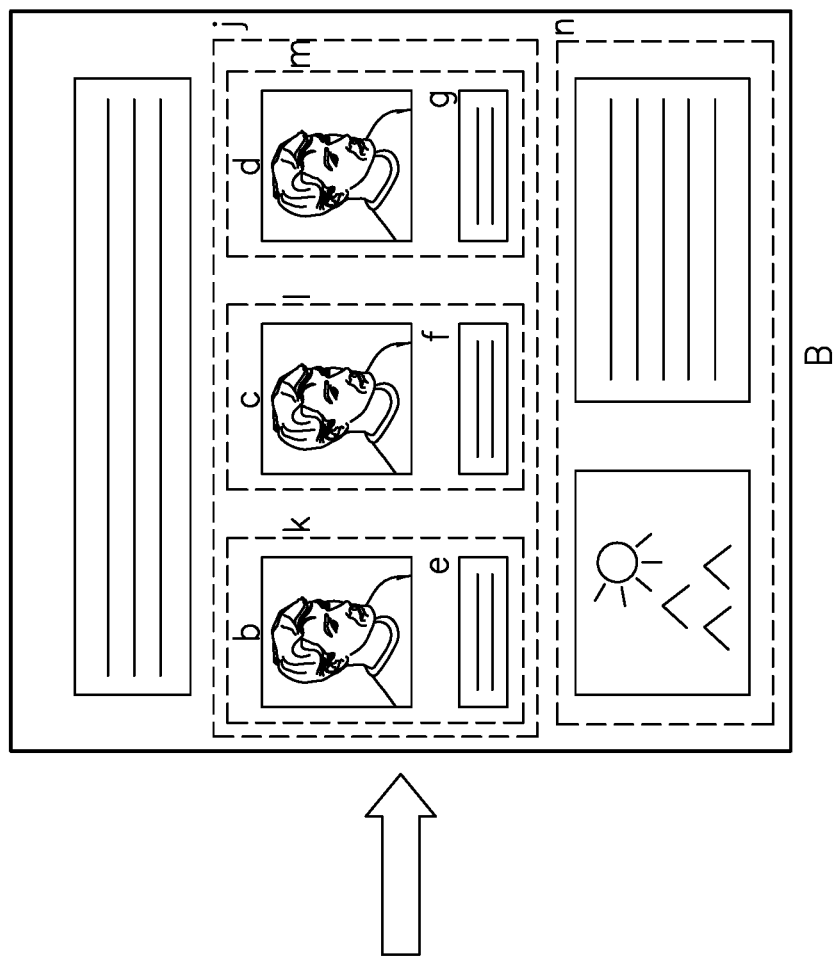
FIG. 7 is a schematic illustration of a sample analysis process converting a page into its semantic decomposition; constructed and operative in accordance with the present invention.
Figure 7:
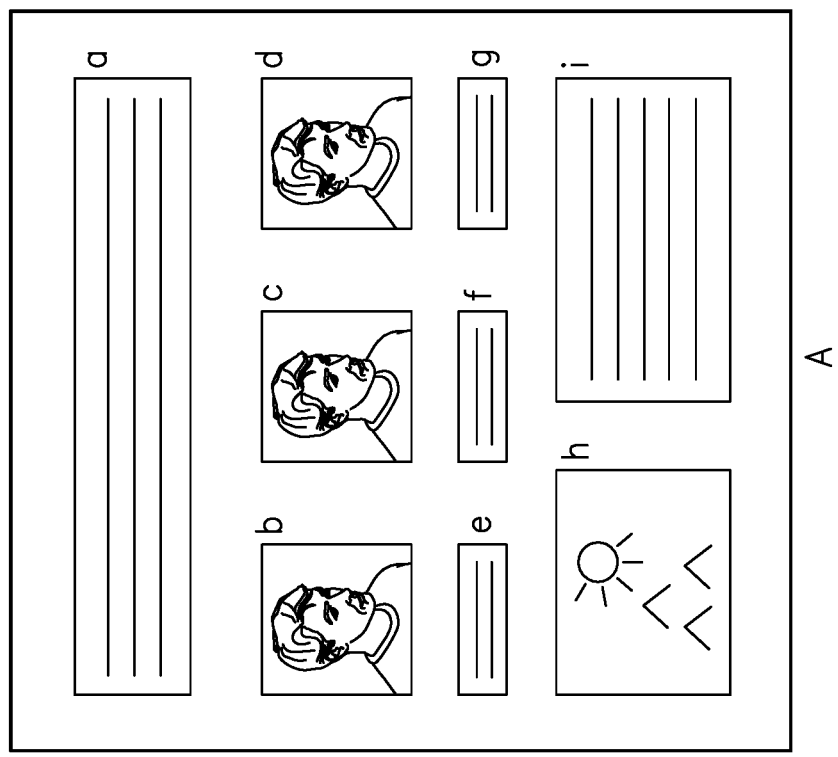

Reference is now made to FIG. 7 which illustrates the processes performed by automatic handler 81 when creating the semantic decomposition through the analysis of an existing page. As is shown, in plate [A], a page is shown which includes 9 components: 5 text components [a,e,f,g,i] and 4 picture components [b,c,d,h].

Automatic handler 81 may analyze the page, using (for example) an analysis of the components' size, positions, relative positions (to each other) and possibly text and picture content. Automatic handler 81 may further consult business information stored in business intelligence repository 506 regarding the owner of the specific page. Based on this analysis, automatic handler 81 may determine that:

Each of the 3 pairs [b,e], [c,f] and [d,g] is a [picture+associated caption] combination and that in particular, these 3 pairs are sets of a picture of a person together with the person's name. It will be appreciated that in this scenario, these 3 persons are the in fact the 3 partners in a specific organization (e.g. law office, partnership) which own the site to which this page belongs. Automatic handler 81 may also determine that the text component [i] includes a description of the scene shown in the picture component [h].

Based on this analysis, automatic handler 81 may create an internal representation in which smart boxes are defined (and shown as virtual containers in plate [B] of FIG. 7). Thus, automatic handler 81 may define:

Three [Team member] smart boxes: [k] containing [b,e], [l] containing [c,f] and [m] containing [d,g].

A [Team member list] smart box[j] containing [k,l,m].

An [Image+description] smart box [n] containing [h,i].

Figure 8:
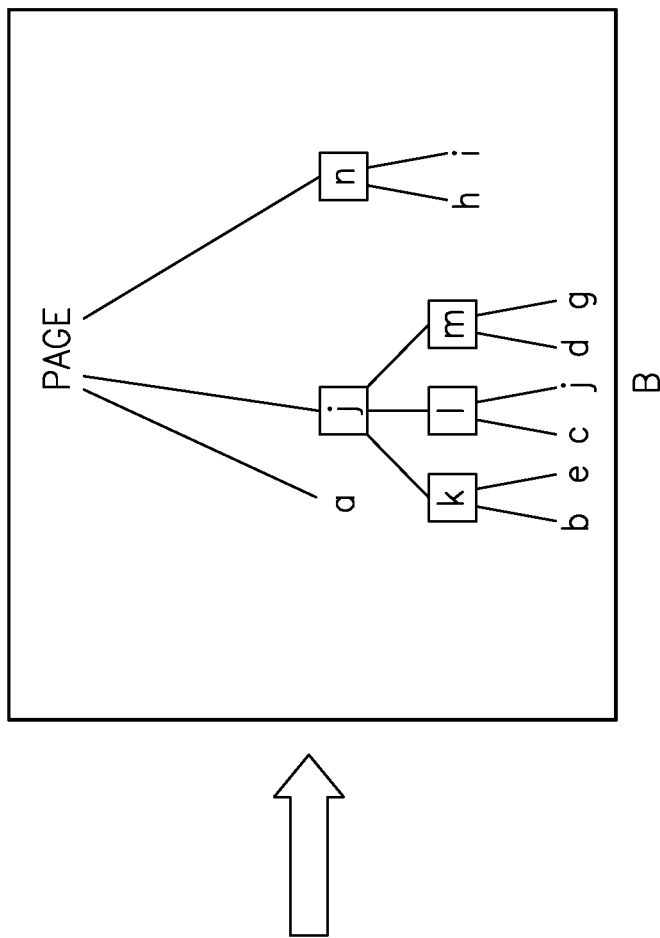
FIG. 8 is a schematic illustration of an internal tree representation of the elements and analysis results in of FIG. 1, constructed and operative in accordance with the present invention.
Figure 8:
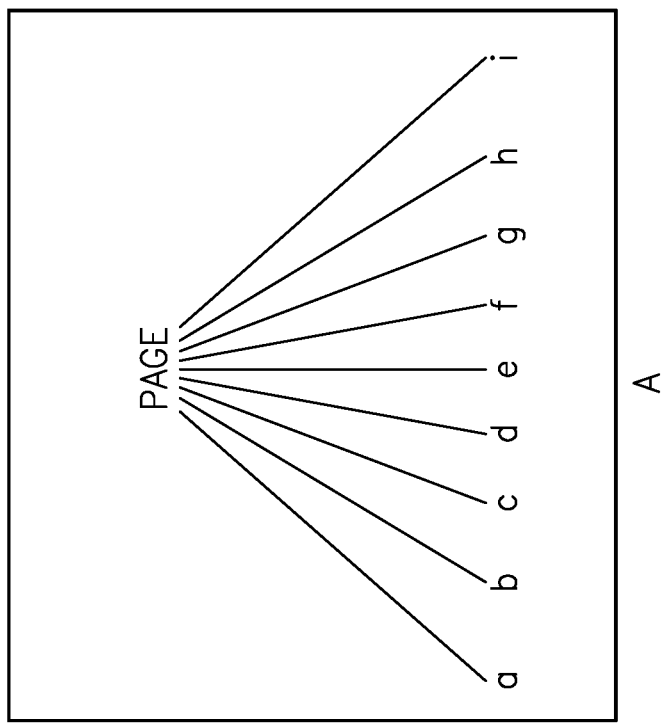

It will be appreciated that the two different representations may also be represented (internally) using element trees, as illustrated in FIG. 8 to which reference is now made which provides the matching tree-based breakdown of the two plates [A] and [B] of FIG. 7.

In an alternative embodiment, system 100 may not have the business information on the web site and automatic handler 81 may perform its analysis based on other available information (such as component geometrical properties, content, visual attributes and editing history etc. as stored in content management system 50). In this embodiment, automatic handler 81 may be limited to elementary semantic composites (and not conceptual semantic composites), and may only create [image+caption] smart boxes [k,l,m] and [image+description] smart boxes[n]. In this scenario, automatic handler 81 may not be able to create or define a parallel to the [Team member list] smart box [j] based on underlying business information. However, it may still be able to know if the 3 [image+caption] smart boxes [k,l,m] are related to each other, and in what way, and possibly infer addition information, based (for example) on geometrical similarity, order etc. Automatic handler 81 may also use information from artificial intelligence/machine learner 36 to infer that each [image+description] set describes a person.

It will be appreciated that in both analyses as described herein above, component [a] (a single text component) does not match any semantic composite definition, and is left as a "regular" (non-smart box) component in the smart box hierarchy.

It will be appreciated that a layout is a specification of an arrangement of a set of components, including component attributes such as: position (X, Y), size (height, width), rotation, priority (Z-order) and dynamic layout anchors as described in US Patent Publication No. 2013-0219263.

It will be further appreciated that some embodiments of system 100 may only support non-hierarchical (one level) layouts, whereas other embodiments support hierarchical layouts (which include contained elements at multiple levels). In such hierarchical layouts, the layout information may also include the containment hierarchy information.

A layout does not include non-geometrical attributes, such as component type or content. However, additional component attributes may be associated with the layout (but are more often properties of the semantic composite or smart box with which the layout is associated) such as repeater-related attributes, e.g. for a grid-style repeater: # of rows, # of columns, H/V spacing. These are typically properties of the smart box.

Other component attributes may include component frame information (i.e. frame type, bevel parameters) which are typically properties of the smart box and additional decorative elements, such as a divider line.

For list-type layouts, attributes may include the order of the components, the list organization, horizontal, vertical, grid, circular, etc. as well as indications as to what components data is exported for editing. For example, in a semantic composite which describes an image with caption, WBS editor 30 may expose for editing only the text and the image URL, and not expose the cropping mode of the image, which is part of the image data as well.

Other attributes may include actions that can be performed on the semantic composite, styles that can be applied to the semantic composite (or its specific elements) and animations applied to the semantic composite. An example user interface to select alternative styles for a smart box is illustrated in FIGS. 17F and 17G and is described in more detail herein below.

It will be appreciated that a layout (in this context) is generally defined using absolute values for x/y/h/w (e.g.

relative to the top left corner of the containing area/container/page). However, the essence of the layout is in the relative arrangement and size of the various components, i.e. how each component relates to the other components in the layout.

Thus, system 100 may support relatively defined layouts which are calculated dynamically based on relative component arrangement, the actual component definitions and the dimensions of the box containing the component arrangement. Thus, such relatively defined layouts are relative to the dimensions of the enclosing box.

For example, when applying a relatively defined layout A to an existing component set B (as describe in more detail herein below), layout compiler 33 may move and resize the frame areas inside A (keeping the relative positions and sizes of the elements) so to better fit the component set B.

In another embodiment, WBS editor 30 may define a layout definition language that may allow a layout to be defined in a natural and abstract language. For example, a layout for a smart box containing an image, a title and a description may be defined in the following way:
Title: first
Image: after Title
Description: after Image It will be appreciated that layout compiler 33 may read the layout definition language description to produce a detailed layout definition used by the rest of system 100. Layout compiler 33 may start by getting the height and width of the box containing the layouts. From there, layout compiler 33 may determine if the component flow is horizontal (if width>>height) or vertical (otherwise). It will be appreciated that layout compiler 33 may also allow the flow direction to be explicitly specified, and may support additional flow types.

After determining the flow, layout compiler 33 may create a layout based on the following guidelines: if the flow is "vertical", start by placing the title "first" (which in this scenario means "top"), then place the image "after title", which means in vertical flow "below the title" and then place the description the same way.

It will be appreciated that layout compiler 33 may support additional "position directives" that can be used to mark that a given component be put on top/bottom/left/right regardless of the flow direction, or that a given component be placed in the center of the containing box.

Layout compiler 33 may also support "size directives" that can guide layout compiler 33 to define the size allocated to the components. If there are no such size directives, layout compiler 33 may use default rules (such as preserving of aspect ratio for images, full width/height for texts etc.). Size directives may define the width in absolute terms, relative to the available screen (or other containing area) size etc.

Components may have size constraints (minimal, maximal or fixed) which may be used when generating layouts, and may also be used when resizing the component or the smart box containing it.

It will be appreciated that layout compiler 33 may generate multiple layout alternatives based on the relative layout rules and the defined components, and discard generated layout alternatives which violate specific constraints and design rules (including possibly interfering with external components or overlapping them).

Layout compiler 33 may generate layout information (x,y,w,h) for each component. Layout compiler 33 may then perform a validation process so to verify that the output layout is valid, e.g. there are no overlapping components (if such a condition is requested), no component exceeding the box boundaries etc. For each semantic composite, several layout rules can be defined (and stored in rules repository 509), so that if the layout is invalid, layout compiler 33 may try the next layout guidelines on the line. Layout compiler 33 may typically refrain from generating intersecting components, as Applicant has realized that such overlapping typically leads to problematic layouts.

It will be appreciated that each element containing components (e.g., pages, smart boxes and other containers) has a current layout, the layout of the elements currently contained in it.

It will also be appreciated that each semantic composite may be associated with one or more associated layouts which can be offered to a user (as alternative layouts), selected and applied to any smart box matching the semantic composite by alternative layout selector/applier 3114 (thus replacing the current layout). These layouts can be collected from several sources, as further discussed herein below.

It will be appreciated that different smart boxes matching the same semantic composite can still use different layouts (except possibly inside strict repeater semantic composites as described in more detail herein below).

System 100 may also support a mechanism whereby layouts may be applied to component sets (in a smart box) which do not match the layout exactly (e.g. have additional or missing components to those specified by the layout). To do this, alternative layout selector/applier 3114 may modify an associated layout before applying it, for example, extending it by placing extra components which were added to the smart box (in addition to the semantic composite mandated components).

Thus, a layout definition may include dedicated "landing zones" for such an added component (as discussed in US Patent Publication 2014/0282218 entitled "Device, System, and Method of Website Building by Utilizing Data Lists", published 13 Mar. 2014 and assigned to the common assignee of the present invention). Additional such adaptation mechanisms are described US Patent Publication 2015/0310124 entitled "System and Method for the Creation and Use of Visually-Diverse High-Quality Dynamic Layouts", published 29 Oct. 2015 and assigned to the common assignee of the present invention. The smart box may include (in addition to the current layout used) a list of specific modifications made to the layout, such as the addition or removal of components.

It will be appreciated that the adaptation described above is done at the smart box (instance) level and not the semantic composite (type/schema) level, i.e. semantic composite sensitive editor 31 may create a local variant, leaving the semantic composite unmodified.

Furthermore, during editing, when a component is added to a given smart box, the smart box may adopt to the new composition (component set) by changing to a layout that will include the newly added component.

It will be appreciated that a container is a page element (often called "box" in the UI) which can contain other elements (which could be containers themselves) similar to an HTML <DIV> tag.

A container may be single-page or multi-page container (which contains multiple "component pages" also known as mini-pages). A container definition is permanent (persistent from session to session). Moving the container during editing may result in matching movement of its inner elements, i.e. the inner elements locations are defined relative to the containing container. WBS editor 30 may allow placement of components which intersect a container or are geometrically within it, but are not regarded as contained.

Components may be moved into or out of the container. Website building system 5 may have multiple container types, differing in their visual (or other) attributes. A container is generally agnostic of the types of components it contains as a container can contain any combination of components. However, system 100 may define container types (such as an "image gallery container") which may have limitations on the types of contained components.

It will be appreciated that a group is a set of components which are explicitly grouped together by the user, so they can be handled as a single component. The components may be regular (atomic) components, or may be containers. A group's layout is determined by its grouped components layout information (x,y,h,w).

A group definition may be initiated by the user (e.g. by selecting the components and choosing a "group together" operation), or may be initiated by WBS editor 30 (which may suggest a possible group based for example on analysis of the components) and approved by the user. System 100 may also create group definitions in a completely automated manner, without requiring user approval, for example if the described analysis results in a group definition with a very high level of certainty.

Selection and drag of the group will result in the movement of all group components together. Resizing and rotating will apply to all components, and will typically move them as well so to retain the groups' original relative arrangement.

A group may also be implemented by a transparent container. Components interspersed between the groups' components do not become contained in the group (and the implementing container if any), even if they overlap the groups' area or any of the group's components. Thus, if a group is implemented using a transparent container, the container must support having components which overlap the container but are not contained in it (i.e. containment and overlapping are separate relationships).

It will also be appreciated that a group may be temporary, i.e. the group definitions are only used temporarily for a specific editing operation, similar to a block selection in a word processor (e.g. for copy/paste) though not necessarily contiguous. In this scenario, the group's definition may disappear immediately after an operation (such as rotate group) has been performed. Such a grouping is like a multi-selection option, but may be somewhat more persistent, e.g. it may remain active during a multi-stage editing operation which would cause a multiple selection to disappear.

A group may also be session-based, i.e. a group definition is retained throughout the session or permanent, i.e. the group definition is recorded in the underlying website building system database and is persistent from session to session.

It will be appreciated that system 100 may allow a group definition to be transformed into a smart box (e.g. an instance element) or even a semantic composite (which could be used in other places). WBS editor 30 may further allow the group definition to be edited when converted into a smart box or semantic composite (e.g. allowing adding features and properties to the group).

In all cases, website building system 5 may typically provide the required operations, such as "group", "ungroup", "add to group" and "remove from group".

As discussed herein above, a semantic composite is data type or schema describing a set of elements which form a unit having a unique and synergic meaning. The elements may be page components, containers or other semantic composites.

The semantic composite may describe the actual set of elements, or describe a container containing them. As discussed herein above, system 100 may support lower-level elementary semantic composites and higher-level conceptual semantic composites.

A semantic composite may have a set of associated layouts. Each semantic composite instance may use a different layout from the layout set. Multiple instances of the same semantic composite may have different layouts and the layout of a semantic composite instance may be edited without "losing" the semantic composite connection.

It will be appreciated that the semantic composite is typically a "node-level" rather than "tree-level" entity, it describes a single hierarchy level (e.g. "a list") rather than multiple levels (e.g. "a list, each of whose members is a picture+caption pair").

However, a semantic composite may impose some conditions on its member components "down the tree", for example, a list semantic composite may require that all its member components (list members) have the same semantic composite themselves (i.e. all have the same inner sets of components). A semantic composite may also implement operations which consider or affect lower level components (e.g. "adapt all contained list items to a given layout"). The semantic composite defines a set of possible customizations, operations and behaviors as discussed in more detail herein below.

As discussed herein above, a smart box is a container (or a set of components) which matches a specific semantic composite, i.e. it is an instance of that semantic composite. Thus, a smart box is aware of its semantic role, and can apply the customizations and behaviors of the semantic composite to its container and its inner elements.

A smart box has specific values for the matching semantic composite attributes. For example, a smart box which matches a grid semantic composite may have specific values for the "# of rows" and "# of columns" semantic composite attributes. As another example, a semantic composite may define an (abstract) list of elements, and a matching smart box may store the references to the actual list members and their order (among other things).

A complete page may also be classified as a smart box, having a matching semantic composite associated with it. This may be the entire page or the page without the main "site features" (such as site-level header and footer).

It will be appreciated that since semantic composites are typically arranged in multiple sets of hierarchies, smart boxes may also be arranged in one or more hierarchies.

A smart box may also be aware of the inner order (flow) of its children, e.g. if it implements a list of sub-elements. However, in many cases the smart box may not have this information. For example, a smart box may implement an "arbitrary collection of pictures" semantic composite, possibly even freely moveable by the end-user which doesn't have any intrinsic order among its components.

System 100 may also support a "soft conformance" to a semantic composite i.e. it is possible to have a smart box which conforms to a semantic composite "in general" with some modification (e.g. several additional extra components) but which is still regarded as being associated with the semantic composite. For example, system 100 may support a list smart box in which some members do not conform to the semantic composites of the standard list members.

As discussed herein above, some semantic composites may be repeater semantic composites i.e. consist of similar elements repeated in a regular or non-regular manner.

A repeater semantic composite may correspond to an actual repeater component, e.g. an image gallery defined in the web page by website building system 5. Alternatively, a repeater semantic composite may be identified and defined during analysis (as further described herein below) without having an actual corresponding repeater component, e.g. when Smart box handler 80 identifies an arrangement of similar elements and decides to classify them as a repeater semantic composite as discussed in more detail herein below.

Repeater semantic composites may be structured or unstructured. A structured repeater semantic composite is a repeater semantic composite whose elements must always have the same layout, format, size and position (i.e. arrangement). An unstructured repeater semantic composite is a repeater semantic composite in which each element can be edited separately, including changing its position, size, content, layout, format etc. System 100 may provide configuration options (via a UI or otherwise) to specify which changes are allowed. Thus, for example, a specific unstructured repeater semantic composite may allow size and position changes but not internal layout changes.

Smart box handler 80 may determine whether a repeater semantic composite is structured or not by analyzing the underlying repeater component. It may also determine whether it is structured or not based on direct specification by the user through the UI or an API of system 100 or through analysis of the different contained elements.

It will be appreciated that a repeater semantic composite has two types of layouts attached to it, a repeater level layout and an element level layout.

The repeater level layout specifies how the different elements are arranged inside the repeater semantic composite (e.g. as vertical list, horizontal list, N×M grid etc.). The repeater-level layout may be extendable and have a definite order, so that if elements are added or removed it is clear how the other elements are moved in the layout.

The element level layout specifies the internal composition of each of the elements in the repeater semantic composite.

Figure 9:
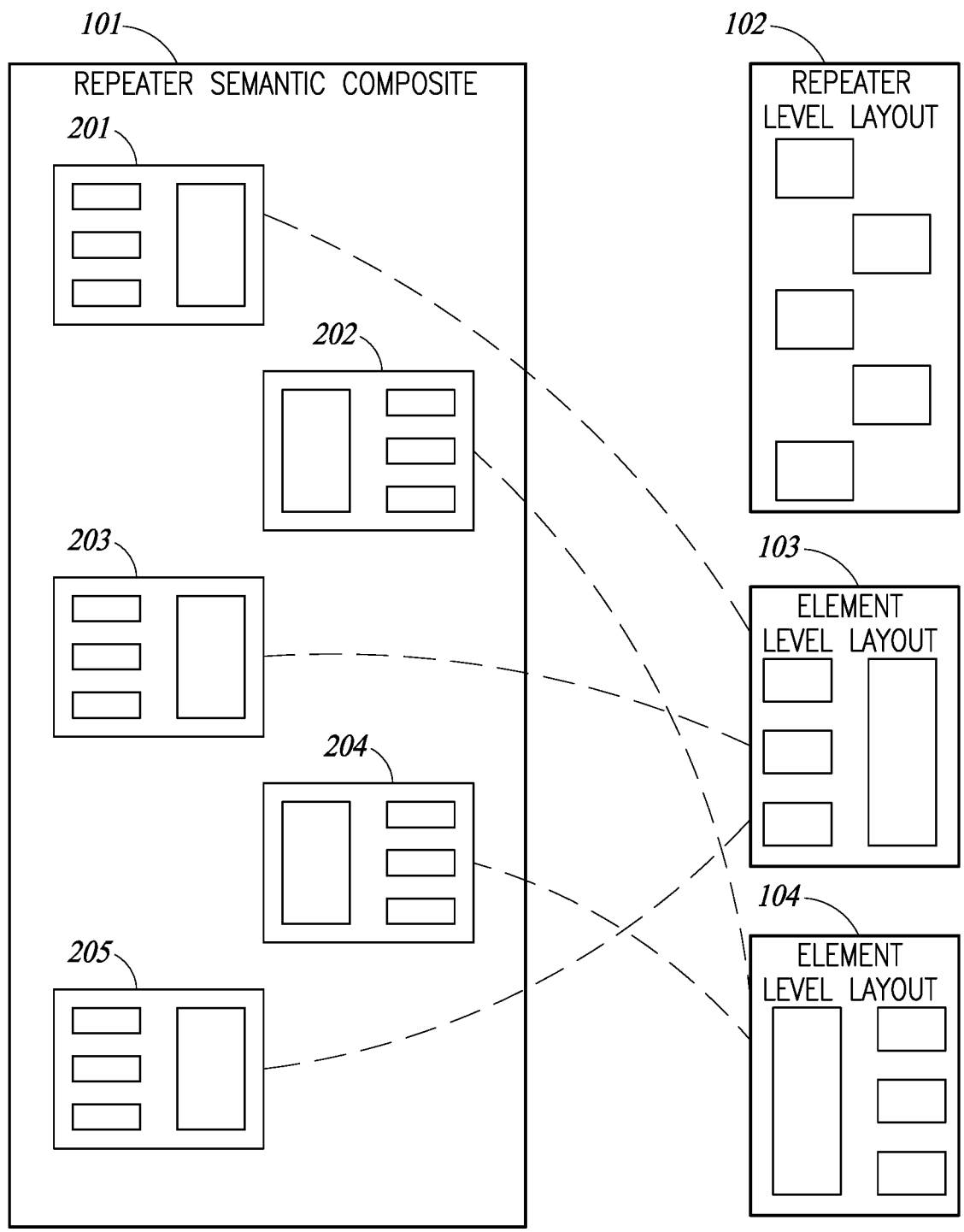
FIG. 9 is a schematic illustration of single repeater semantic composite which has multiple element-level layouts, constructed and operative in accordance with the present invention.

It will be appreciated that a single repeater semantic composite may in fact have multiple element level layouts. For example, and as illustrated in FIG. 9 to which reference is now made. As is shown, a repeater semantic composite 101 is a zebra type repeater semantic composite, i.e. contained list elements are alternatively right and left justified. Each of the sub-elements of repeater semantic composite 101 contains a picture and 3 text fields. However, left-justified elements (such as 201, 203 and 205) use element level layout 103 (with the picture on the right side of the element level layout). On the other hand, right-justified elements (such as 202 and 204) use element level layout 104 (with the picture on the left side of the element level layout).

System 100 may also support integration of (and dependency between) the repeater level layouts and the element level layouts possibly using multiple repeater level layouts. Thus system 100 may support a repeater semantic composite in which the repeater level layouts may either be a vertical or horizontal list. A vertical repeater level layout may use a right/left set of zebra element level layouts, and a horizontal repeater level layouts may similarly use a set of bottom/top element level layouts.

It will be appreciated that there are additional repeater semantic composite related capabilities (e.g. tying to database, re-ordering etc.) which are described in more detail herein below.

As discussed herein above, automatic handler 81 may analyze a page and may try to break it into collections of semantic composites. This could be an off-line process (performed on stored pages) or an on-line process (performed interactively as the user edits the pages).

It will be appreciated that not all components may become part of a semantic composite hierarchy. For example, automatic handler 81 may ignore background images and not include them in any analysis. Automatic handler 81 may further perform pre-processing and "clean up" to the page or page sections to prepare the page for semantic decomposition. Such pre-processing may be like the processing performed by preprocessor 201 as described in US Patent Publication No. 2015/0074516 or page analyzer 44 described in US Patent Publication 2015/0310124.

Furthermore, automatic handler 81 may recognize separate unrelated parts of the page, each of which has some structure, and may create multiple semantic composite hierarchies which are handled separately and are not connected to each other.

It will be appreciated that the semantic composite hierarchies may mix regular components, elementary semantic composites and conceptual semantic composites. For example, a possible semantic composite hierarchy is a "product" conceptual semantic composite whose contained components are regular image and text components.

An example of a larger "mixed" hierarchy, (which could be analyzed in multiple ways, depending on the defined semantic composite) may be an "about" web page describing the company (typically non-semantic composite, but could be semantic composite as well), an "our team" section (a "team" conceptual semantic composite), a team members list (a list elementary semantic composite) and a single list member entry, including an image and name (a "team member" conceptual semantic composite) together with specific components mapped as components, possibly having a semantic role (e.g. a text component is marked as a "title").

A typical embodiment of system 100 may implement semantic composites/smart boxes as containers. Thus, if automatic handler 81 determines that given set of components should form a semantic composite, it may construct a (typically invisible) container containing the given set of components and make this container a part of the regular page container structure/hierarchy. Automatic handler 81 may also use groups for this purpose and may implement semantic composites as invisible groups. It will be appreciated that the latter design may allow semantic composite groups to cross existing container boundaries.

Figure 10:
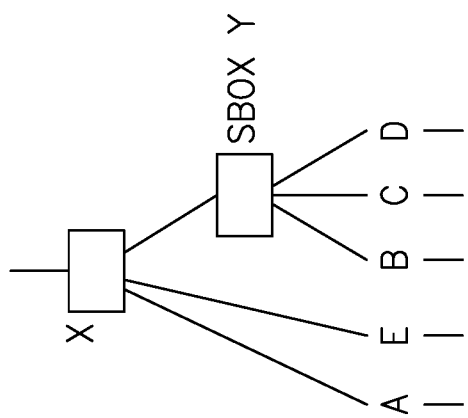
FIG. 10 is a schematic illustration of a hierarchy modification due to the creation of a smart box, constructed and operative in accordance with the present invention.
Figure 10:
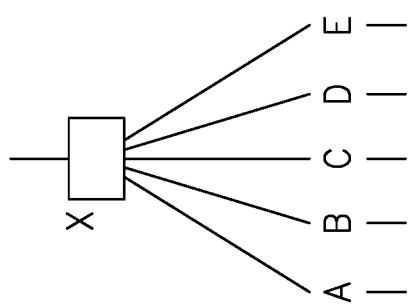

Automatic handler 81 may construct such smart box containers strictly within the existing hierarchy. As illustrated in FIG. 10 to which reference is now made, the analysis process may determine (for example) that 3 of the 5 child components of a container X (the components B, C, and D) should be unified under a newly created smart box Y (i.e. due to B/C/D conforming to Y's schema). This newly created smart box is then integrated into the component hierarchy.

In an alternative embodiment, the constructed smart boxes may be actual regular website building system container types and are added into the website building system page hierarchy. The container may be transparent or invisible so not to affect the displayed page. System 100 may provide a different display for smart boxes in the editing and viewing environment. For example, system 100 may explicitly display the smart box in WBS editor 30 or likewise to provide some visual cue to the smart box presence (in order to provide feedback from the user during editing), but make it invisible when viewed in WBS viewer 25 (since site users do not need to be aware of the smart box structure).

In yet another embodiment, the constructed smart boxes may be arranged as a separate hierarchy (or set of hierarchies) which is kept distinct from the regular website building system page hierarchy, though the visual displays from the two hierarchies may possibly be integrated in both WBS editor 30 and WBS viewer 25.

It will be appreciated that WBS editor 30 may also allow the semantic composite decomposition process to modify the existing component hierarchy, possibly combining components from different containers (removing the components from their containers), "flattening" containers (i.e. attaching their content to a higher-level container) etc. Such changes may modify the existing structure and hierarchy and replace it with an alternative one based on the analysis. When performed online (i.e. not in offline batch mode), WBS editor 30 may ask the user for confirmation for such a structure modification, or alternatively perform it (without specific user approval) if the analysis certainty level is very high.

It will also be appreciated that for all the embodiments and variations as described herein above, WBS editor 30 may create (through interactive handler 82) smart box definitions which are temporary, i.e. operative only during a specific editing operation or operations, session-level, i.e. operative during an entire editing session and permanent, i.e. retained in the website building system underlying database and reflecting a permanent part of the page definition (until modified).

As discussed herein above, automatic handler 81 may perform the analysis process off-line on the entire page. Alternatively, WBS editor 30 may continuously update the semantic composite hierarchies during editing, based on the changes made to the page. This could be at page load time, based on user-initiated action (such as marking or selecting a container), after any change in the document etc. In the case of user action, the action may be implicit (e.g. the analysis occurs as result of other editing activity) or explicit ("please analyze this selected area").

Initially, automatic handler 81 may perform a cleanup and pre-processing stage (e.g. decoration removal etc.) so to prepare a version of the pages' component hierarchy for scanning as described herein above. It will be appreciated that automatic handler 81 may perform the analysis based on information extracted from the components themselves, their attributes and other sources. The analysis may include specific component attributes as well as component-to-component comparison as described in more detail herein below.

Main sources of information may include but not be limited to the existing container structure, which provides a strong indication to the grouping of the various components and use of object grouping and dynamic layout anchoring information (i.e. if the underlying website building system provides a component grouping capability, a set of grouped (or anchored) components is more likely to form a semantic composite together).

Another source of information is layout information (as defined herein above), including component size, position, priority, dynamic layout anchors etc. For example, image and text components which are very close to each other are very likely to form an image+caption semantic composite together. As another example, a series of images having similar size and similar spacing between them is likely to be image gallery semantic composite (even if it is not defined as a gallery component).

A further source is component content. For example, automatic handler 81 may identify that specific text components contain related text content (based on font, character size, text attributes or actual text content/keyword analysis), and thus unite them in a single multi-component paragraph semantic composite.

Other sources may include other component attributes (for example, automatic handler 81 may infer that multiple components having a very similar visual style, color combination or decorations are related) and hints associated with specific templates, template applications, objects etc. (e.g. hints from original template designer, application designer etc.): Such hints may be directly added to support the analysis process. As many websites are built based on a site template, some of the hints added to the original site template may remain in the modified version of the template included in the site.

Editing history and timing may also be used including specific object property changes. For example, if four components were added one after the other, during a short period of time and with no intervening components, they a more likely to form a semantic composite together. Furthermore, if these 4 components are similar, or at least semantically equivalent, they are likely to form a repeater semantic composite together (as discussed in more detail herein below).

Other information may also include collected BI information related to the actual use of the components (including use by end-users viewing the webpage). This may be relevant for site elements which allow end-users to interact with them, in which case element analysis may use the aggregate information about such interactions. If, for example, if a page has multiple buttons which open an "additional information" pop-up window, and end-users tends to use a specific sub-set of these buttons (possibly in a specific order), it may indicate an inherent relationship between these buttons, even if no such relationship was explicitly specified by the designer.

The analysis may also use direct feedback from the user, e.g. Smart box handler 80 may consult with the user regarding specific semantic assumption and analysis of additional page construction/component usage information (including editing history/BI) for other pages and other sites. These pages and sites may include additional pages and sites for the current user, and may also include such information for additional users (subject to the relevant legal and privacy considerations, and using only aggregate information).

It will be appreciated that such additional reviewed information may be analyzed system wide, or may be based on filtering of users and sites according to criteria such as similarity to the current user (e.g. based on geography, skill level, industry, site type, underlying site template to use etc.).

Thus, for example, automatic handler 81 may analyze previous manual or automatic decompositions of pages into a smart box hierarchy, and apply this information to similar pages created by the user.

Artificial intelligence/machine learner 36 may use standard machine learning and artificial intelligence techniques to gather such decomposition information, allowing automatic handler 81 to make recommendations based on an internally constructed knowledge base. Thus, decisions made by users (performing manual decomposition) may be used as training data for an artificial neural network modeling smart box creation based on multiple sources of information such as these described herein above.

Automatic handler 81 may also use any of the grouping technologies described in US Patent Publication No. 2015/0074516, such as these used by the POS locator 250 or super-node creator 230. Such grouping technologies may be used to locate groups of components (including components from disjoint locations in the component tree) which should be analyzed together.

Automatic handler 81 may base the analysis on the application on multiple heuristics to classify components and later collections of components, recognize semantic composites, and build the semantic composite/smart box hierarchies from bottom to top.

In a limited alternative embodiment, automatic handler 81 may perform the analysis at the single container level (i.e. creating smart boxes based on components within a specific container), without building an entire smart box hierarchy.

Once a semantic composite is recognized, automatic handler 81 may construct a smart box which includes and encompasses the specific elements included in semantic composite. This smart box is then associated with the given semantic composite. The included elements may be components, containers or other smart boxes.

Automatic handler 81 may perform semantic composite recognition by matching the semantic composite schemas against the analyzed component sets.

Automatic handler 81 may also map atomic elements into semantic types having independent meaning whenever possible. Such semantic types may include (for example) title, paragraph, page, title, number, content image, background image, etc. The matching against the semantic composite schemas may be done using these semantic types. The semantic types may themselves be arranged in a hierarchy, with the comparison being made between semantic types and their (multi-level) parent types as described in US Patent Publication 2015/0310124.

It will be appreciated that the main heuristics to identify semantic composites may be based on heuristic-specific criteria, and thus find which elements (components, containers, other semantic composites) which form a new higher-level semantic composite together. For example, a collection of [image+text] pairs may form a list semantic composite which contains multiple [image+caption] semantic composites.

Specific heuristics may be "soft" or "strict". A soft heuristic may allow certain deviations from the expected component pattern. For example, a box with four text-image pairs and an additional single image (without a matching text) will still be considered as a list of text-image pairs, and the single image will be a part of this list structure. In such a case, the soft heuristic will create an unstructured repeater smart box (as described herein above) which allows some list members to be different from the typical list member structure.

Automatic handler 81 may include metrics for heuristic quality. For example, the distance between an image and a text may determine the quality score, or how likely the two elements are related and should be connected as a [image+caption] semantic composite.

Automatic handler 81 may further include a method for the determination of which heuristic to use in case of conflicting heuristics. For example, if two text components (e.g. A and B) are both near an image C, automatic handler 81 may have to choose which one to use together with the image so to form a [image+caption] semantic composite. Possible factors to consider may include (for example):

Is one of A or B between the other text field and C (e.g. B is between A and C)?

Which one of A or B is closer to C?

Which one of A or B is better aligned with C, or aligned in more ways (e.g. number of aligned edges or center lines)?

Was one of A or B created together with C while the other was not (based on the recorded editing history)?

Is one of A or B more likely to be related to another component D (e.g. being closely aligned with or closer to D)?

Is the content of which text component (A or B) is more closely related to the content of the image C (using text analysis/natural language processing and image content analysis)?

It will be appreciated that once the hierarchy (or set of hierarchies) of semantic composites have been defined, the user may perform various generic or semantic composite specific activities as discussed in more detail herein below.

It will be appreciated that both automatic handler 81 and interactive handler 82 may also change the semantic composite hierarchy (and of repeater semantic composites) based on an external data database or another data source. For example, a list repeater semantic composite may reflect the content of an external database.

Automatic handler 81 and interactive handler 82 may also continuously update the repeater semantic composite (including list element addition, deletion and modification) based on changes to the external database.

This could occur during editing as well as runtime (e.g. in WBS viewer 25), with the displayed layout being modified based on the repeater semantic composite definition and the selected layout for (in this case) list elements.

As discussed herein above, interactive handler 82 may implement user interaction in the semantic decomposition process. Interactive handler 82 may also consult with the user in case of ambiguous semantics, and may furthermore allow the user to explicitly define semantic composites. Such interaction could be performed within the context of the editing session performed with WBS editor 30, or as part of a separate session.

For example, via interactive handler 82, the user may mark several fields to be connected in a single semantic composite, and interactive handler 82 may try to locate matching semantic composites based on semantic signature searching, i.e. extracting a semantic signature from the selected components and searching for semantic composites having the closest semantic signature (as further described in US Patent Publication 2015/0310124). Semantic composite sensitive editor 31 may offer alternative possible semantic composites to the user, and allow the user to select one. In the case of an incomplete match, semantic composite sensitive editor 31 may need to adapt the semantic composite to the actual matched component set, possibly creating a local semantic composite variation.

Semantic composite sensitive editor 31 may also allow a user to define a customized semantic composite, based on a specific existing set of components, or on a schema definition imported (for example) from an external data source or database. Such a semantic composite can then be used for further decomposition and matching smart box creation.

It will be appreciated that there may be various functions and capabilities which website building system 5 may offer based on the semantic decomposition or related to it.

These may include operations such as offering alternative layouts for a specific smart box (as described in US Patent Publication 2015/0310124) and applying semantic transformations/reclassification on a specific smart box. Semantic transformations may occur when a specific component set smart box is reclassified as an alternative smart box due to editing changes. For example, an image inside a container may be classified as an "Image Box" smart box. When a text field is added, the container may be reclassified as an "Image with Caption" smart box. In another example, a set of text components include text describing the opening hours of a business (and is analyzed and classified as an "Opening hours" semantic composite). When these text components are modified to include address information, automatic handler 81 may recognize the new texts and reclassify the components as an "Address" semantic composite. When such reclassification occurs, automatic handler 81 may perform some associated actions, such as suggesting layout modifications or adding various icons.

Another operation may include applying a "semantic brush" editing operator as described in more detail herein below. Such an operator may be used to copy/paste layout, style or format from one smart box to another smart box, similar to the copying of content using regular copy/paste, or copying of color by a "color brush" operator.

Other operations may include adding or removing an item to a list smart box having a consistent semantic structure, unifying multiple separate smart boxes or components into a single list-type top level smart box and creating connections between repeater smart boxes and databases, including populating a repeater smart box from a database and extracting data from a repeater smart box into a database.

As discussed herein above, a smart box can provide the user with suggested alternative layouts which can then be applied to the elements inside it. Such layouts can be derived from several sources, including (for example) predefined layouts and extracted layouts as discussed in more detail herein below.

US Patent Publication 2015/0310124 provides further details about extracting such layouts, filtering the high-quality layouts and selecting layouts which are semantically equivalent (e.g. to the smart box content) but are visually different.

Alternative layout selector/applier 3114 may select an alternative layout (from layouts repository 511), apply it to the relevant smart box, and modify the component parameters as required (including dynamic layout related effects on other components and containers). Alternative layout selector/applier 3114 may also record the current layout selected for this smart box. Also, as discussed in more detail herein below, alternative layout selector/applier 3114 may apply the selected layout (automatically or subject to user approval) to other members of the same repeater semantic composite.

It will be appreciated that some embodiments of system 100 may use layouts that specify additional non-geometrical information, such as color schemes, styles and fonts.

System 100 may further support animated layouts. An animation definition is a separate attribute which may be applied to some or all of the layout types by animation handler 3111. The supported animation types may, however, be determined by the layout or semantic composite type itself. Animations may be applicable to regular smart boxes as well as lists, so a component may (for example) animate into its place in the list. An example user interface to select an animation type is illustrated in FIG. 14D which is described in more detail herein below.

System 100 may also offer predefined layouts which may be created (for example) by the website building system vendor or by specialized third parties. The layout types may include generic layouts which can be applied to all types of semantic composites (such as horizontal or vertical component arrangements). This is in fact a "layout creation rule" rather than a set of component geometry information. The WBS vendor staff 61 may create, for example, a series of layouts for 3 semantic composites which fit into a 200-300 pixels per side square.

System 100 may also offer semi-generic layouts which can be applied to subset of the available semantic composites (such as a grid arrangement) and customized layouts created for a specific semantic composite or component combination. For example, a "contact us" semantic composite may include a variety of high quality manually designed contact information boxes.

Other offered layouts may include parameterized layouts which can be adapted by the user. For example, a grid layout may be parameterized, allowing the user to control the number of rows/columns and the row/column spacing. As another example, a simple vertical layout can be parameterized so the user specifies if the vertical component arrangement is aligned to the left, aligned to the right or centered. The actual parameters values used are stored with the smart box instance.

System 100 may also offer directional flow layouts which may be based on determining an order for the components (such as the logical order in which they would be read if they were text component), and then re-ordering the components in "lines" as if they were ordered by a word processing system. Such an order may be horizontal (e.g. like the regular ordering of left-to-right English text) or vertical (similar to the ordering used for some far-east languages). Such a component may typically have a primary direction (e.g. top-to-bottom line order) as well as a secondary direction (e.g. left-to-right or right-to-left component order within the line). It can also have additional parameters, e.g. those related to alignment and spacing.

In an alternative embodiment, alternative layout selector/applier 3114 may place the components along curves such as a polygon, a circle or a user-specified curve.

Semantic composite sensitive editor 31 may allow the user to manually specify the order of the components. Alternatively, automatic handler 81 may determine the order of the components by analyzing and selecting an appropriate order which matches a natural reading order for the components (e.g. using a technology like that of orderer 240 as described in US Patent Publication No. 2015/0074516).

System 100 may offer advanced layouts, which offer more than just change of size and position. Such advanced layouts may include additional information and not just the regular layout parameters (e.g. component's x/y/h/w/priority/anchors). An embodiment of system 100 may replace an existing container component with a new smart box container containing the same data and components (i.e. using polymorphic component conversion).

Such an advanced layout may include paginated layouts which divide the smart box components into pages and allow switching between them (using a scroll bar, next/previous page buttons, slider, page selection menu etc.) and "show more" layouts which divide the smart box components into a basic area and one or more extension areas. Via semantic composite sensitive editor 31, the user may view the basic area and may open any extension area using (for example) the appropriate "show more" buttons in the basic area. The user may also close any "show more" area using a "show less" button appearing when the extension area opens. Components may reside in either area, and possible be duplicated in multiple areas.

Yet another advanced layout is a slider layout which is a container divided into pages which can slide to the right or to the left. It can be applied to all types of containers (including lists with multiple displayed elements), allowing their content to be displayed via sliding.

System 100 may also offer extracted layouts, these are layouts extracted from actual instances of the same semantic composites in websites created by the same user or by other users. US Patent Publication 2015/0310124 provides further details about extracting such layouts, filtering the high-quality layouts and selecting layouts which are semantically equivalent (e.g. to the smart box content) but are visually different.

It will be appreciated that in this scenario, alternative layout selector/applier 3114 may also extract such layouts from the same or similar (semantically) semantic composites in the same or other web sites of the same user. If the semantic composite being handled is a repeater semantic composite element (e.g. a list element), layouts may be extracted from other members of the same repeater semantic composite, or other members of an existing equivalent repeater semantic composite (e.g. from another page of the same site).

System 100 may also offer automatically generated layouts in addition to the above, which may be based on the actual components inside the smart box. System 100 may provide multiple types of such automatically generated layouts as described in US Patent Publication 2015/0310124.

It will be appreciated that alternative layout selector/applier 3114 may propose alternate layouts based on an explicit user request, or may do so automatically based on specific UI triggers and based on the pages' context. For example, alternative layout selector/applier 3114 may offer possible layouts for a container when the container is created (e.g. based on the other containers in the same page). An example user interface offering the user multiple layouts for a given smart box is illustrated in FIG. 16C which is described in more detail herein below.

Alternative layout selector/applier 3114 may also collect information as the page is built, and propose possible layouts based on specific information collected. For example, the alternative layout selector/applier 3114 may recognize (based on a number of components being edited) that the user is creating a "contact us" smart box and then offer a number of possibly "contact us" layouts for the smart box, including mapping the fields already created into the possible suggested layouts.

Alternative layout selector/applier 3114 may also filter the possible layouts, limiting display (for example) to the top X relevant layouts.

Alternative layout selector/applier 3114 may suggest alternative layouts for a specific smart box or a group of related smart boxes. Such a suggestion can be made based on semantic searching for high quality semantically equivalent (yet visually different) layouts as described in US Patent Publication 2015/0310124.

It will be appreciated that in this embodiment, the layout searching system may be activated based on handled component sets (i.e. the set of elements matched against evaluated layouts) automatically defined through the page analysis process. The matching may be performed using the predefined semantic types or through the regular semantic matching process (which may map types to more generalized types, e.g. "text paragraph"=>"text component"). The matching may also be extended using additional business-related component information as described above.

Thus, for a given [picture+caption] smart box, alternative layout selector/applier 3114 may search for other [picture+caption] layouts, or may search (more specifically) for a [team member] layout.

Once an alternative layout is selected, alternative layout selector/applier 3114 may apply it to the relevant smart box, and may modify the component parameters as required (including dynamic layout-related effects on other components and containers). Alternative layout selector/applier 3114 may record the current layout selected for this smart box. Also, as further described in more detail herein below, alternative layout selector/applier 3114 may apply the selected layout (automatically or subject to user approval) to other members of the same repeater semantic composite. It will be appreciated that when applying layouts, alternative layout selector/applier 3114 may make a data modification that is connected to layout. For example, a text alignment.

As discussed herein above, SC editing behavior applier 311 may allow layouts to be copied over from one smart box (source smart box) to another (target smart box). The copying is at the specific smart box (instance) level, not the semantic composite (type) level. Brush applier 3112 may in fact copy from a source instance which may be a modified/customized layout which is not typical of the semantic composite for the source smart box. Brush applier 3112 may copy the complete smart box layout, and not just layout number or pointer.

Brush applier 3112 may work on any type of component and not just a smart box. For example, brush applier 3112 may be able to copy-paste the layout of one image to another image. This depends on the source and target(s) having the same or equivalent semantic class.

It will be appreciated that at the basic level, a layout may be extracted from a given source smart box and applied to any target smart box using the same semantic composite like the way a color can be sampled from a given picture area and applied to other picture areas. The extracted layout includes a reference to the originating semantic composite to help in matching the other smart box.

At a more advanced level, brush applier 3112 may allow applying the extracted layout to smart boxes using different semantic composites which are still semantically equivalent to the source semantic composite. This may be done by SC editing behavior applier 311 by creating a semantic matching (as described in US Patent Publication 2015/0310124) between the source semantic composite and the target semantic composite, and applying the layout per this semantic matching. SC editing behavior applier 311 may prompt the user when a semantic matching can't be automatically finalized or is otherwise ambiguous, and the user may then manually resolve these problems.

At an even more advanced level, alternative layout selector/applier 3114 may allow the application of the extracted layout to smart boxes using different semantic composites which are not semantically equivalent to the source semantic composite. This works similarly to the previous case, but the "extra" elements in the target smart box may be moved together with related elements in the target smart box (whenever possible) or otherwise may remain in their position. For example, if a layout to be applied moves and resizes a given picture component, and the target semantic composite includes an associated caption component, the caption component may be moved (and possibly resized) together with the picture, retaining the same relative position (or size ratio), even if the applied layout didn't refer to the caption component.

It will be appreciated that a repeater smart box (an instance of a repeater semantic composite) is typically a list whose items are either components (e.g. a gallery of pictures) or other smart boxes (e.g. a list of product semantic composites, with each product semantic composite containing components which display the products' picture, name, description, price etc.).

Thus, a repeater smart box essentially consists of a list of items presented using the layout of the top level smart box, and with each item having its own layout.

As discussed herein above in relation to repeater semantic composites, a repeater smart box may be structured (in which all items are required to have an identical layout) or unstructured (in which items may have different layouts). A repeater smart box variant may also exist in which there are multiple item types, with each item type having its own semantic composite and layout. Some repeater smart boxes may be structured but still contain items having multiple layout types such as the zebra list described herein above in relation to FIG. 9).

A repeater smart box may display all list items simultaneously (typical for small lists) or may only display a "window" of one or more items among the list items, with the rest being accessible through scroll bars, pagination, previous/next buttons, mini/thumbnail selection menu, touch screen gestures, programmatic control or other means.

When handling a repeater smart box, SC editing behavior applier 311 may offer several list-related operations as discussed in more detail herein below.

As discussed herein above, system 100 may provide the capability to select an alternative layout (among the relevant pre-defined/constructed/extracted layouts) and apply it. Such a capability may be applicable at the list level or the list item level, and the user may be able to select alternate layouts separately at both levels.

It will be appreciated that this functionality may be available via semantic composite sensitive editor 31 and may also be available (but possibly limited) to WBS viewer 25 as discussed in more detail herein below.

It will be further appreciated that system 100 may maintain for each list item a reference to the specific layout used and its parameters. Such a reference may point to one of the layouts available for the specific semantic composite matching the list item, or a customized/specific layout used by the specific list item.

Alternatively, the user may modify the item and the layout via semantic composite sensitive editor 31. Changes may include layout changes such as contained component adding, removing, moving and resizing and other non-layout changes such as component content change, property changes, style change, decorative element changes etc.

In this scenario, semantic composite sensitive editor 31 may provide a "keep same design for all items" function (e.g. through a "lock design" UI checkbox or property setting). When activated, this function may take design changes made to one list item and apply it to all other items of the same list.

It will be appreciated that even if a "lock design" is not selected, WBS editor 30 may ask the user if a change to a given list item should be applied to all items.

Semantic composite sensitive editor 31 may even apply the "lock design" function to list items which have been made different, e.g. apply the change selectively to the semantically matching components in other items.

Figure 11:
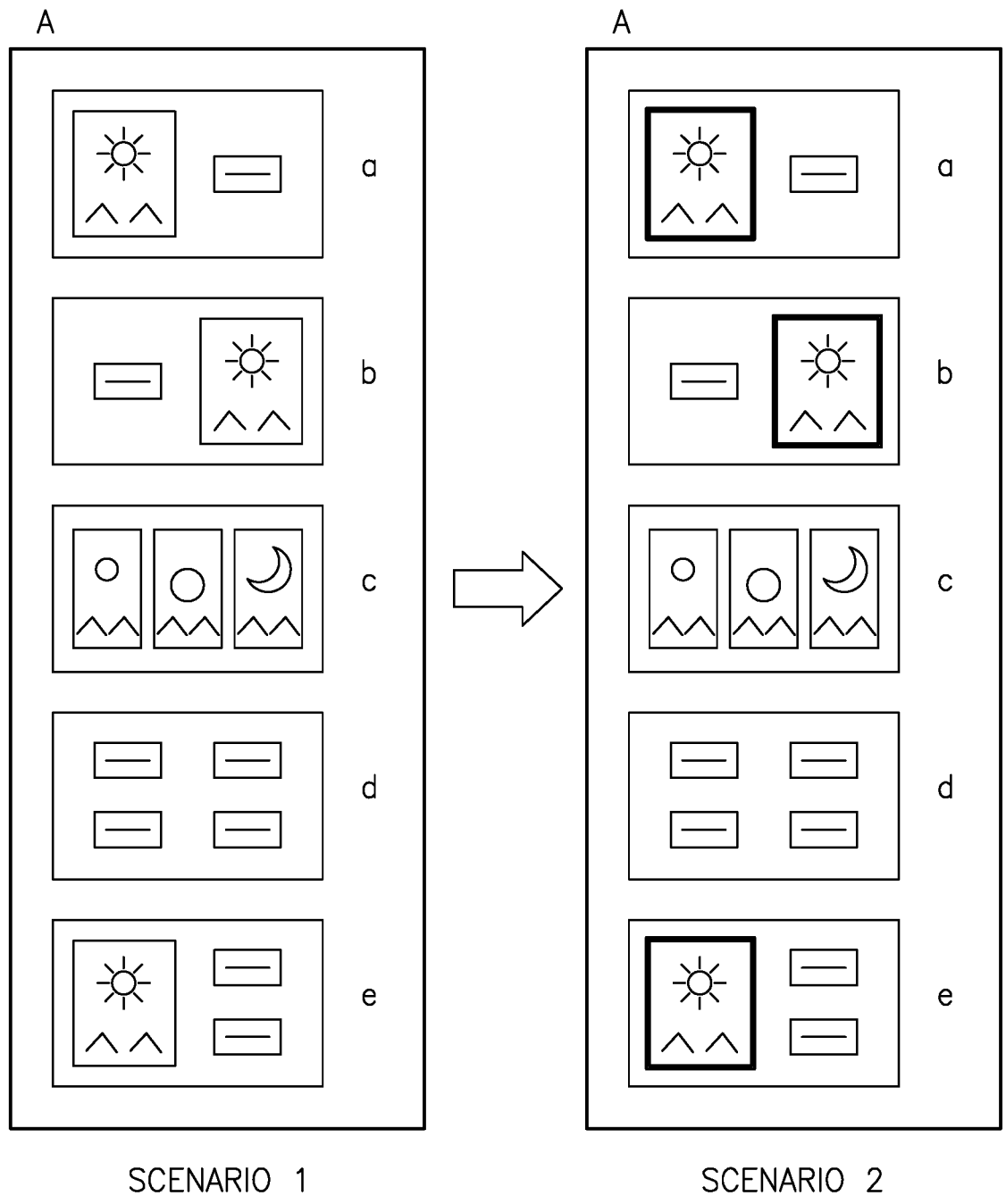
FIG. 11 is a schematic illustration of a change replication in unstructured list, constructed and operative in accordance with the present invention.

Reference is now made to FIG. 11 which illustrates a change replication in an unstructured list. As is illustrated in scenario 1, unstructured list A includes some items containing a [picture+caption] combination (such as [a], [b] and [e]) and other items which don't contain such a combination ([c] and [d]). A layout change made to a list item [a] (such as adding thick frame around the picture) may be applied (scenario 2) to the other items containing [picture+caption] (i.e. to [b] and [e]), even if the layout of [b] and [e] is not identical to that of [a]. However, the change would not be applied to [c] and [d].

The "lock design" function may also function in a list which has multiple item types, with items of each type each of them having a different type-specific semantic composite and layout. In this scenario, SC editing behavior applier 311 may provide a change to a given item that is applied only to items of the same type or a change to a given item that may be applied to all items (including those having a different type). For different-type items, the change is applied through semantic matching between the types and only when applicable.

SC editing behavior applier 311 may apply such changes immediately or together with batch changes and apply them at a specific time point (such as at the end of editing of a specific area, at a save request, at an explicit "analyze layout" request, based on number or scope of changes etc.)

It will be appreciated that a container component may be classified as repeater smart box (i.e. marked as repeater semantic composite type in the semantic analysis) in several ways as described in more detail herein below.

It will also be appreciated that a component may be pre-classified as repeater smart box, e.g. by the component being a list component, a gallery component, or a list application as described in US Patent Publication 2014/0282218.

Automatic handler 81 may classify a container component as repeater smart box when an internal component (regular or container) is duplicated thus creating a two-item list.

Such duplication may be done using regular component copying (e.g. page editor "copy+paste" operation) or a specific "insert another such component" editing option.

It will be appreciated that this type of classification is done during the editing session, leaving a hint flag for a later semantic decomposition process.

During the semantic decomposition process, automatic handler 81 may classify a container component A as repeater smart box during the semantic decomposition process, by detecting the similarity between multiple components directly contained inside the container component A.

Such similarity may be attribute based, semantic (i.e. semantic similarity based on inner content of each component), layout based (e.g. the components are arranged and aligned as a list) or a combination thereof.

It will be appreciated that automatic handler 81 may recognize, for example, similar contained sub-containers which are not visually aligned in a list.

Automatic handler 81 may also analyze and recognize a list consisting of elements belonging to multiple semantic composites, and create a repeater smart box defining a list with multiple item types. Automatic handler 81 may further analyze and recognize anomalous items, which do not exactly conform to any of the included semantic composites. Automatic handler 81 may further compare such anomalous items to multiple potential semantic composites, to determine the most likely "foundation" semantic composite X and mark the anomalous item as a "modified X". Such an analysis may be made based on the specific region's editing history.

Once a repeater smart box is recognized by automatic handler 81, automatic handler 81 may convert the underlying container component into a gallery/list type component. This may open additional editing options to the user (e.g. "quickly re-arrange by changing number of rows and columns" or other options unique to gallery types).

It will be appreciated that the discussion below refers to a typical case, in which a repeater smart box implements an ordered list of items. However, a repeater smart box may also implement additional underlying data models, such as a tree of items, which may be traversed (for example) using right/left/up/down buttons. A repeater smart box may also implement (for example) a graph model of smart box nodes, with transitions along the available edges.

It will be also appreciated that a typical repeater smart box has an underlying ordered list. Semantic composite sensitive editor 31 may offer a set of operations which may be used to manipulate this list such as orderer 3117 (i.e. to move an item up/down/to a different position in the list), adder/deleter 3116 (to add or remove an item) and brush applier 3112 to allow the user to apply a set of data values to a given list item. This is a counterpart of the semantic brush, which applies a layout (or other semantic attributes) without affecting the data.

It will be appreciated that website building systems typically include various object editing operations, typically affected using mouse, keyboard or both. These may include selection, dragging, dropping, resize, rotate, copy, paste, etc.

System 100 may support smart box specific editing behavior which be implemented by the SC editing behavior applier 311 based on the existence of smart box definitions. Such behaviors may be adapted to semantic composite editing in general or to the specific smart box or smart box combination being edited. Thus, semantic composites may affect common editing operations such as resize, rotate, copy and paste, drag and drop and selection.

It will be appreciated that SC editing behavior applier 311 may also allow the user to perform editing operations on some or all of the sub-elements of a given smart box, or otherwise customize them. This may be done by a required "breaking" of the smart box before editing and "recreating" it after editing. Alternatively, system 100 may allow direct editing of sub-elements or sub-element groups. An example user interface which allows applying editing or customization operations to smart box sub-elements, including selection of affected sub-elements of a smart box according to their role (e.g. "title" or "line #1"), is illustrated in FIGS. 14C, 14E, 14F and 15C which are described in more detail herein below. It will be further appreciated that such editing may create a smart box which has a local variant of a system-wide smart composite.

For example, a resize operation used to increase the size of a repeater smart box may add additional displayed items to the end of the repeater smart box (rather than merely "stretching" the current number of displayed items on a larger area).

Resizer 3115 may cause the components of a given smart box to be re-arranged in a different layout (denser or sparser as required). Furthermore, resizer 3115 may shrink a smart box by hiding some of its fields, to fit the more important fields in the now reduced space. Resizer 3115 may keep the hidden field content associated with the smart box, and re-display them if the smart box is even resized or otherwise may modify it to use a layout which includes these hidden fields. Such a capability may be highly useful for dynamic layout or responsive design situations (in which elements and groups may have to be resized frequently and automatically) as further described in US Patent Publication No. 2013-0219263.

As another example, resizer 3115 may resize a given combination of shapes differently based on a given set of rules. An example of the results of a smart box specific resize operation is illustrated in FIG. 14G to which reference is now made with a comparison to FIG. 14F. It will be appreciated that SC editing behavior applier 311 may also implement smart composite specific rotation rules and a rotation element similar to resizer 3115.

Figure 12:
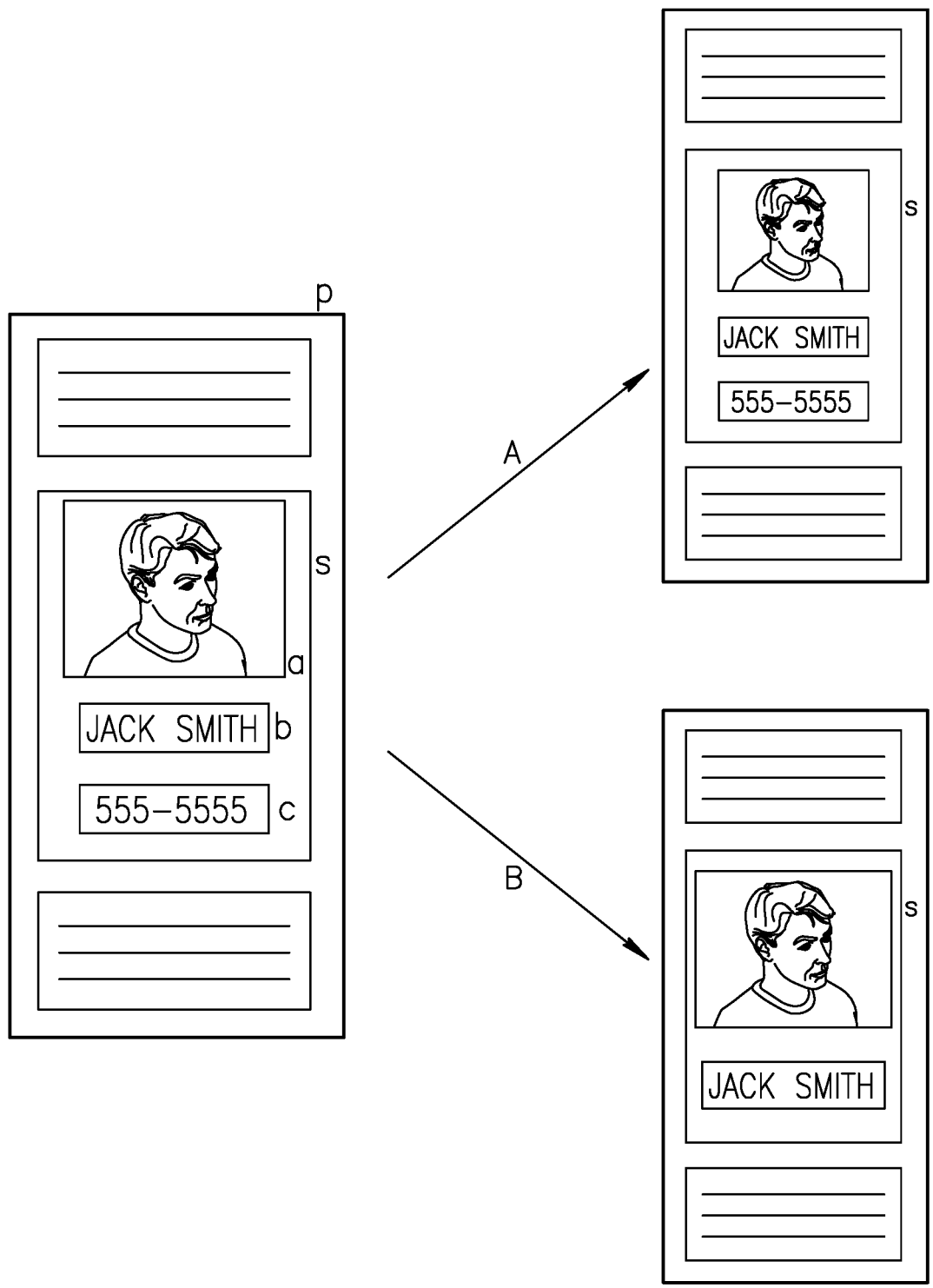
FIG. 12 is a schematic illustration of a smart box aware and non-smart box aware handling of a resize operation; constructed and operative in accordance with the present invention.

Reference is now made to FIG. 12 which illustrates a smart box aware and a non-smart box aware handling of a resize operation. As illustrated, a page [p] contains a "person details" smart box [s] consisting of a picture [a], a name [b] ("Jack Smith") and a phone number [c] ("555-5555"). A regular resize operation [A] will proportionally shrink all 3, making the image difficult to see and the name and phone number too small. Resizer 3115 [B] may remove phone number [c], shrink the picture [a] somewhat (by reducing the margins allocated to it), and shrink the name [b] only slightly (so to leave it readable), possibly switching the font to one which is more legible in smaller font sizes.

Figure 18A:
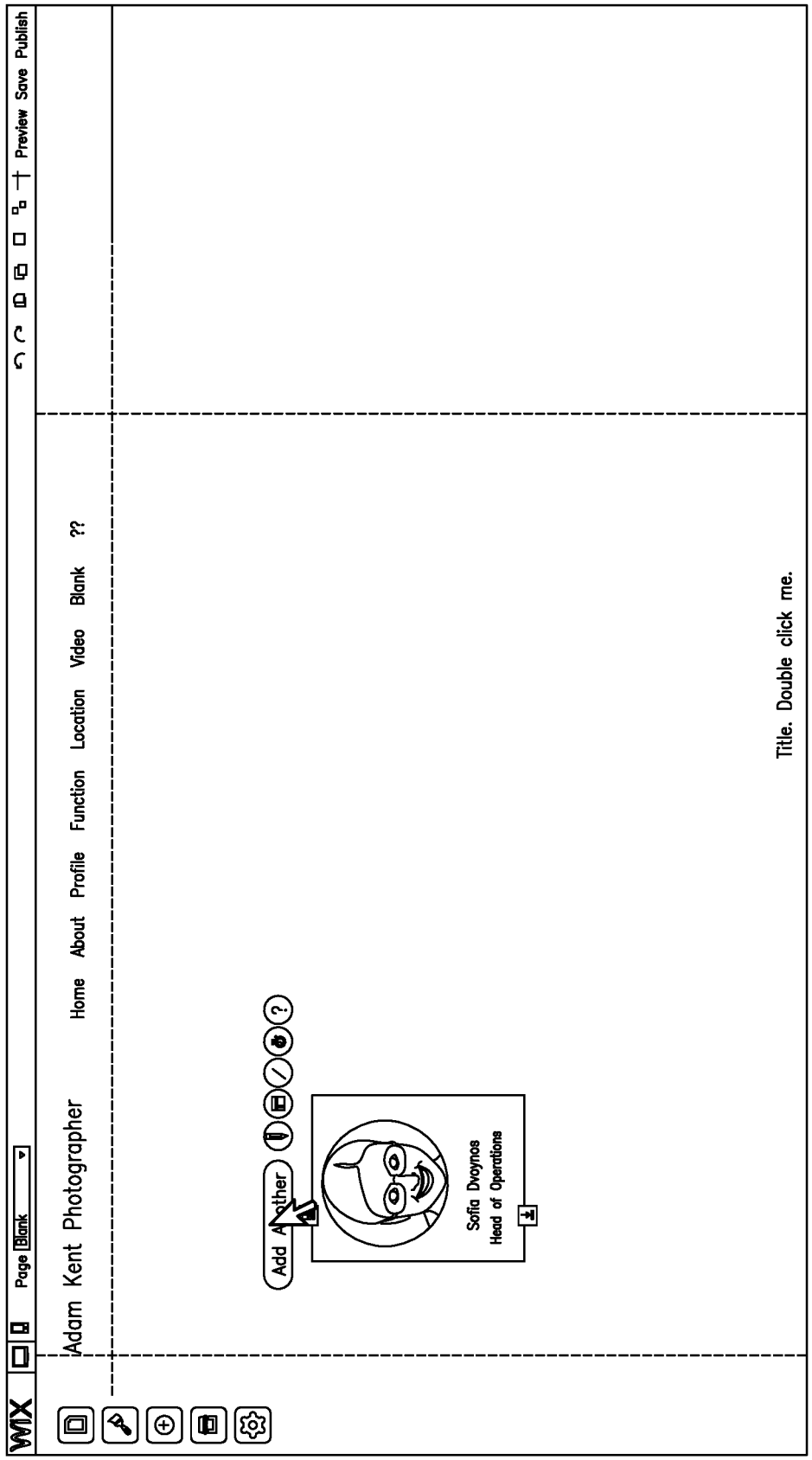
FIG. 18A-18C are schematic illustrations the editing of a repeater smart box; constructed and operative in accordance with the present invention.
Figure 18B:
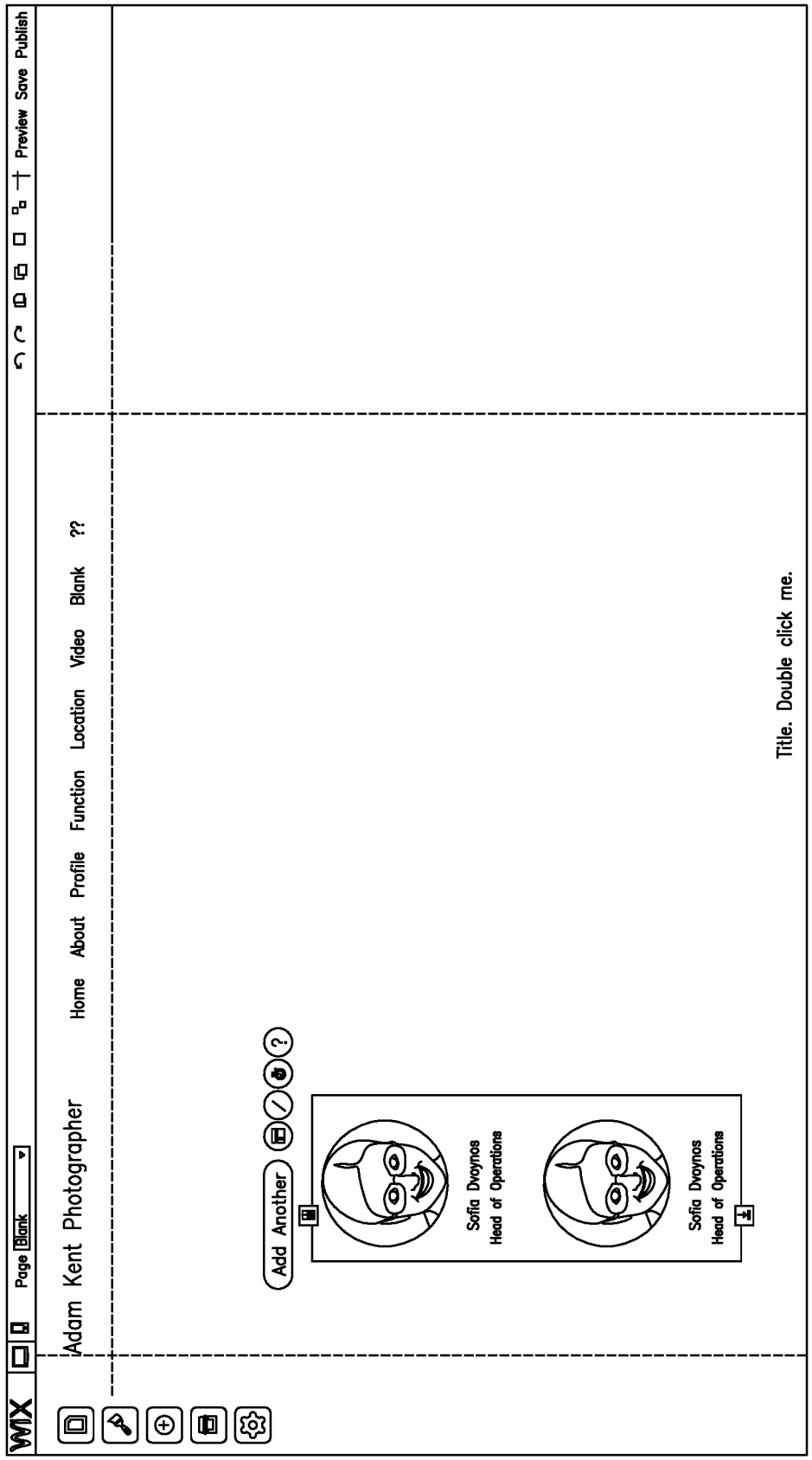

In another example, adder/deleter 3116 when applied to a list item may add the newly created component as a new list item at the end of the list and scroll to the end of the list. An example user interface which provides for adding an item to a list repeater smart box is illustrated in FIGS. 18A and 18B which are described in more detail herein below.

Drag and drop handler 3118 when applied to a repeater smart box may adapt the dropped component(s) X to the repeater smart box list item scheme and add the dropped (and adapted) item Y to the underlying list of the repeater smart box by inserting the new item Y into the right visual logical place in the list per the drag and drop location (including making space for the dropped item Y by moving, condensing or resizing the other list items). If the repeater smart box list supports multiple semantic composites (i.e. multiple item types), drag and drop handler 3118 may determine the best semantic composite to use for the dropped item Y. Such determining may include mapping the fields of Y to existing semantic composite, modifying an existing semantic composite or creating a new semantic composite as required.

Drag and drop handler 3118 may limit the allowed dragging or dropping zones of a smart box per specific rules based on the high-level container. For example, when selecting an item from a list and moving it around, the move could be limited to the box enclosing the list.

Figure 13:
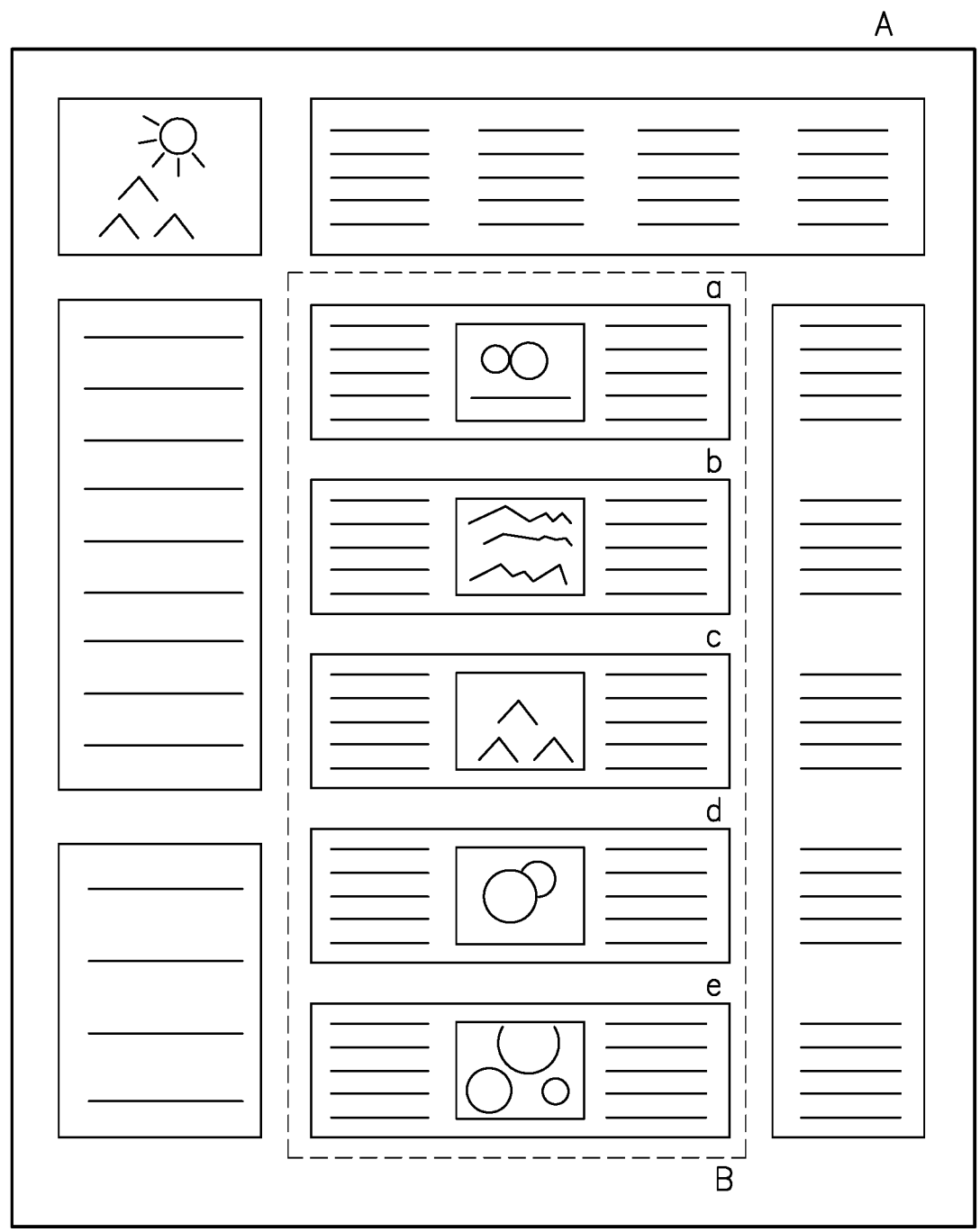
FIG. 13 is a schematic illustration of discrete-position dragging inside a repeater smart box, constructed and operative in accordance with the present invention.

Furthermore, Drag and drop handler 3118 may also provide repeater smart box specific discrete-position dragging as is represented in FIG. 13 to which reference is now made. As is illustrated, a layout [A] may contain a repeater smart box [B] containing 5 list items [a-e]. If the user drags item [a], item [a] may not be dragged to an arbitrary position inside [A] (or even inside [B]). Instead, item [a] could only be dragged (and will "jump to") positions between the other list items (e.g. between [b] and [c], [c] and [d] etc.). When trying to drag [a] the user may only see a transparent frame being dragged, but the frame may snap into any of the relevant positions during dragging or as soon as it is dropped (like a "snap to grid" option). Such dropping may move or modify the other list items (to make space for the dropped item) as described herein above. Drag and drop handler 3118 may also provide (through semantic composite sensitive editor 31) a preview of the expected effect of the dropping before the user drops the dragged object.

It will be appreciated that an editing operation applied to a list item (e.g. a resize) may be applied to other list items automatically or subject to user confirmation.

It will also be appreciated that selection handler 3119 may provide different selection highlighting per smart box details (e.g. different color or form of highlighting per each list item type). These may include clicking to select a list of smart box defaults. Further clicking may drill down on each select (to an item and component in item, for example).

When selecting a component in the editor, selection handler 3119 may check if nearby components are related (using the Partial Order Set (POS) algorithm as described in US Patent Publication No. 2015/0074516) and offer to do an extended selection (which also includes the related components) as a group.

When selecting, selection handler 3119 may first select a group. A further selection would select just one component (e.g. an image component from a text-image pair) and when moving it around, resize the virtual box containing the text and image and possibly move the related text component. This may also move other components inside the box.

When selecting an item from a list containing multiple item types, selection handler 3119 may select all items having the same type as the one pointed to by the mouse. When deleting a list item, semantic composite sensitive editor 31 may close vacated spaces, and may further redistribute the (now available) space in the areas between the other smart boxes.

Reference is now made to FIGS. 14A-14G, 15A-15F, 16A-F, 17A-H and 18A-18C which illustrate user interfaces and behaviors when editing smart boxes. They relate to an implementation of the capabilities as described herein above and may be implemented using alternative user interfaces or other operational methodologies. It will be appreciated that these examples use explicitly defined smart boxes, but the editing operations may be applicable to smart boxes created by site analysis or during automatic site construction as well.

FIGS. 14A-14G illustrate the editing of a decorated line smart box, consisting of two lines with a central umbrella shape.

Figure 14A:
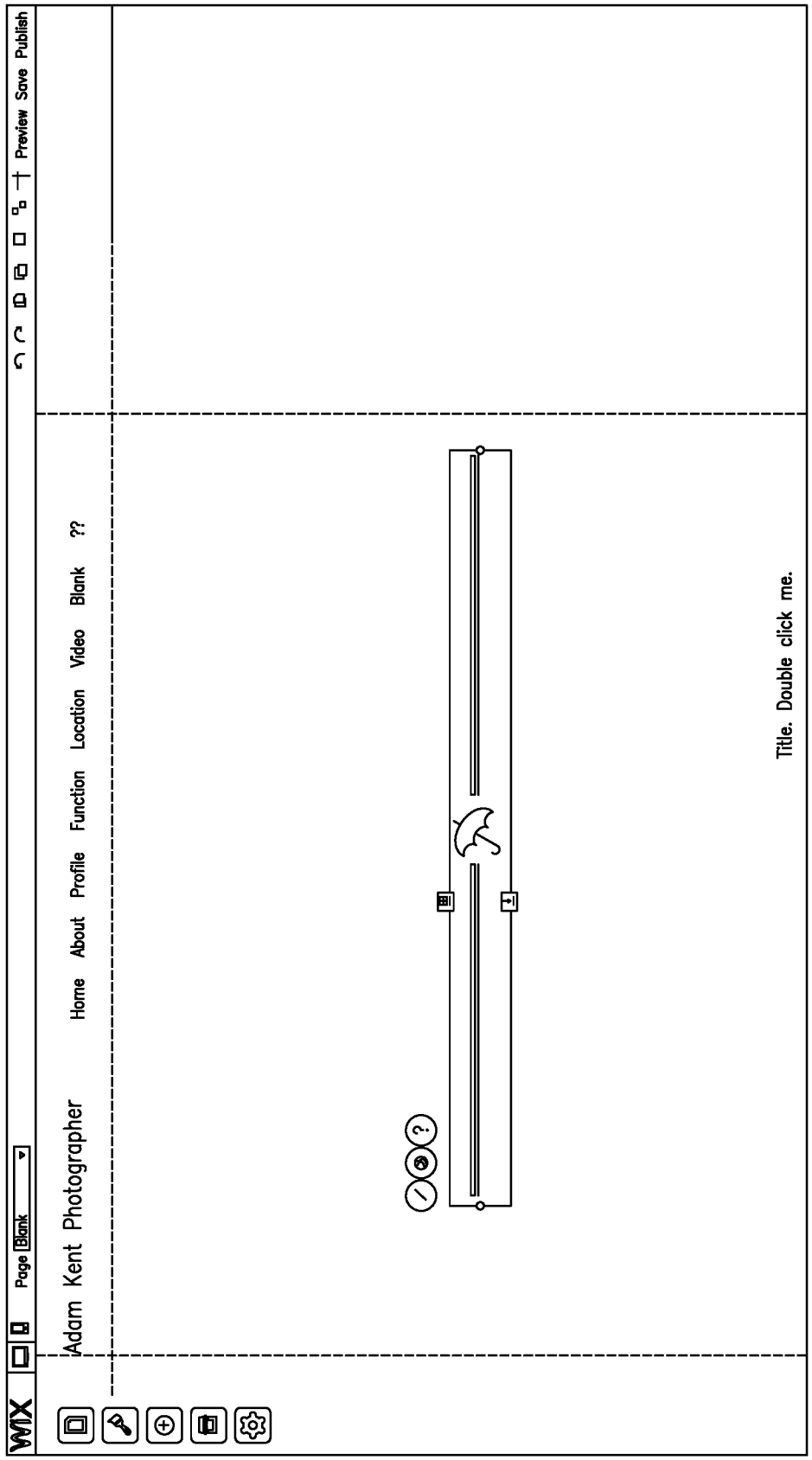
FIGS. 14A-14G are schematic illustrations of the editing of a decorated line smart box, consisting of two lines with a central umbrella shape, constructed and operative in accordance with the present invention.

FIG. 14A illustrates an example of a decorated line.

Figure 14B:
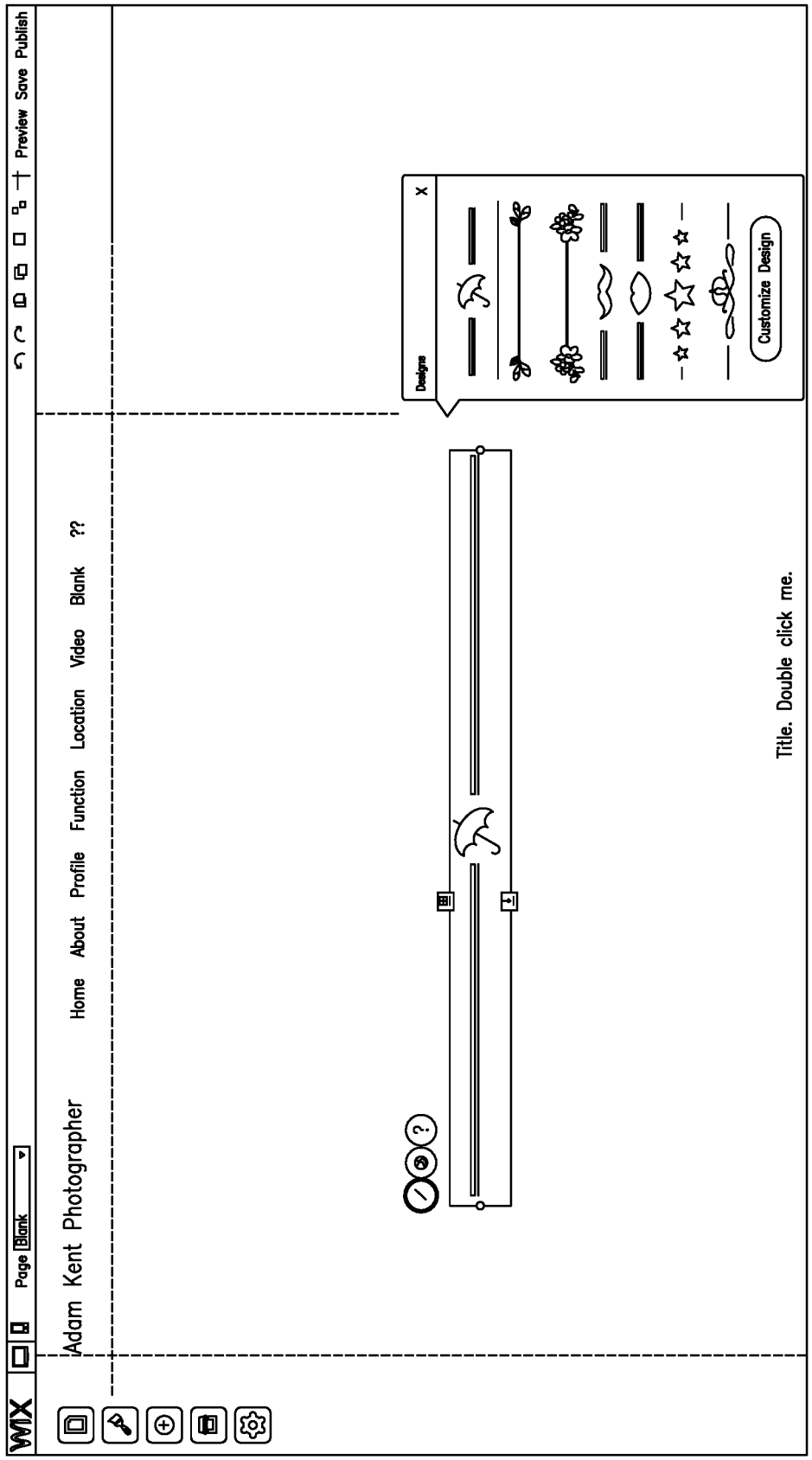

FIG. 14B illustrates a user interface which allows the decorated line design to be customized.

Figure 14C:
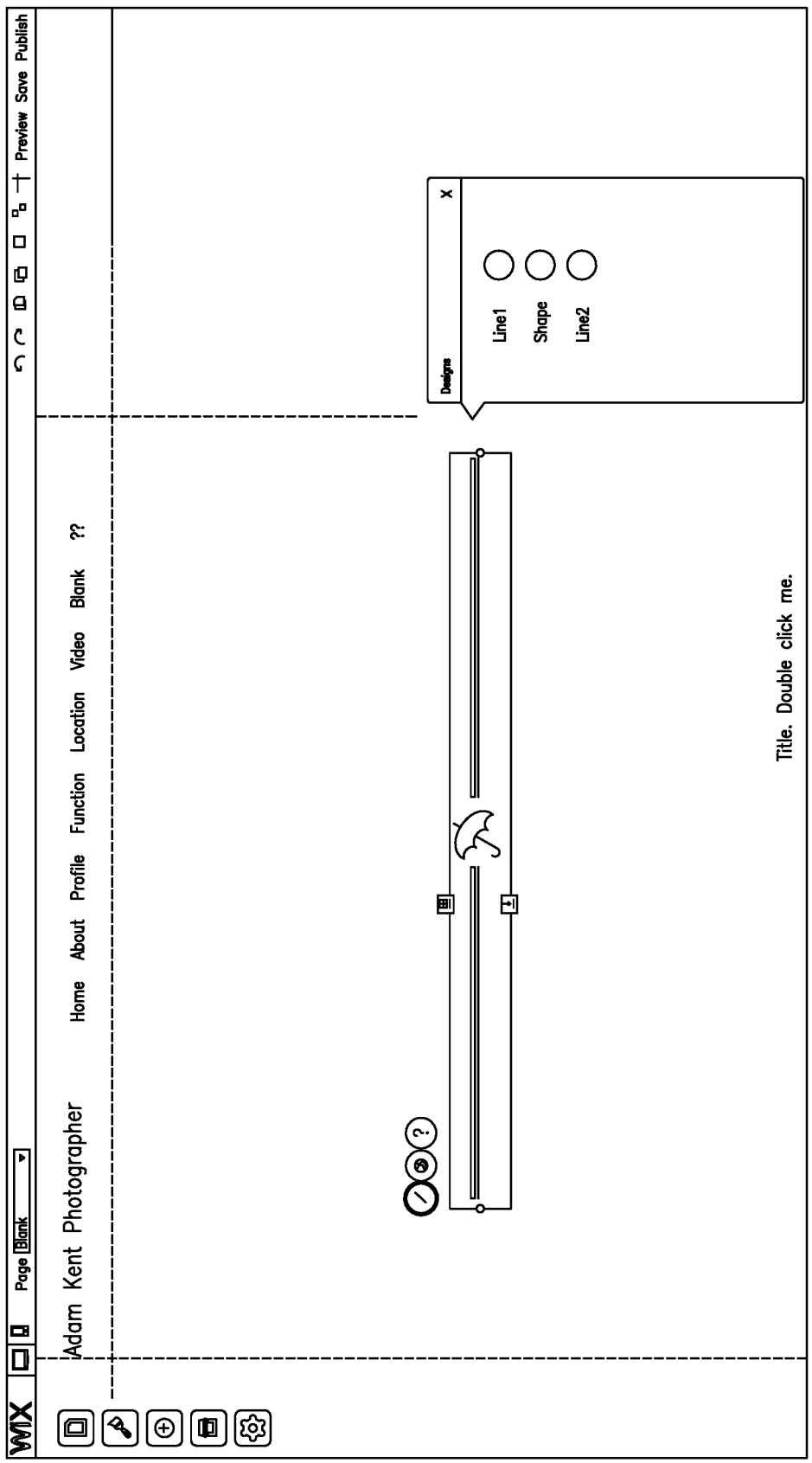
Figure 14D:
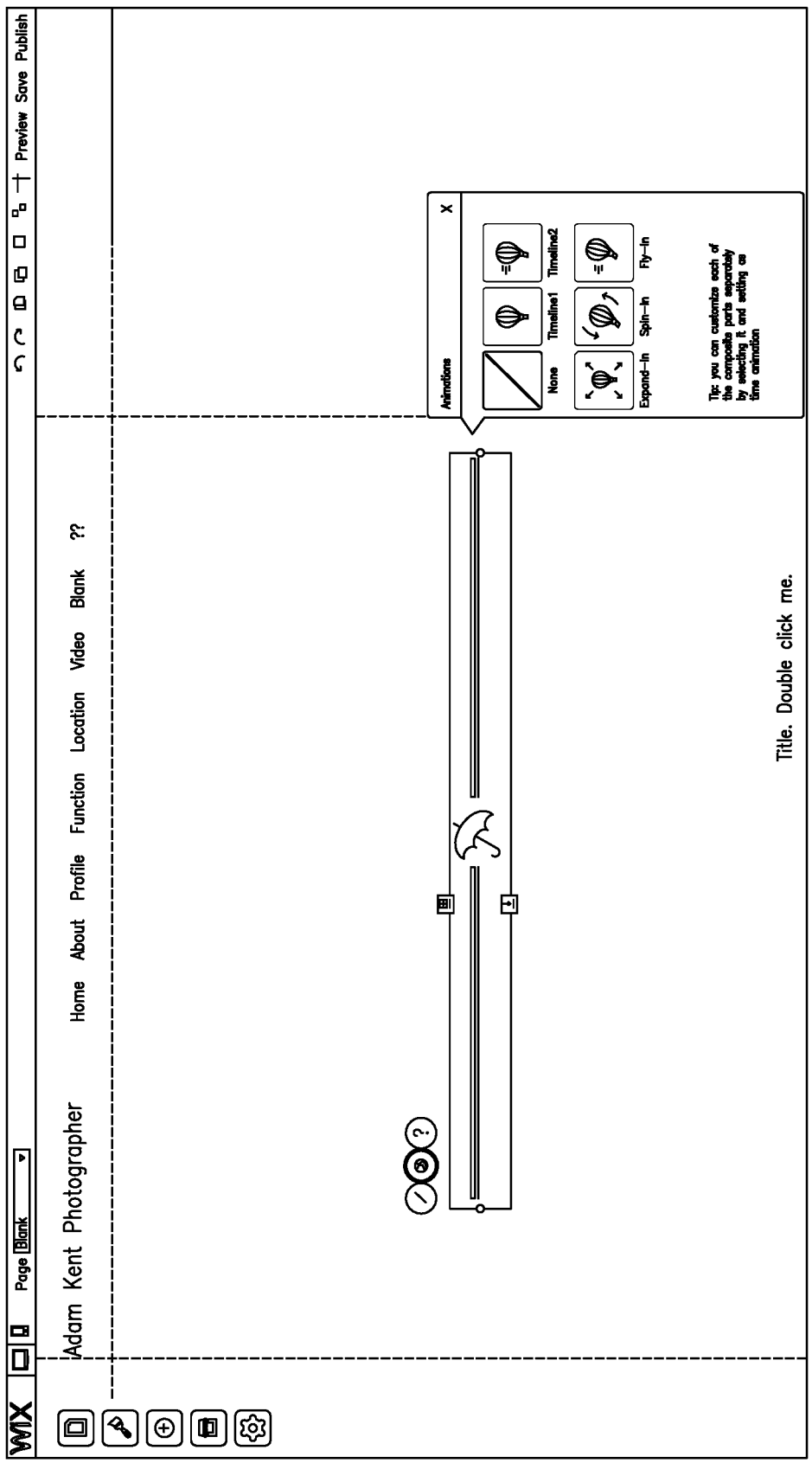

FIG. 14C illustrates a user interface which allows the user to specify which parts of the smart box to customize.

FIG. 14D illustrates a user interface which allows the user to specify animations, possibly separately for each part of the smart box.

Figure 14E:
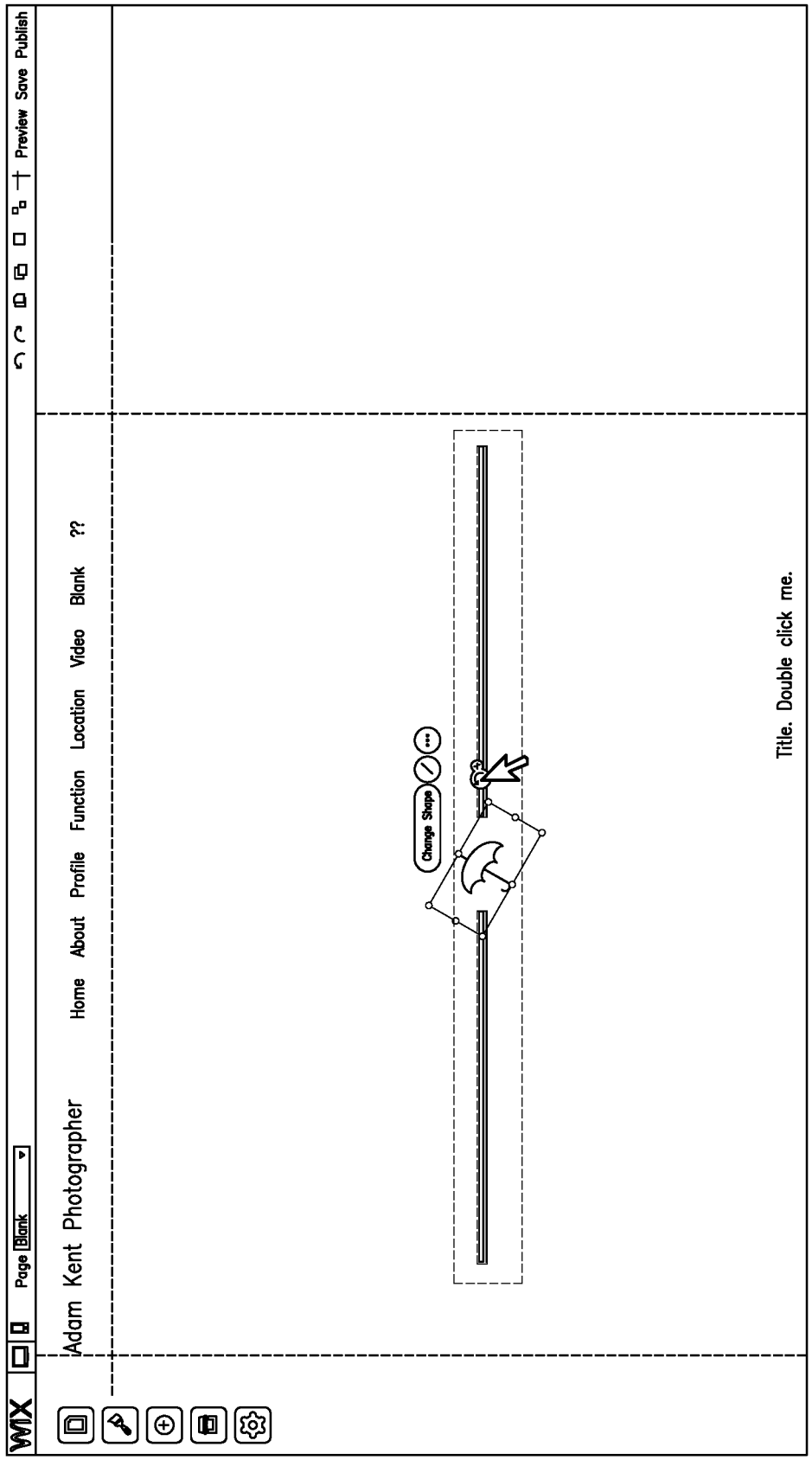

FIG. 14E illustrates an advanced user interface which allows the user to select components which are parts of the smart box and handle them separately (e.g. rotate them).

Figure 14F:
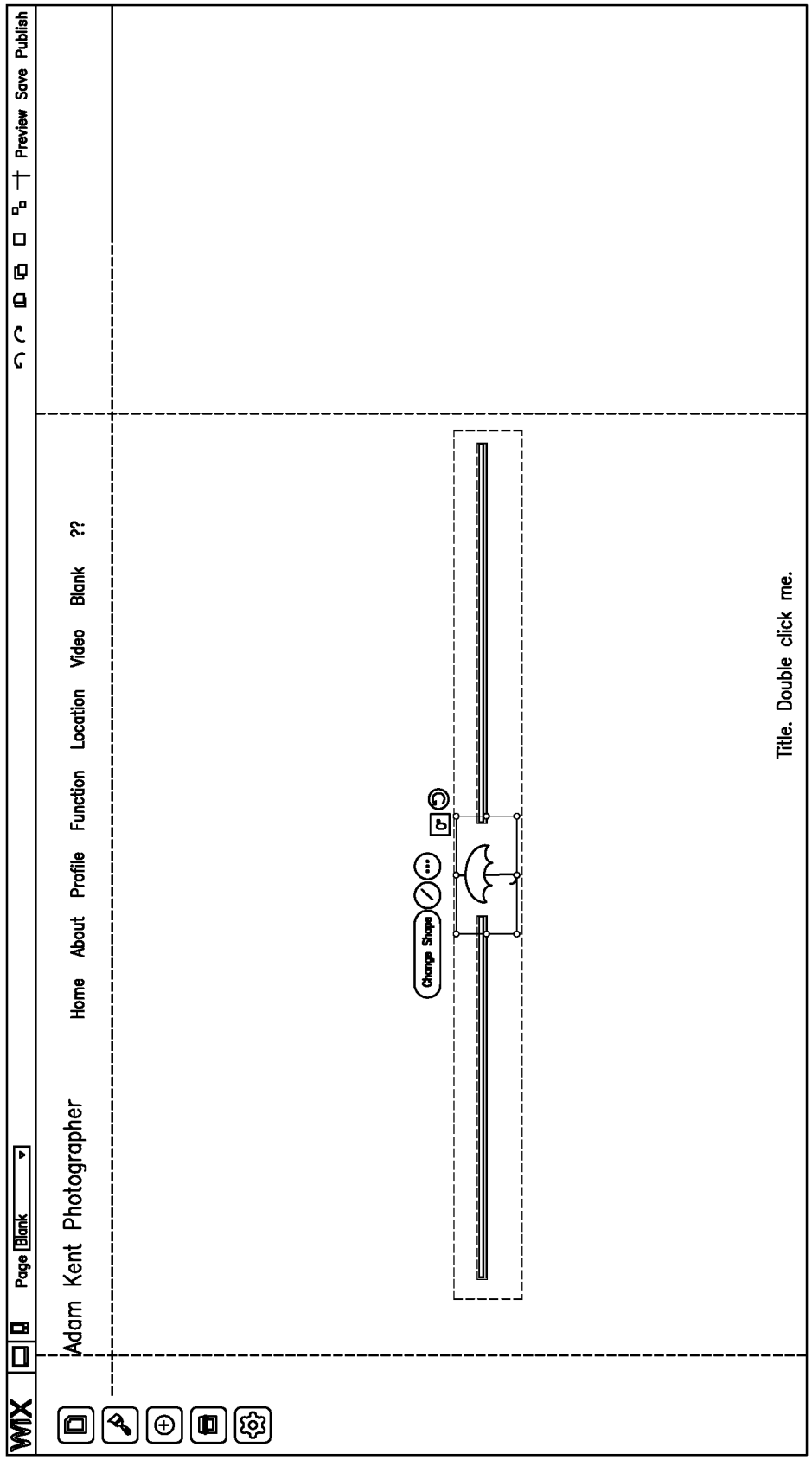
Figure 14G:
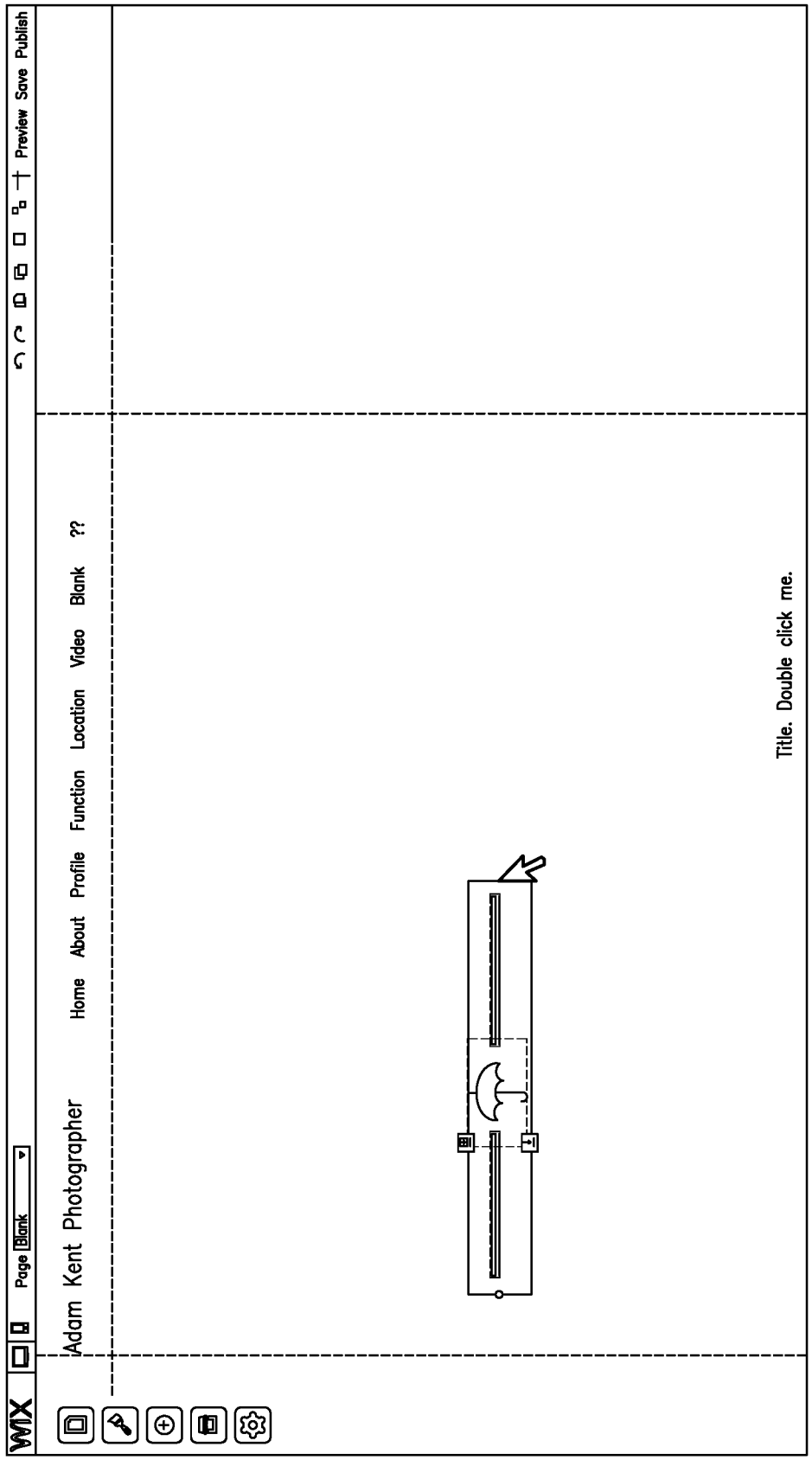

FIG. 14F illustrates the result of such rotation, a smart box conforming to the "lines with umbrella" decorated line semantic composite, but with a local variation as the umbrella is straight-up, and not rotated as in the regular semantic composite.

FIG. 14G illustrates the result of a resize operation (horizontal shrinking in this case) properly applied to the smart box, with lines being shortened and the middle image remaining the same.

Reference is now made to FIGS. 15A-15F which illustrate the editing of a sales ribbon smart box.

FIG. 15A illustrates a selection menu displaying multiple sales ribbon semantic composites for selection.

Figure 15B:
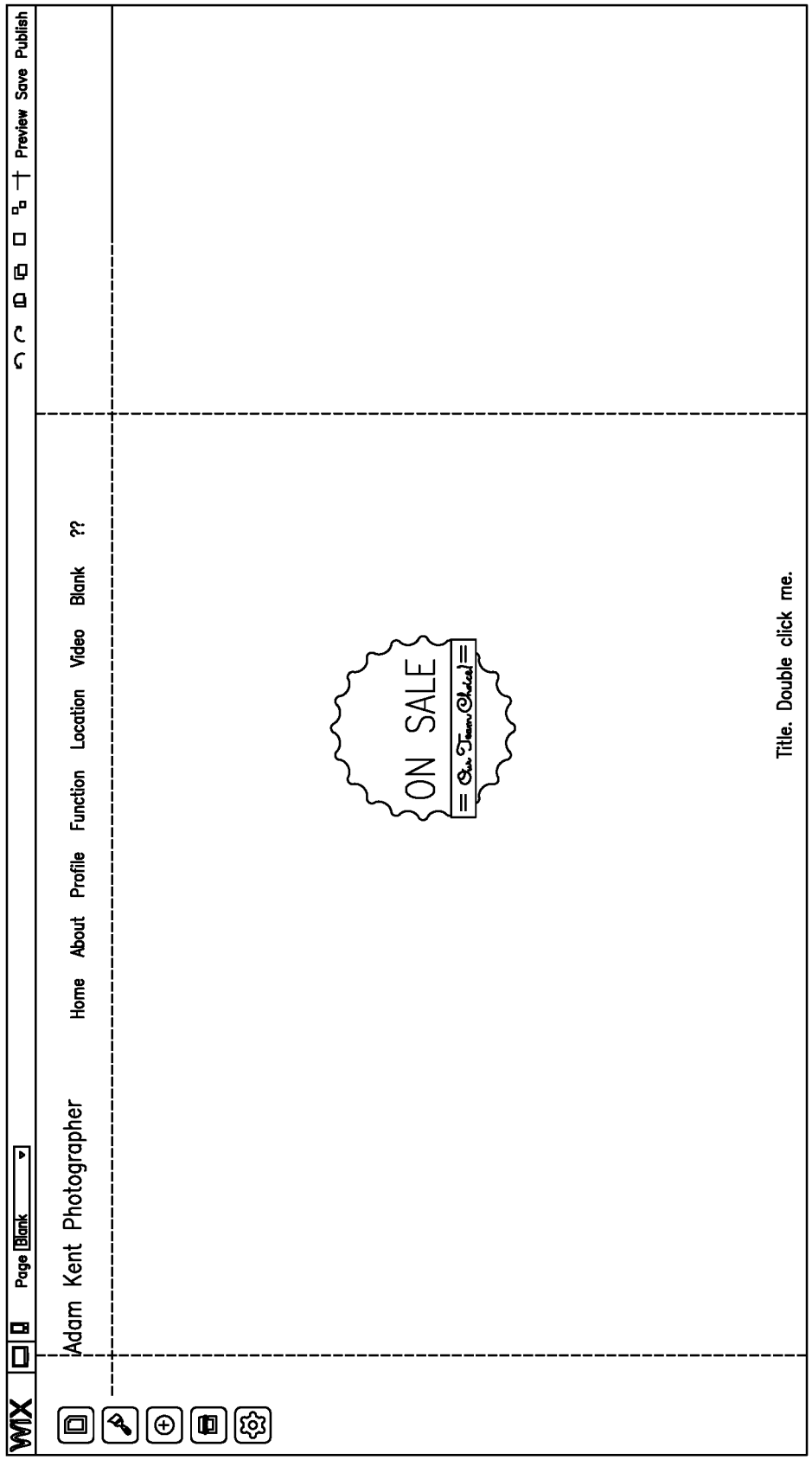

FIG. 15B illustrates a single selected "on sale" smart box.

Figure 15C:
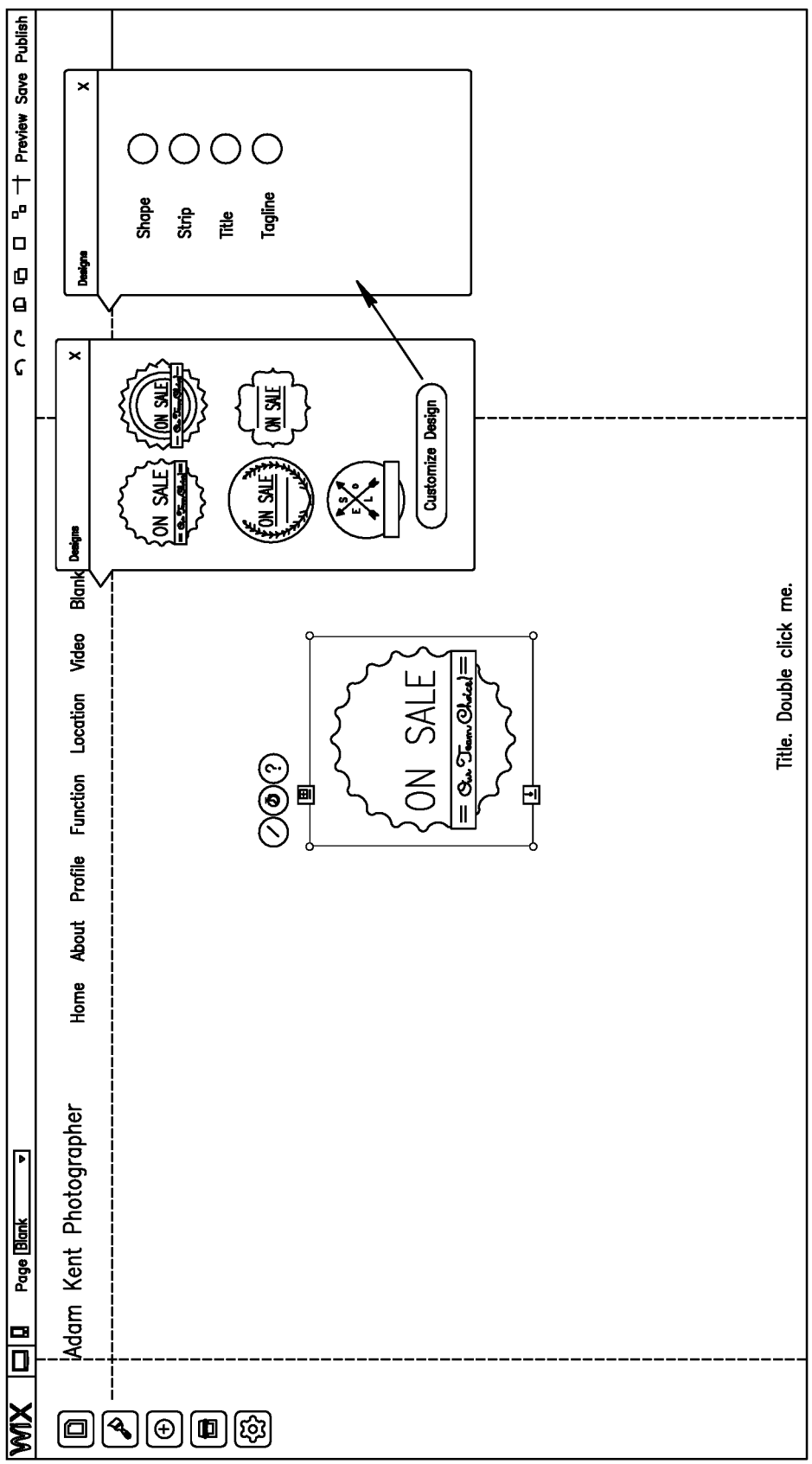

FIG. 15C illustrates a user interface which allows the user to specify which parts of the smart box to customize.

Figure 15D:
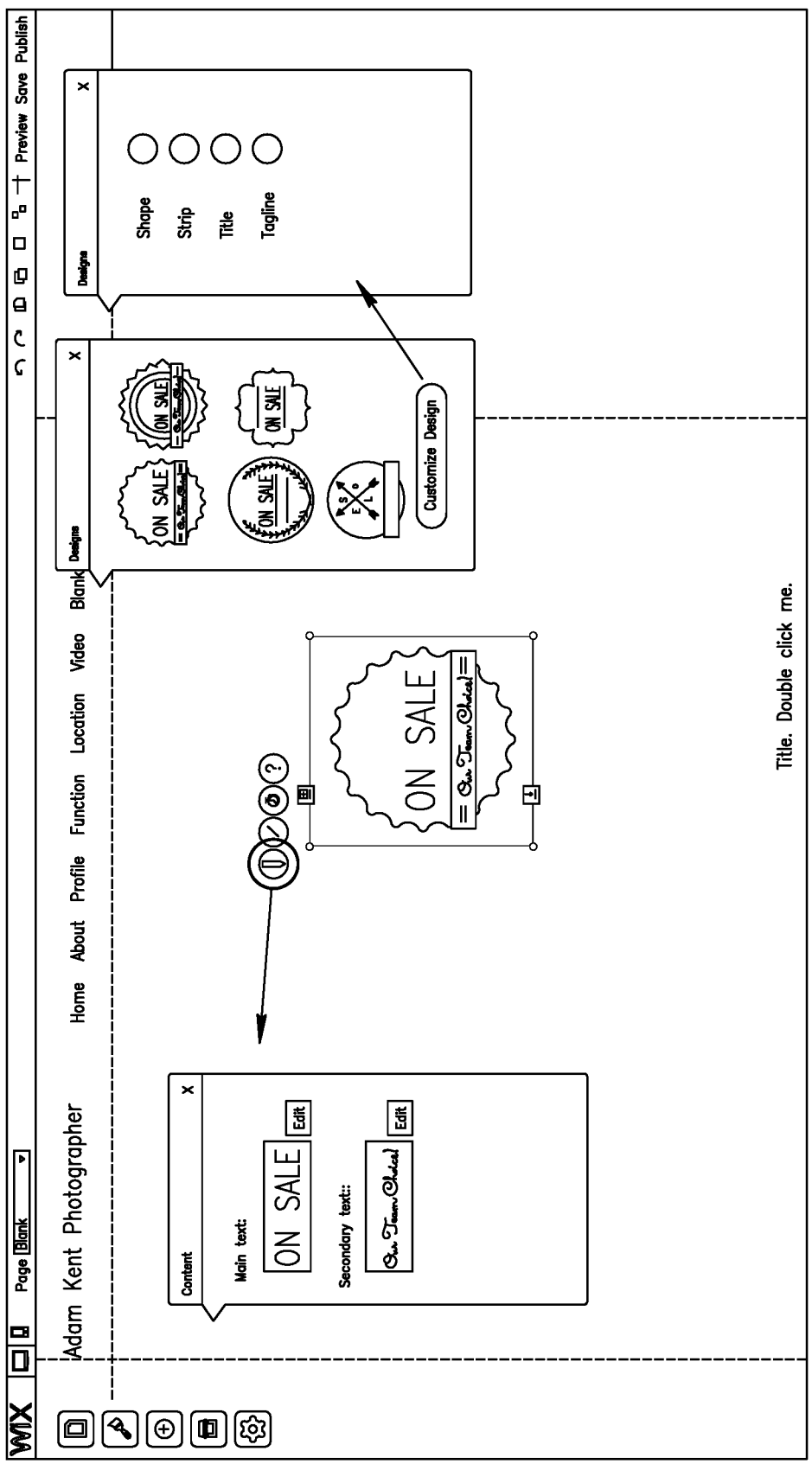

FIG. 15D illustrates a rich-text based customization UI for the smart box.

Figure 15E:
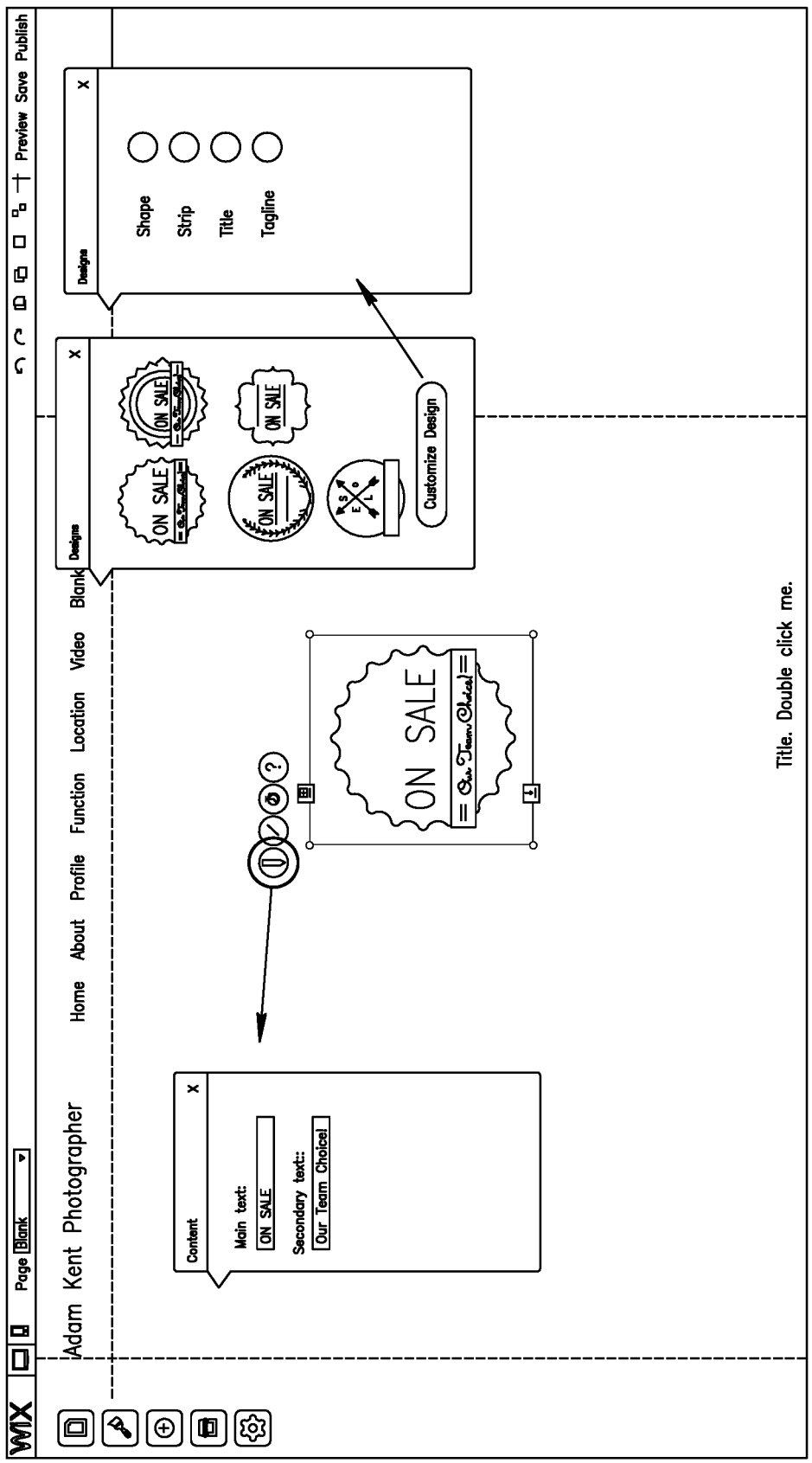

FIG. 15E illustrates a content-based text editing customization UI for the smart box. Such customization UI's can be associated with the various semantic composites in a manner similar to the association of questionnaires to the content elements as described in U.S. patent application Ser. No. 15/607,586.

Figure 15F:
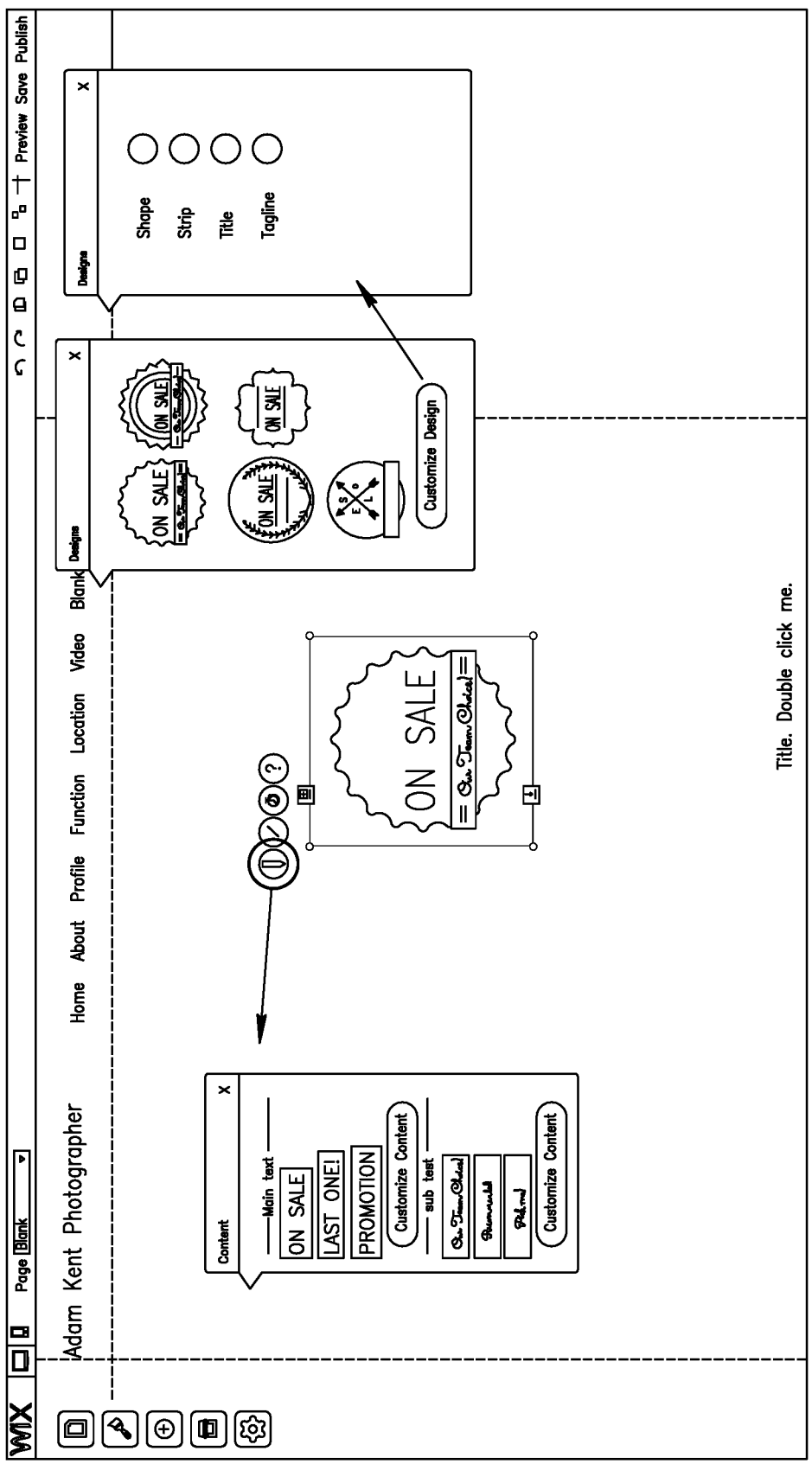

FIG. 15F illustrates a variant of the UI of FIG. 15E which further include relevant content suggestions.

Reference is now made to FIGS. 16A-16F which illustrate the editing of an "About" smart box.

FIG. 16A illustrates a selection menu displaying multiple "About" semantic composites for selection.

Figure 16B:
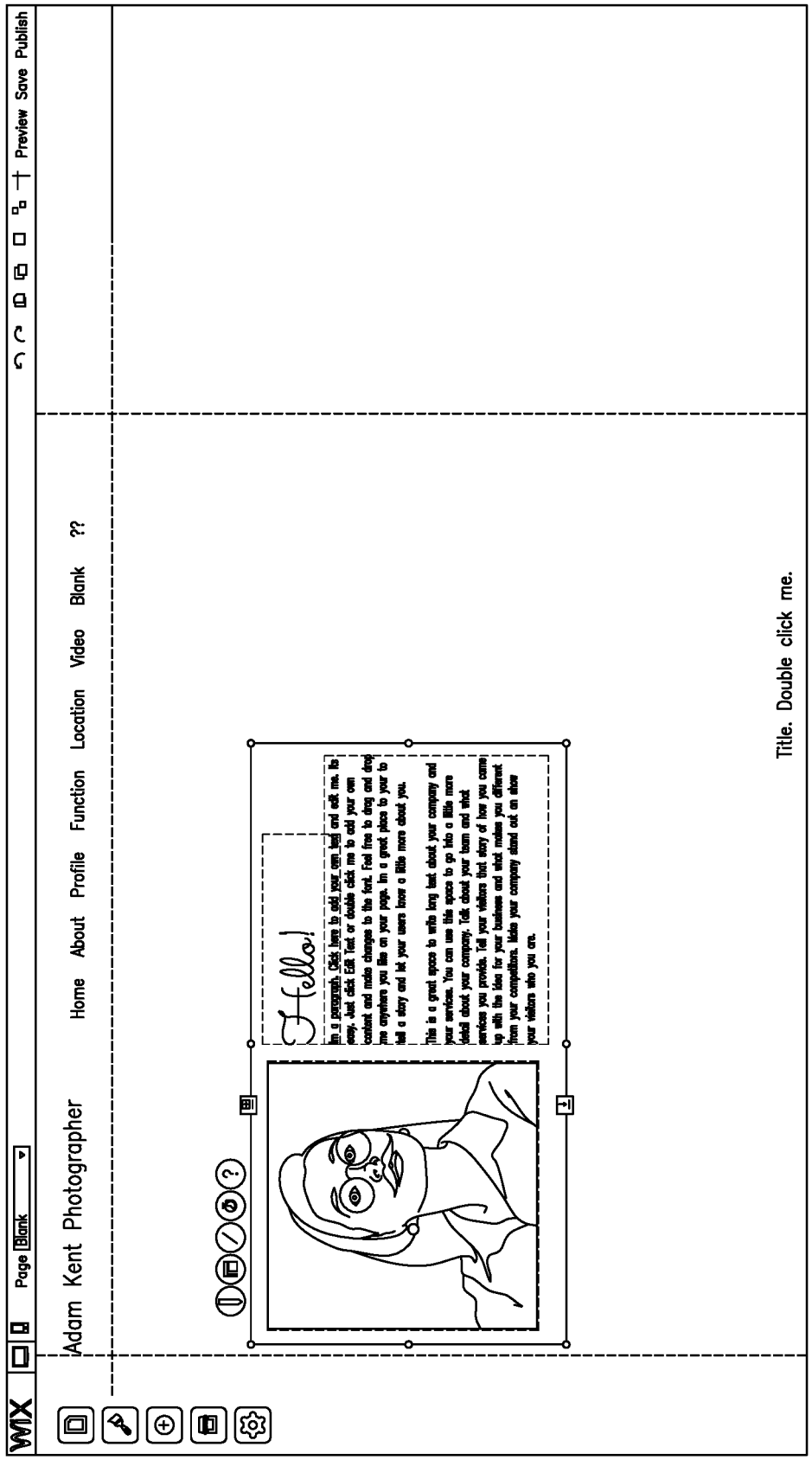
Figure 16C:
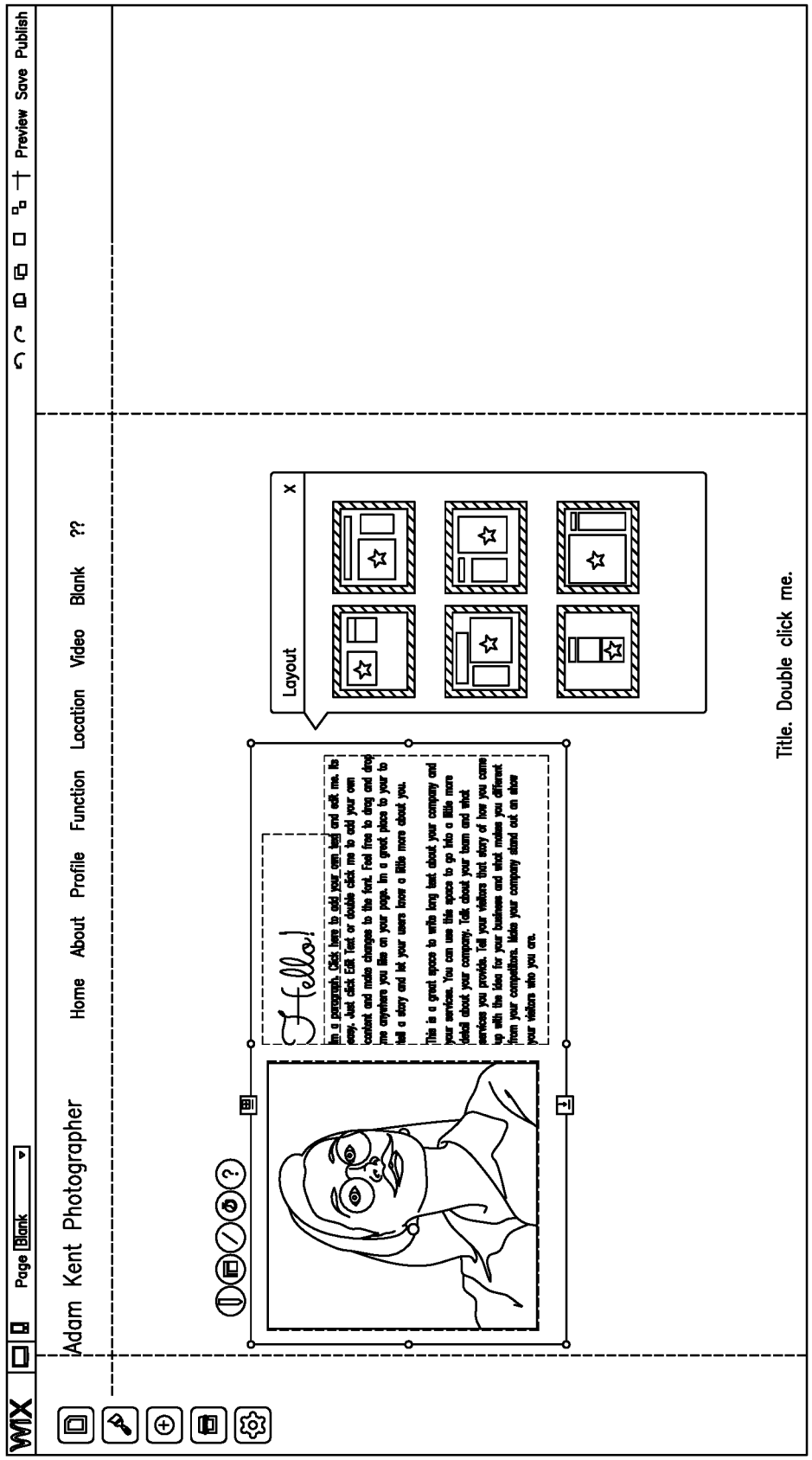

FIG. 16B illustrates a single selected "About" smart box.

FIG. 16C illustrates a user interface which allows the user to select and apply alternative internal layouts to the components inside "About" smart box.

Figure 16D:
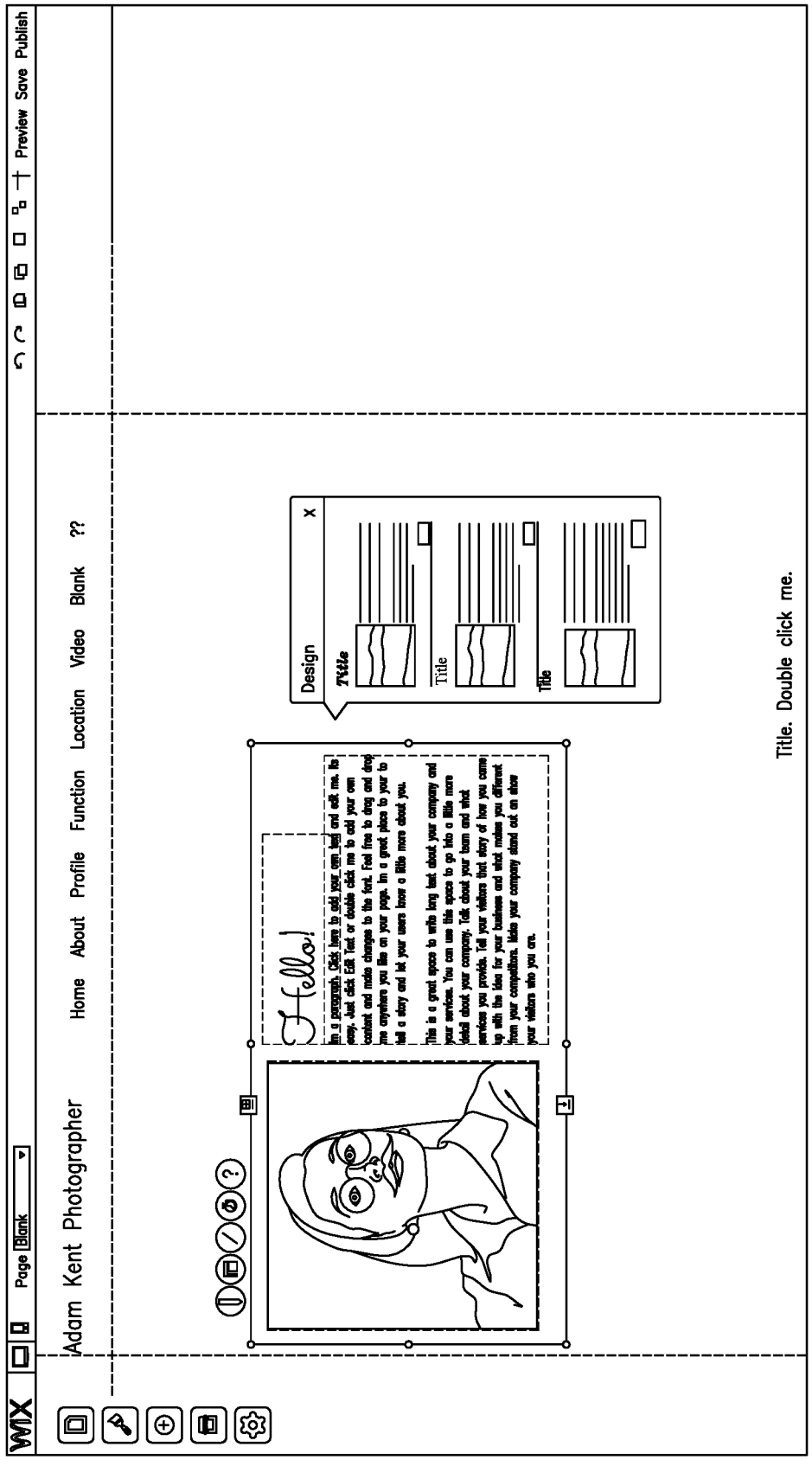

FIG. 16D illustrates another layout selection interface, in which the layouts are shown together with a relevant design kit. Design kits are further described in U.S. patent application Ser. No. 15/607,586.

Figure 16E:
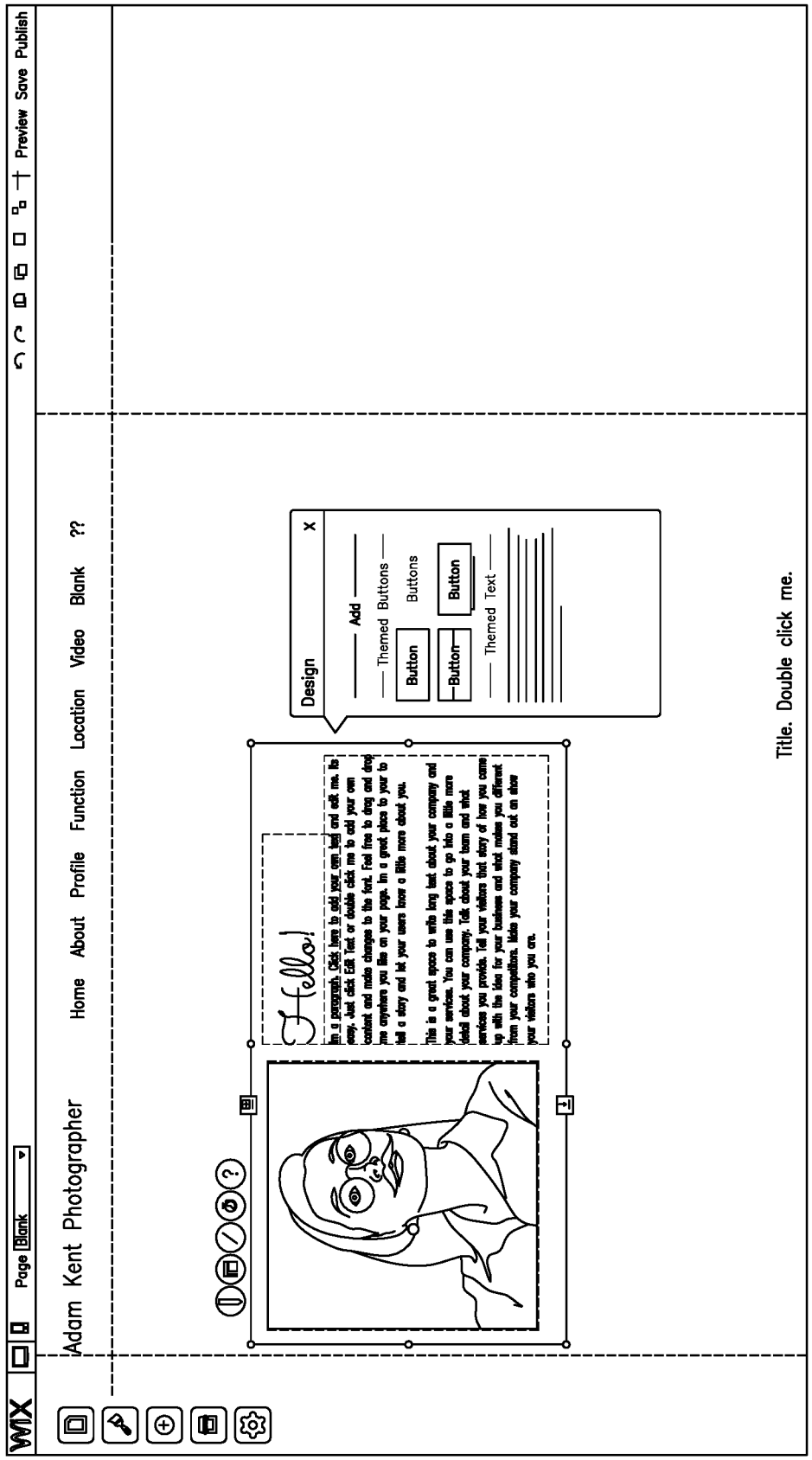

FIG. 16E illustrates a specific "Add component" panel UI tailored to suggest adding specific components and component configurations to the smart box (according to the semantic composites used).

Figure 16F:
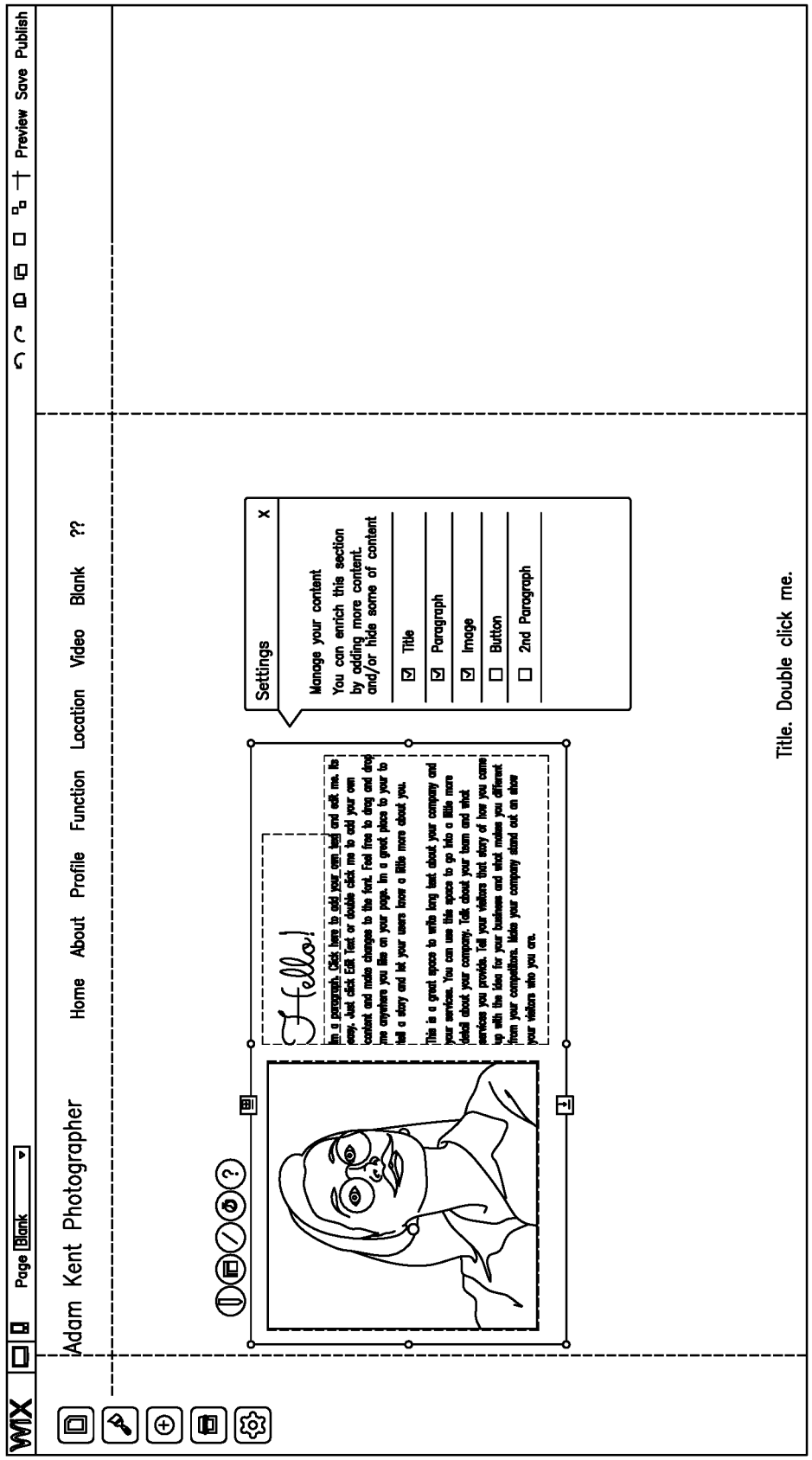

FIG. 16F illustrates a specific content manager UI allowing the user to manage the content inside the smart box.

Reference is now made to FIGS. 17A-17H which illustrate the editing of a "Team member" smart box.

FIG. 17A illustrates a selection menu displaying multiple "Team member" semantic composites for selection.

Figure 17B:
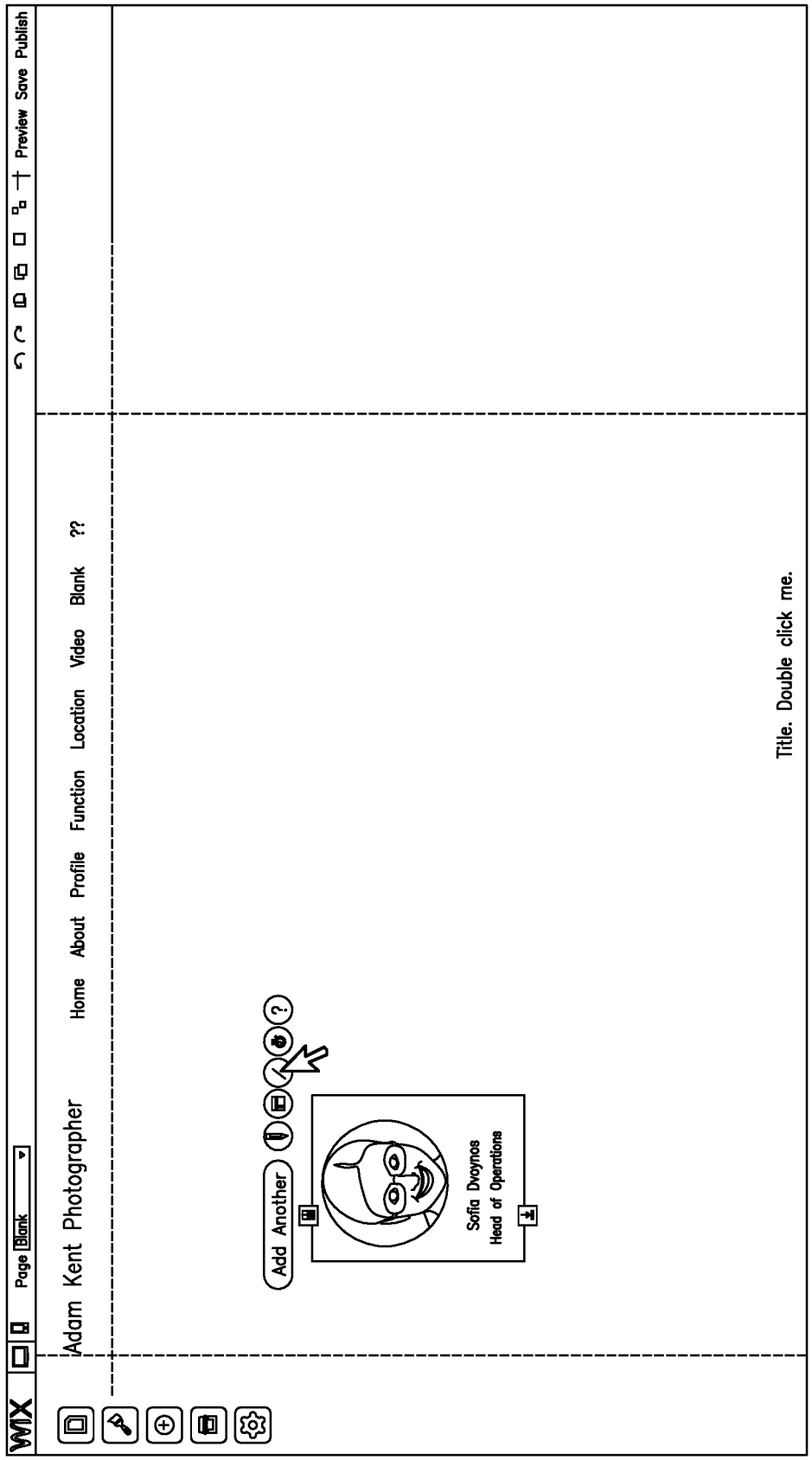

FIG. 17B illustrates a single selected "Team member" smart box.

Figure 17C:
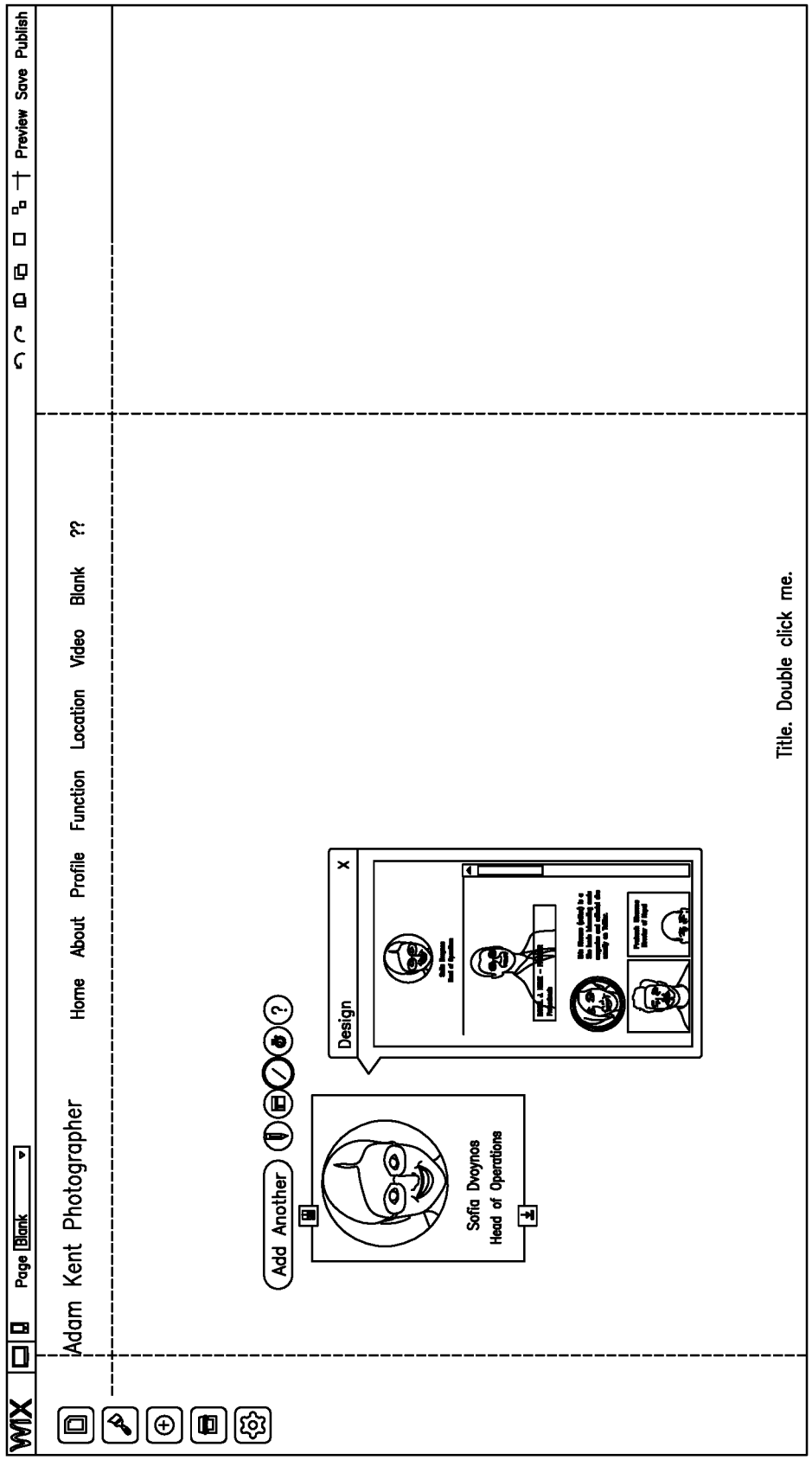

FIG. 17C illustrates a user interface which allows the user to select and apply alternative internal layouts and designs to the components inside "Team member" smart box. Any actual content enter by the user into the smart box may be used in the new layout and design.

Figure 17D:
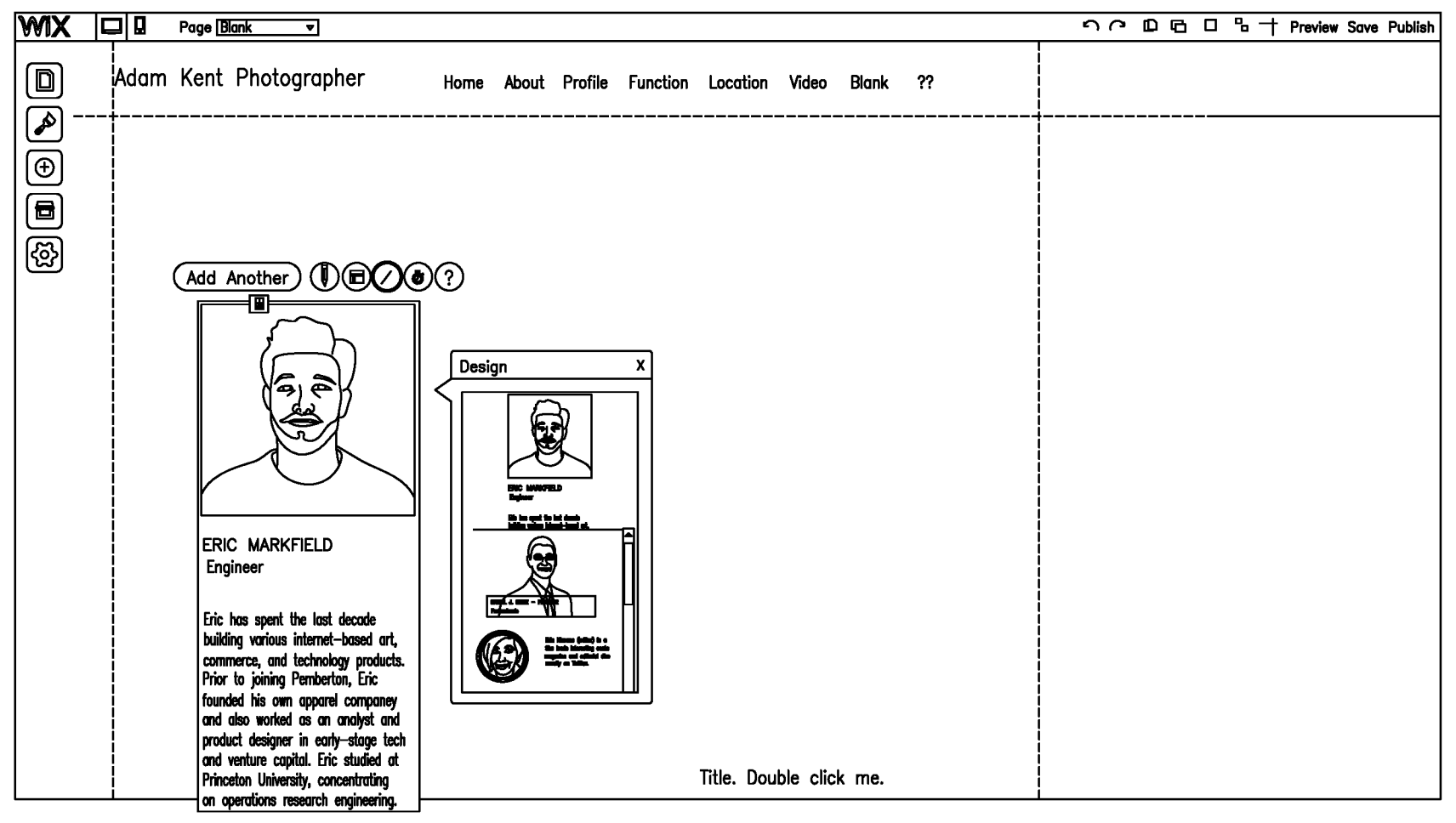

FIG. 17D illustrates the "Team member" smart box in the new layout.

Figure 17E:
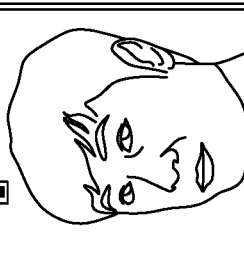
Figure 17F:
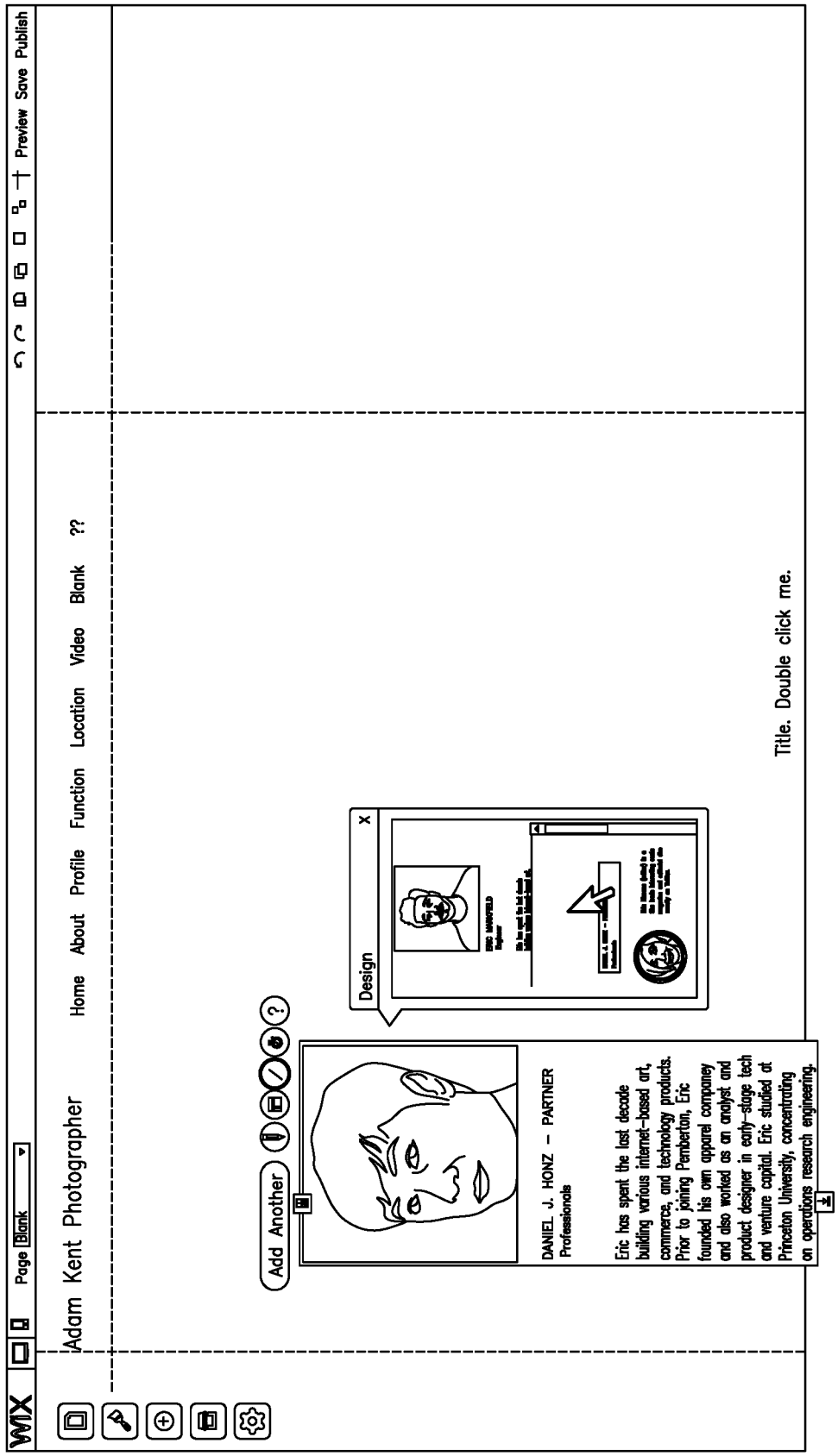
Figure 17G:
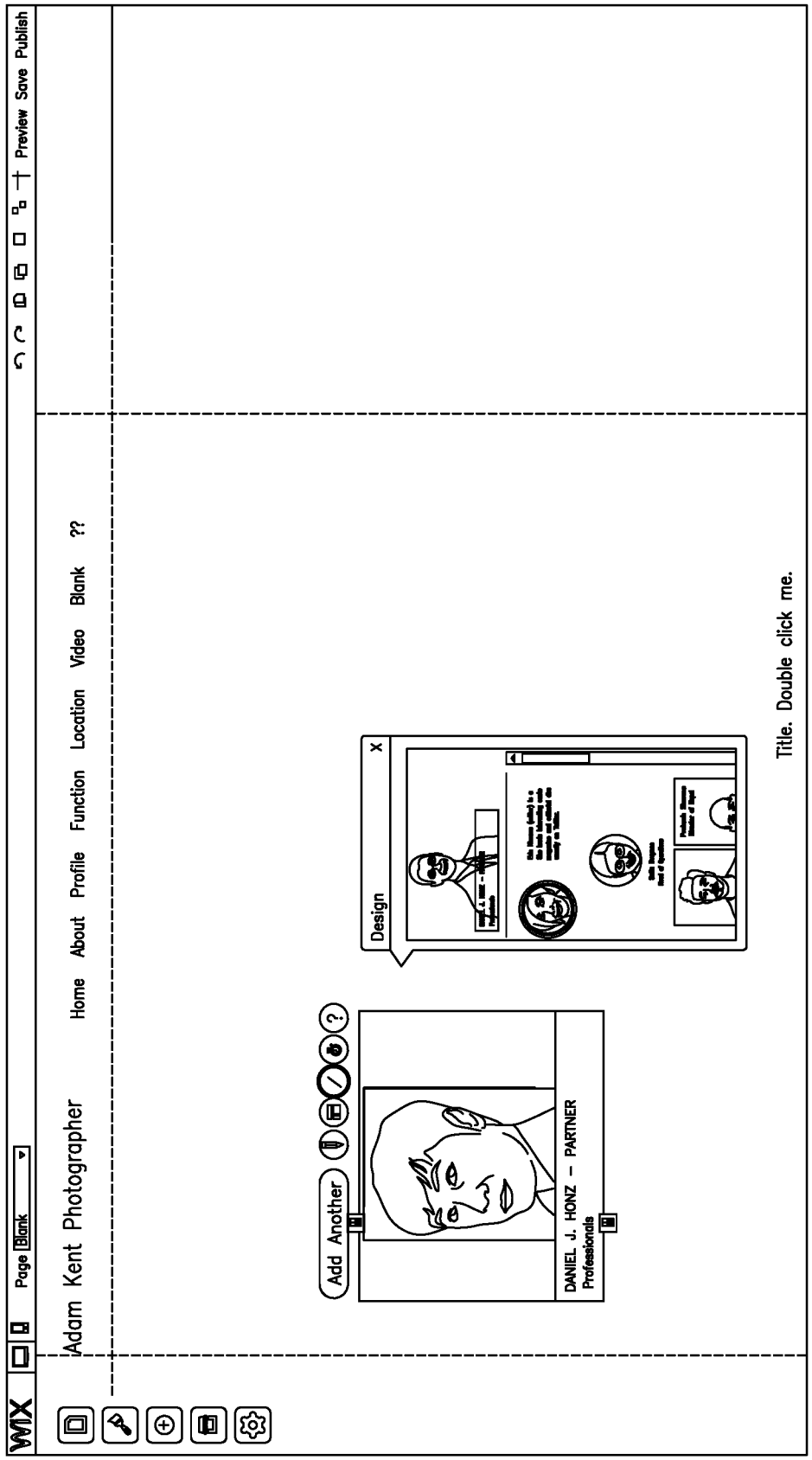

FIG. 17E illustrates the "Team member" smart box with the new layout and replaced (picture) content.

FIG. 17F illustrates a user interface for specifying an alternate style for the smart box.

FIG. 17G illustrates the smart box after the style was changed. The user-specified data (the image) was retained, but the unspecified data (the team member name) was replaced.

Figure 17H:
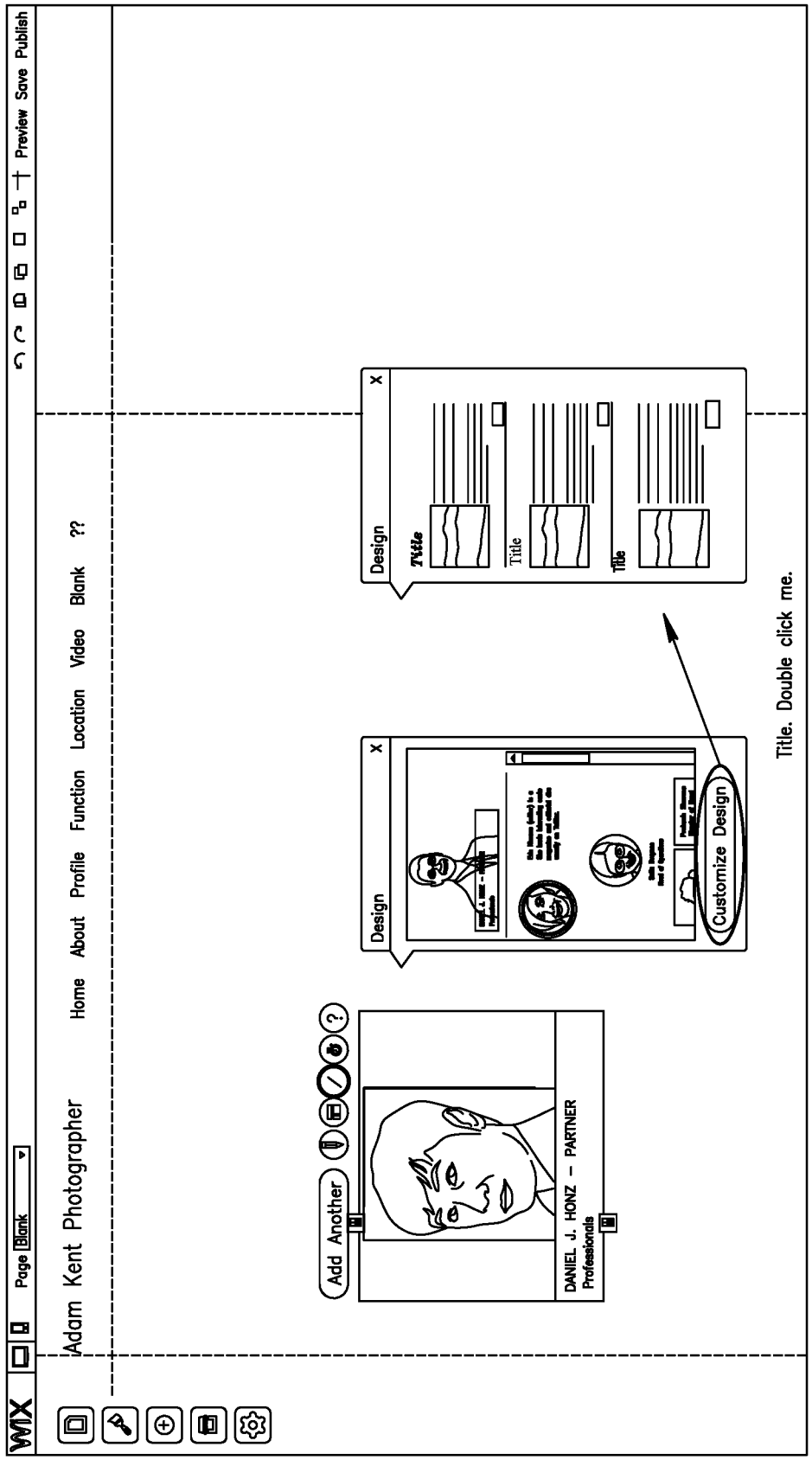

FIG. 17H illustrates a user interface for specifying a design kit.

Figure 18C:
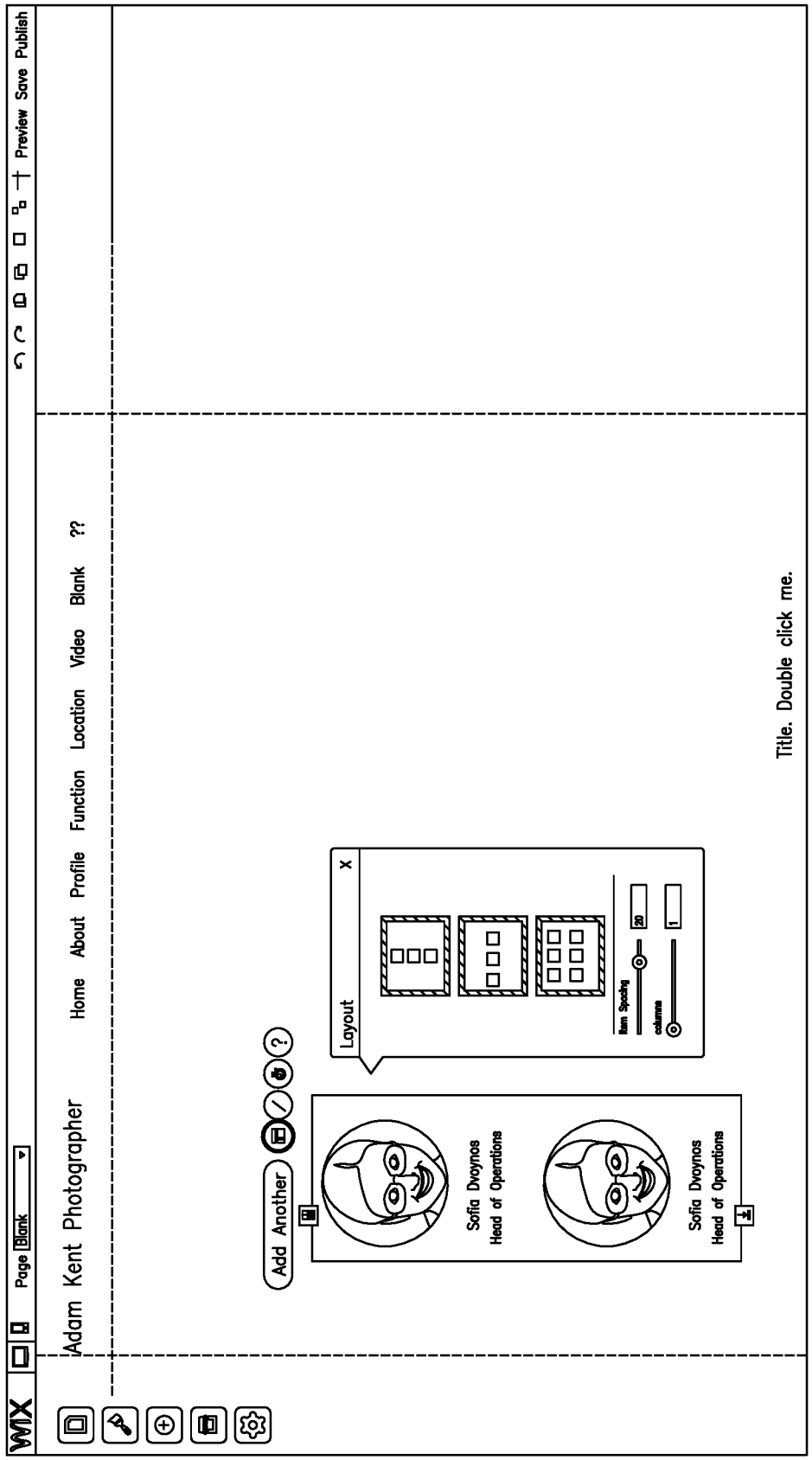

Reference is now made to FIGS. 18A-18C which illustrate the editing of a repeater smart box.

FIG. 18A illustrates adding a single "Team member" smart box.

FIG. 18B illustrates adding a second "Team member" smart box using the "Add another" button, thereby creating a list smart box with two instances of "Team member" smart box.

FIG. 18C illustrates a user interface which allows the user to select and apply alternative list layouts to the list repeater smart box. Such layouts specify the list arrangement, rather than affecting the layouts of the internal sub-elements of the list elements.

It will be appreciated that these operations are in addition to operations which affect the style and layout of the list and its items, such as globally modifying the spacing between items, list animations, cross item styling (i.e. styling applied to multiple list items) etc. These operations may be carried out through multiple interfaces, including (for example) the visual page editor interface used to edit components in general (including move, resize and drag and drop operation). WBS editor 30 may provide an additional user interface to support such actions. For example, for item addition, WBS editor 30 may provide a data entry form (e.g. as a pop-up form or in-place) which allows specifying values for added item. Semantic composite sensitive editor 31 may also provide the functionality to modify the displayed list, possibly moving and/or resizing the currently displayed list items to make place for the smart box representing the new list item. Similarly, for list item deletion, adder/deleter 3116 may re-arrange the existing item so to "close the gap" created by removing the smart box representing the deleted item.

The operations may also be carried out through a specialized list editor interface which shows just the list data and supports the relevant operations, possibly including data editing, record add/remove, record reordering, adding removing field, filtering, view control (paginate or scrolling) etc. An example of this is illustrated in FIGS. 18A-18C back to which reference is now made. System 100 may implement such a list editor using a list-like interface, a side menu, a spreadsheet-like grid interface or other UI's. System 100 may provide specific list editors for different list type types.

The operations may also be carried out through additional interfaces, such as an API or web services which support the relevant operation or by other systems accessing an external database which contains the list items (for virtual lists as described below).

It will be appreciated that these interfaces affect the same data (the same underlying list), and thus each interface reflects the changes made in other interfaces. For example, adding an item to the list through the visual page editor would affect the displayed list interface, and vice versa.

It will be appreciated that system 100 may typically display list elements using a visual order which matches the internal logical order of the underlying list data.

In such a case, whenever a list item is visually moved (in the WBS editor 30) so to switch position with another list item, orderer 3117 may re-order elements in the data list in parallel. Similarly, if the internal data list is edited (e.g. using the list editor described above), and data records are re-ordered, the visual order of the matching elements is modified as well.

It will be appreciated that (as illustrated in FIG. 18C) list elements may typically be arranged as a series of adjacent rectangular elements laid out along a vertical stack, a horizontal sequence or a grid (gallery). However, other arrangements are possible, such as arrangement along a curve (such as a circle), using of a slider or a 3D arrangement, album-like packing inside an area etc.

WBS editor 30 may also implement a class of unstructured repeater semantic composites in which list elements may be placed in arbitrary positions. In such a repeater semantic composites position change (e.g. caused by moving of list element) would not cause automatic reordering of the underlying data list. In such a repeater smart box (i.e. repeater semantic composites instance), the list elements may have a visual arrangement (or possibly order) which is not related to the underlying list order (which is the list elements' logical order).

It will be further appreciated that system 100 may support data conversion, export/import or direct connection between the displayed repeater smart box and an underlying database containing data items The underlying list (for a given repeater smart box) may be implemented as an internal list in WBS site repository 505 (an internal list) or as a list stored in an external database connected to the specific repeater smart box (a virtual list as it reflects an external database and not internal "list content"). The virtual lists may be typically larger, and are typically used with a layout which only presents a "window" displaying a sub-range of the list items as described herein above (rather than displaying all lists' item). System 100 may also have multiple virtual lists connect to the same database so to have multiple viewports for one database.

Thus, a virtual list repeater smart box may reflect the content of the external database. The connection may include a filter (i.e. selection criteria), so that the repeater smart box may reflect a subset of the records in the database.

When the database changes (even if through external access outside of website building system 5), the change may be reflected in any virtual list smart boxes connected to the database.

It will be appreciated that system 100 may also support actual data conversion in both directions, i.e. updater 90 may import from an external database to create an internal list. The created internal list may not be connected to the database, and thus may not reflect later changes to the database.

Updater 90 may also create (export) a database from an internal list. Such a database may be created to interface to other systems, to keep an archive copy etc.

It will be appreciated that a list smart box may contain multiple item types. Thus, the smart box may be use items (via virtual list, import or export) from database types which allow a single repository to contain multiple record types, such as object-oriented databases or content management systems.

It will also be appreciated that a smart box may provide additional services and capabilities. For example, the smart box may provide a layout control interface (programmatic or otherwise) allowing other parts of system 100 to read and control layout parameters such as padding, text size etc. Such an interface may also provide such functionality to the websites constructed using system 100, allowing a site, for example, to toggle the layout of a given smart box based on pressing a button in the operation site (i.e. during run-time).

The smart box may also provide an UI or interface which allows certain changes to be applied to multiple contained smart boxes (possibly at multiple levels of containment). This is similar to the "lock design" UI checkbox and function described herein above (in which changes made to one list element are applied to the other list elements). In this case the changes are applied to child smart boxes (or components) rather than sibling smart boxes.

Matcher 3120 may perform strict semantic composite matching (applying changes only to type-conforming smart boxes) or soft semantic composite matching (apply changes whenever applicable to a given smart box). The changes may include style changes, addition/removal of components, layout changes, decorative elements changes etc. Such changes may be required when (for example) other elements of SC editing behavior applier 311 need to apply a change to one or more smart boxes which may vary in structure or conformance to a given semantic composite definition.

Smart boxes may also suggest related components and content which may be added: based on a specific semantic composite. For example, for a contact semantic composite, content/component offerer 3121 may offer adding a complementary Google maps widget if no such widget was included.

Content/component offerer 3121 may also offer additional or alternative components, and may also recommend against the addition of certain components or smart boxes.

For example, when creating or editing a conceptual semantic composite of a wedding event, content/component offerer 3121 may offer the user predefined images from the wedding world image stock. An example user interface offering additional components to use with a smart box is illustrated in FIGS. 15F and 16E. An example user interface allowing the user to manage the content inside the smart box is illustrated in FIG. 16F. System 100 may further allow the user to manage the content of a given smart box using a specific customization dialog (or questionnaire) associated with the smart box. Such customization dialogs may be predefined (and typically stored in semantic composite types repository 502 together with the semantic composite definition) or automatically generated based on the smart composite definition. This is similar to the association and generation of questionnaires based on content elements as described in U.S. patent application Ser. No. 15/607,586. Such dialogs may use the smart composite's field role information. An example user interface displaying such associated customization dialogs is illustrated in FIGS. 15D (rich text based dialog) and 15E (pure content dialog).

Such suggested additional content may be stored in WBS site repository 505, or may be gathered from external source (related to the user or independent) as described U.S. patent application Ser. No. 15/607,586.

It will be appreciated that system 100 may allow the user to mark an arbitrary set of components and convert it into a semantic composite or layout via semantic composite sensitive editor 31. The user may be required to provide additional details (e.g. semantic composite name). Semantic composite sensitive editor 31 may also allow the user to tag the created semantic composite based on a set of user-specific or system wide tags, or to specify a semantic type for the semantic composite (from semantic composite types repository 502).

This allows the user to enrich semantic composite types repository 502 and any layout repositories of system 100 and to reuse the semantic composites and layouts in additional places in the website.

The created semantic composite/layout may be limited for use by the same user, shared to a specific user group or published for free or paid use by wider audiences (e.g. through object market place 15). In the latter case the user may be required to add marketplace related information (such as identifying information, pricing information, marketing information, classification, discoverability-related information etc.).

System 100 may also allow the defining one or more designs (themes/skins) for each semantic composite. Such designs may affect some or all of the components of the semantic composite, keeping them in the same "design language".

A design may specify component properties such as font, frame style, colors etc. A design selection is typically separate and independent of the layout selection. Some component attributes are design-related and some are layout-related.

For example, a "metal" design for an [image+caption] semantic composite may include the following:

Change the image skin to add "bolt" decoration to the image corners.

Change the caption's font to a metallic-themed font.

Specify the component's background color to be metallic gray.

Semantic composite type editor 32 may allow WBS vendor staff 61 or site designer 62 to define such designs. Site designer 62 may then select a relevant design for semantic composites in use, and may also explicitly apply a design (such as "metal" above) to multiple semantic composites, each of which may provide its own implementation of the metal design. It will be appreciated that users may sell their designs via object marketplace 15. An example user interface to select a design kit is illustrated in FIGS. 16D and 17H.

It will also be appreciated that alternate semantic composite layouts typically modify the layout the inner components of the smart box, without changing the size of the outside box of the smart box itself. However, system 100 may allow specification of alternate box sizes as part of the layout definitions.

Semantic composite sensitive editor 31 may offer the user to change the box size of the smart box. The default would be to keep the existing size. The size could be changed so to keep proportions or use recommended external proportions.

In another example, a user may add a button to a given smart box (through the regular editing UI) and no valid layout with the extra button may exist for the semantic composite/smart box due to the dimensions of the containing box. Semantic composite sensitive editor 31 may add it in an arbitrary position (e.g. top left) and let the user re-position it.

Alternatively, semantic composite sensitive editor 31 may offer the user to modify the box size so to have a place for the button. In an alternative embodiment, semantic composite sensitive editor 31 may try to find possible positions between the existing components in the layout.

It will be appreciated that the semantic decomposition process creates a structure describing some of the components in the website. This structure reflects human understanding of the website better than the information provided by a regular component tree or HTML representation. System 100 may use this structure when emitting the website content to be indexed by a search engine spider.

For example, the content for list items may be emitted according to the logical list order even if the list elements were placed on the page in a different manner (e.g. due to aesthetic consideration). As another example, for a page containing multiple picture and text components, the semantic decomposition may provide better definition of which text (caption) belongs to which image.

Based on this better-organized content (emitted to the indexing spider) the search engine may create better indexes which provide better access to the site.

Search engine friendly renderer 23 may further emit additional information to the indexing spider which includes additional URL parameters related to the specific smart boxes in the page (including the semantic decomposition details), their configurations and their current states. Such URL parameters could, for example, describe information related to the layout of a currently displayed smart box (for smart boxes that support multiple displayable layouts), the current position of a repeater smart box in a given underlying list etc. This may allow the retrieved URL to be used to re-construct the indexed page with better precision. A similar mechanism (used with third party applications instead of smart boxes) is described in U.S. Pat. No. 9,436,765.

It will be appreciated that some of the smart box related mechanisms may work in WBS viewer 25 and not just in the WBS 30 editing environment.

Website building system 5 may offer site viewer alternate layout selection. WBS viewer 25 may allow site designer 62 to expose some of the possible layouts for given smart boxes to the site end-users. In such a case, WBS viewer 25 may offer the user or site viewer 63 a specific way (e.g. using a specific widget or UI device) to change the layout of the specific smart box to one of the exposed (suggested) alternate layouts. This would allow the user to view some of the displayed information in multiple ways. Such changes (e.g. selecting alternative view) may affect the entire page layout, and require operations of dynamic layout or responsive design mechanisms as implemented in system 100.

Website building system 5 may also be updated due to updates to virtual lists underlying specific repeater smart boxes. The created site may contain virtual list repeater smart boxes which are connected to external databases. Such databases may be externally updated via other systems which access the same database simultaneously with the website building system operation (including both editing and viewing operations).

In such a case, the virtual lists may reflect changes in the external database. Updater 90 may update the content of the display list smart box, including handling the visual changes made to the list and items smart boxes, and possibly to neighboring smart boxes.

Thus the use of semantic composites and smart boxes may allow a website building system to consider semantic page knowledge in order to apply efficient editing actions and to enable the re-use of layout knowledge and smart alternative layout selection.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS), said system comprising:
    a processor;
    at least one database storing a plurality of types of semantic composites, wherein a type of semantic composite defines a combination of related components having associated therewith editing operations and behaviors to be performed on said related components as a unit, said at least one database also storing a plurality of websites of said WBS, wherein each said website of said plurality of websites has at least one page that has components, containers and specific instances of at least one of said plurality of types of semantic composites in said at least one page; and
    a handler running on said processor to create and edit said specific instances according to semantic page knowledge, said handler comprising:
        at least one analyzer to determine a first set of components of a page of one website of said plurality of websites that belongs to one of said plurality of types of semantic composite according to said semantic page knowledge; and
        a WBS editor enabling a user of said WBS to create and edit said components and containers of said page, said WBS editor also comprising:
            a semantic composite sensitive editor to receive an indication from said handler of said one of said plurality of types of semantic composites, to generate one of said specific instances for said one type of said plurality of types of semantic composites and to implement said editing operations and behaviors associated with said one of said plurality of types of semantic composites on said one of said specific instances; and
            a semantic composite type editor enabling a definition of a customized semantic composite, based on a specific existing set of components, or on an imported schema definition.

2. The system according to claim 1 and also comprising an updater to provide updates to said website based on external updates and updates to said at least one database.

3. The system according to claim 1 and also comprising a search engine friendly renderer to send information about said specific instances to be indexed to a search engine spider.

4. The system according to claim 1 wherein said types of semantic composites are at least one of elementary semantic composites, conceptual semantic composites and repeater semantic composites.

5. The system according to claim 4 wherein said repeater semantic composites are lists, galleries and grids.

6. The system according to claim 1 wherein said handler comprises:
an automatic handler to analyze said page and to perform semantic decomposition according to said analysis; and at least one of:
an offline analyzer and handler to perform batch offline processing and said semantic decomposition from external sites to said one website and to websites held within said at least one database; and
an online analyzer and handler to provide online processing and said semantic decomposition via said automatic handler.

7. The system according to claim 6 and also comprising at least one of:
an interactive handler to enable a user of said WBS to manually configure said semantic decomposition; and
an artificial intelligence/machine learner to perform artificial intelligence and machine learning analysis according to user activity of said one website and analysis of other websites and pages.

8. The system according to claim 6 and also comprising:
a site generation system to generate said one website comprising said specific instances; and
an import handler to import and classify semantic composite definitions from said site generation system and from systems external to said WBS.

9. The system according to claim 1 and also comprising a layout compiler to generate layout definitions for said one website according to a layout definition language.

10. The system according to claim 1 wherein said semantic composite sensitive editor comprises a semantic composite editing behavior applier to apply said associated editing operations and behaviors to said specific instances.

11. The system according to claim 10 wherein said semantic composite editing behavior applier comprises at least one of:
an animation handler to propose and apply a semantic composite type specific animation to one of said specific instances;
a layout creator and applier to extract and apply semantic knowledge, layouts and said editing operations of said types of semantic composites to said specific instances;
a brush applier to apply a semantic brush to said specific instances;
a design kit applier to propose and apply relevant design kits to said specific instances;
a resizer to handle semantic composite type specific resizing for said specific instances;
an adder and deleter to at least one of: add and delete an item in a list of said specific instances;
an orderer to reorder items in a list of said specific instances;
a drag and drop handler to handle drag and drop functionality for said semantic composite sensitive editor;
a selection handler to handle semantic composite selection for said semantic composite sensitive editor;
a matcher to perform composite matching between said plurality of types of semantic composites; and
a content and component offerer to offer additional and alternative components and content for said specific instances.

12. A method for a website building system (WBS), said method comprising:
storing in at least one database, a plurality of types of semantic composites; wherein a type of semantic composite defines a combination of related components having associated therewith editing operations and behaviors to be performed on said related-components as a unit, and storing a plurality of websites of said WBS, wherein each said website of said plurality of websites at least one page that has components, containers and specific instances of at least one of said plurality of types of semantic composites in said at least one page; and
creating and editing said specific instances according to semantic page knowledge, said creating and editing said semantic composites comprising:
determining a first set of components of a page of one website of said plurality of websites that belongs to one of said plurality of types of semantic composite according to said semantic page knowledge; and
enabling a user of said WBS to create and edit said components and containers of said page, said enabling also comprising:
receiving an indication of said one of said plurality of types of semantic composites from said enabling;
generating one of said specific instances for said one type of said plurality of types of semantic composites; and
implementing said editing operations and behaviors associated with said one of said plurality of types of semantic composites on said one of said specific instances; and
enabling definition of a customized semantic composite, based on a specific existing set of components, or on an imported schema definition.

13. The method according to claim 12 and also comprising providing updates to said website based on external updates and updates to said at least one database.

14. The method according to claim 12 and also comprising sending information about said specific instances to be indexed to a search engine spider.

15. The method according to claim 12 wherein said types of semantic composites are at least one of elementary semantic composites, conceptual semantic composites and repeater semantic composites.

16. The method according to claim 15 wherein said repeater semantic composites are lists, galleries and grids.

17. The method according to claim 12 wherein said determining comprises:
analyzing said page and performing semantic decomposition according to said analyzing a page; and at least one of:
performing batch offline processing and said semantic decomposition from external sites to said one website and to websites held within said at least one database; and
providing online processing and said semantic decomposition via said analyzing said page.

18. The method according to claim 17 and also comprising at least one of:
enabling a user of said WBS to manually configure said semantic decomposition; and
performing artificial intelligence and machine learning analysis according to user activity of said one website and analysis of other websites and pages.

19. The method according to claim 17 and also comprising:
generating said one website comprising said specific instances; and
importing and classifying semantic decomposition definitions from said generating said one website and from systems external to said WBS.

20. The method according to claim 12 and also comprising generating layout definitions for said one website according to a layout definition language.

21. The method according to claim 12 and further comprising at least one of:
- proposing and applying a semantic composite specific animation to said one of said specific instances;
- extracting and applying semantic knowledge, layouts and said editing operations of said types of semantic composites to said specific instances;
- applying a semantic brush to said specific instances;
- proposing and applying relevant design kits to said specific instances;
- handling semantic composite type specific resizing for said specific instances;
- at least one of: adding and deleting an item in a list of said specific instances;
- reordering items in a list of said specific instances;
- handling drag and drop functionality for said enabling a user to apply associated editing behaviors;
- handling said type of semantic composite selection for said enabling a user to apply associated editing behaviors;
- performing composite matching between said plurality of types of semantic composites;
- offering additional and alternative components and content for said specific instances; and
- editing one of said specific instances to form a new specific instance.

* * * * *

UNITED STATES PATENT AND TRADEMARK OFFICE
CERTIFICATE OF CORRECTION

| | | |
|---|---|---|
| PATENT NO. | : 11,748,440 B2 | Page 1 of 1 |
| APPLICATION NO. | : 15/661342 | |
| DATED | : September 5, 2023 | |
| INVENTOR(S) | : Roni Ben-Aharon | |

It is certified that error appears in the above-identified patent and that said Letters Patent is hereby corrected as shown below:

In the Specification

In Column 9, Line 21, delete "30" and insert --50--.
In Column 10, Line 23, delete "62" and insert --61--.
In Column 14, Line 21, delete "36" and insert --84--.
In Column 22, Line 61, delete "36" and insert --84--.
In Column 38, Line 67, delete "WBS" and insert --WBS editor--.

Signed and Sealed this
Seventeenth Day of October, 2023

Katherine Kelly Vidal
*Director of the United States Patent and Trademark Office*